July 28, 1931.  R. W. BOND  1,816,513
DISPENSING APPARATUS OF THE VISIBLE TYPE
Filed March 18, 1929   35 Sheets-Sheet 1
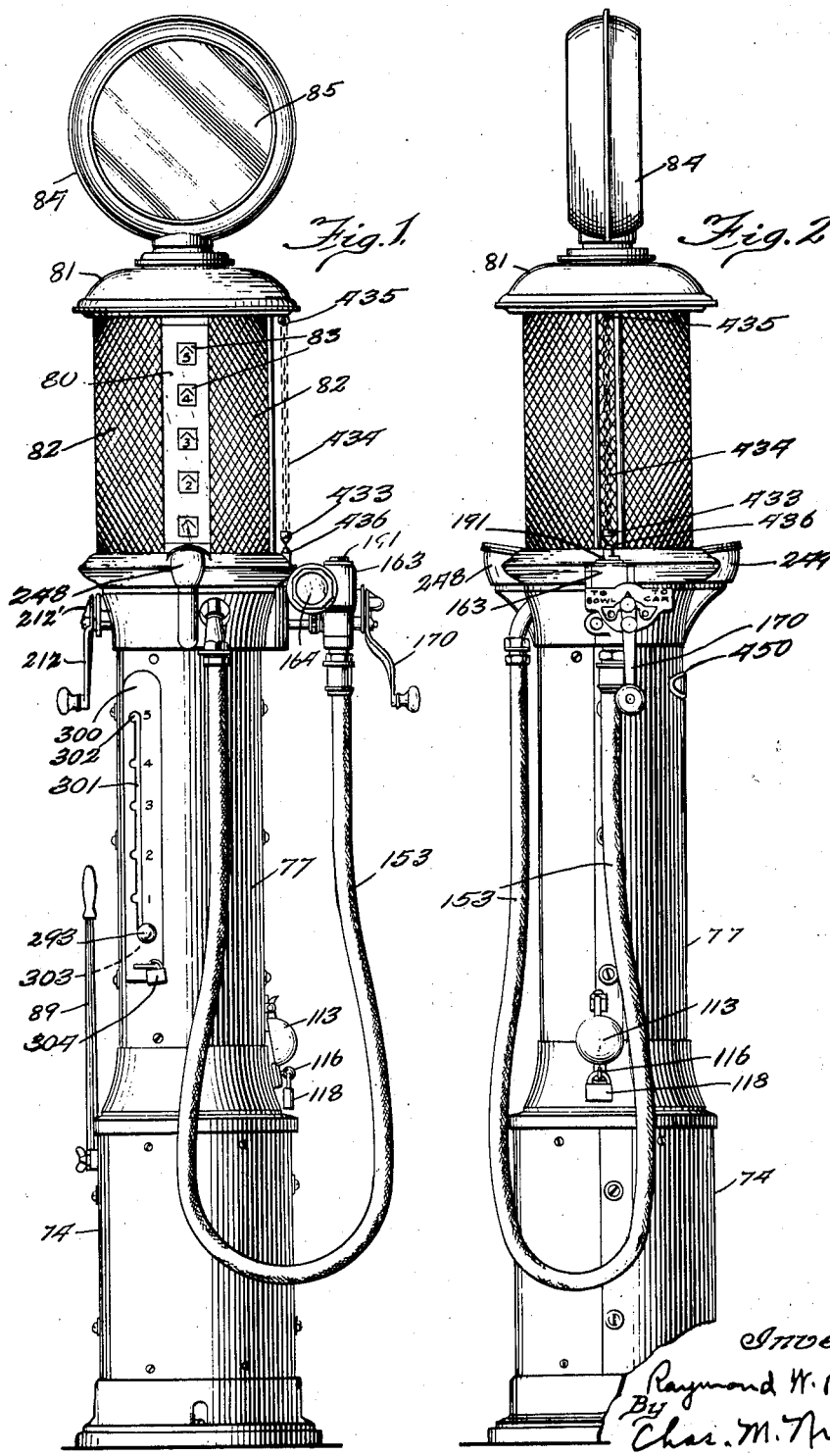

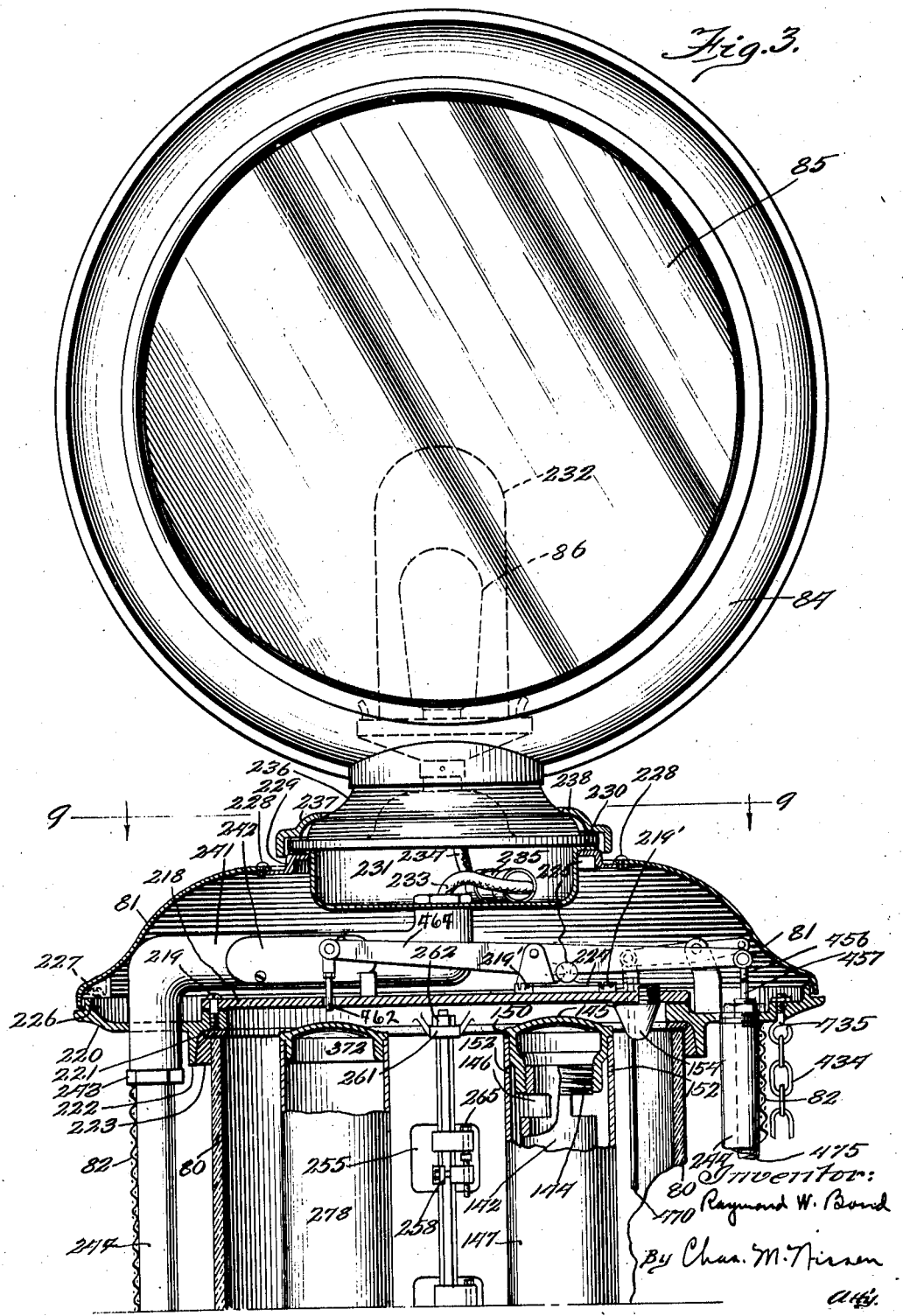

July 28, 1931.  R. W. BOND  1,816,513
DISPENSING APPARATUS OF THE VISIBLE TYPE
Filed March 18, 1929   35 Sheets-Sheet 3
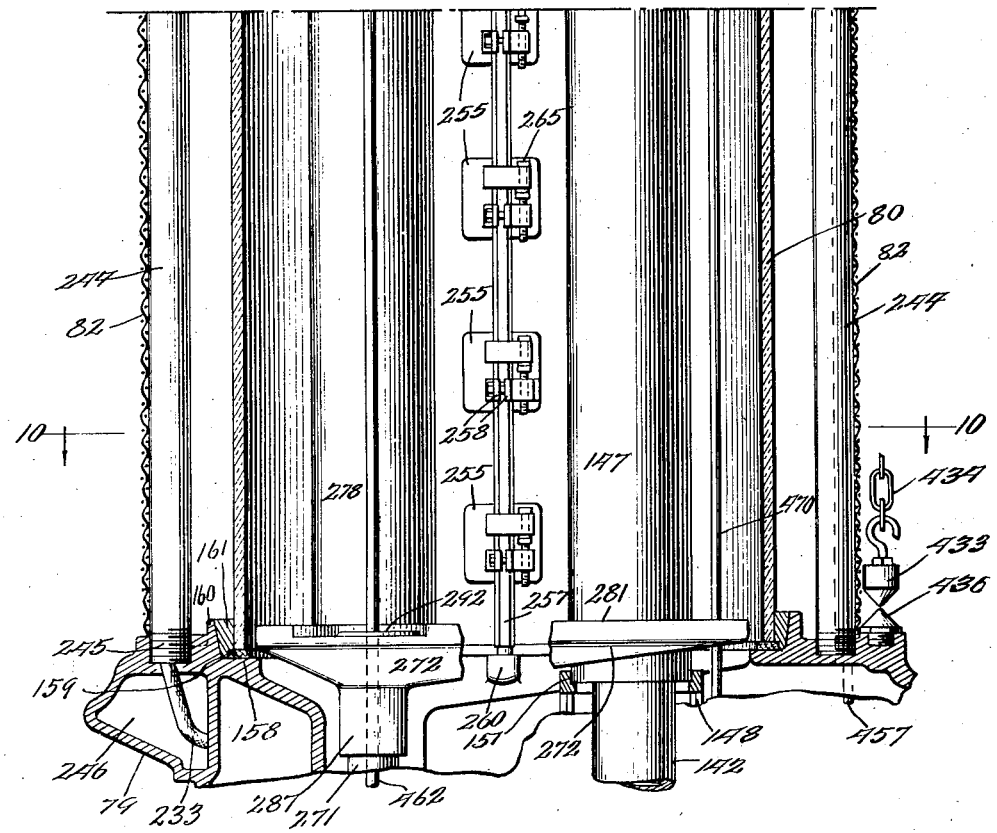
Fig. 4.
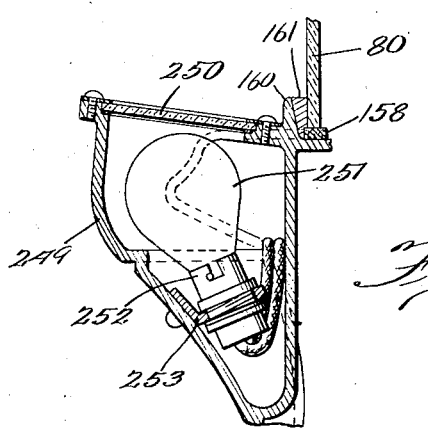
Fig. 10ª.
Inventor:
Raymond W. Bond
By Chas. M. Nissen
Atty.

July 28, 1931. R. W. BOND 1,816,513
DISPENSING APPARATUS OF THE VISIBLE TYPE
Filed March 18, 1929 35 Sheets-Sheet 8

July 28, 1931.  R. W. BOND  1,816,513
DISPENSING APPARATUS OF THE VISIBLE TYPE
Filed March 18, 1929  35 Sheets-Sheet 12

July 28, 1931.  R. W. BOND  1,816,513
DISPENSING APPARATUS OF THE VISIBLE TYPE
Filed March 18, 1929   35 Sheets-Sheet 13

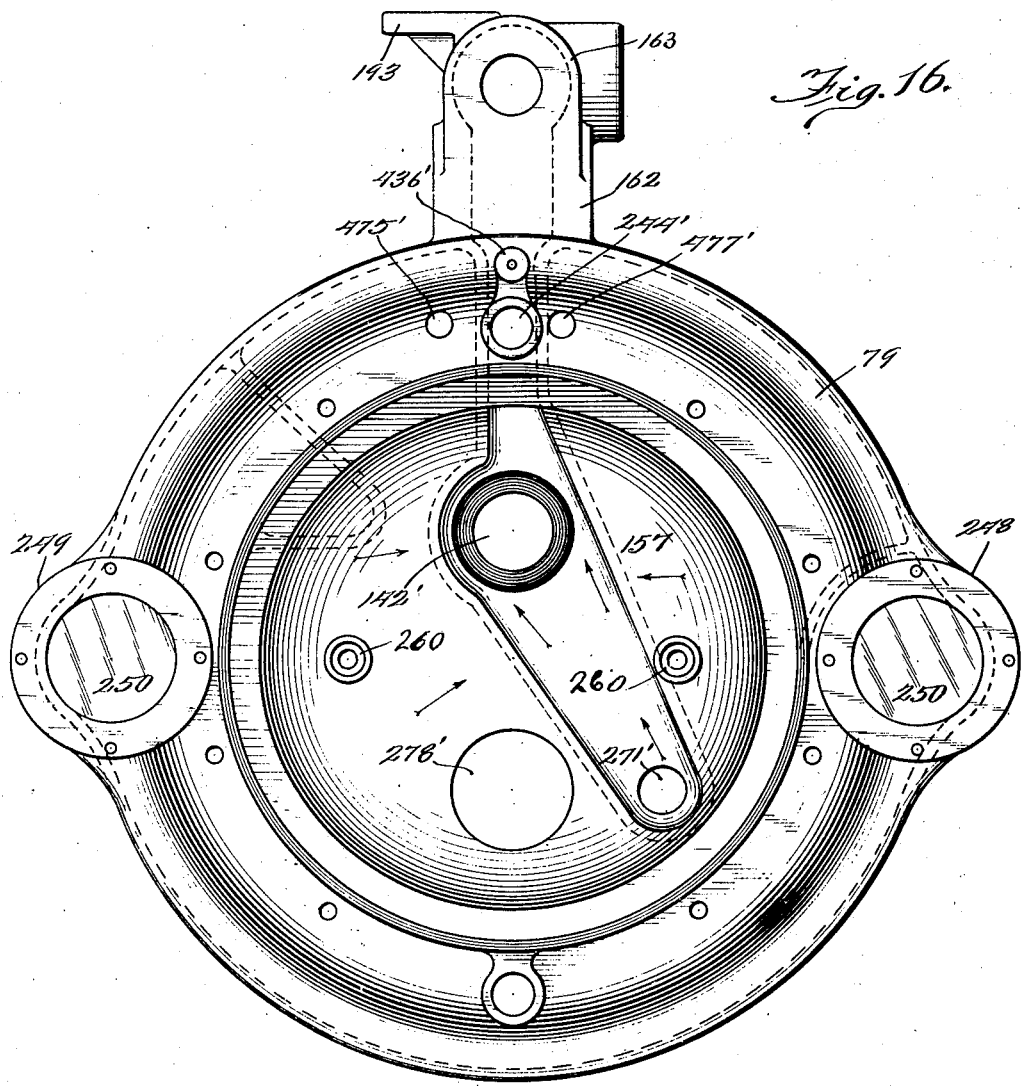

July 28, 1931. R. W. BOND 1,816,513
DISPENSING APPARATUS OF THE VISIBLE TYPE
Filed March 18, 1929 35 Sheets-Sheet 15
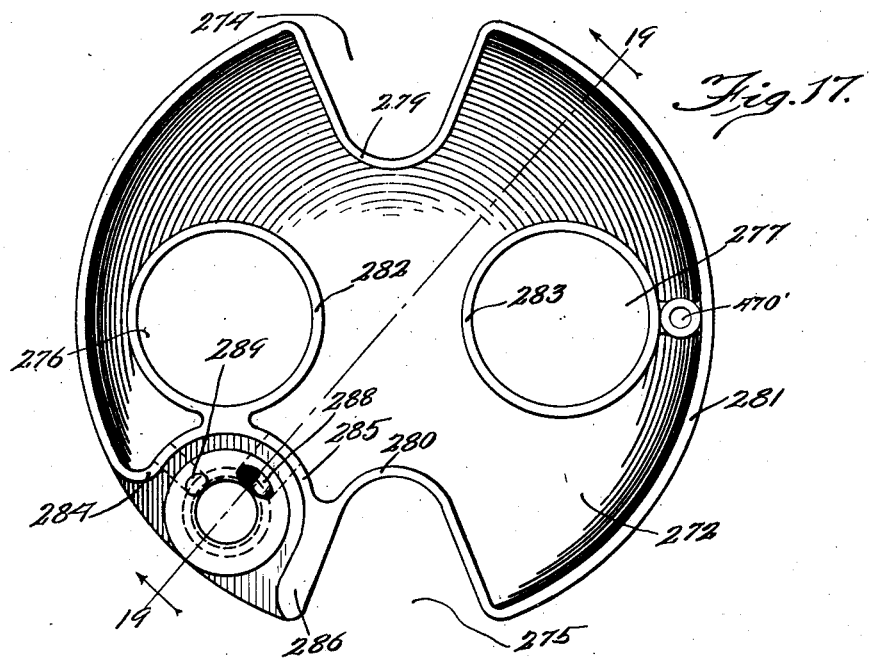
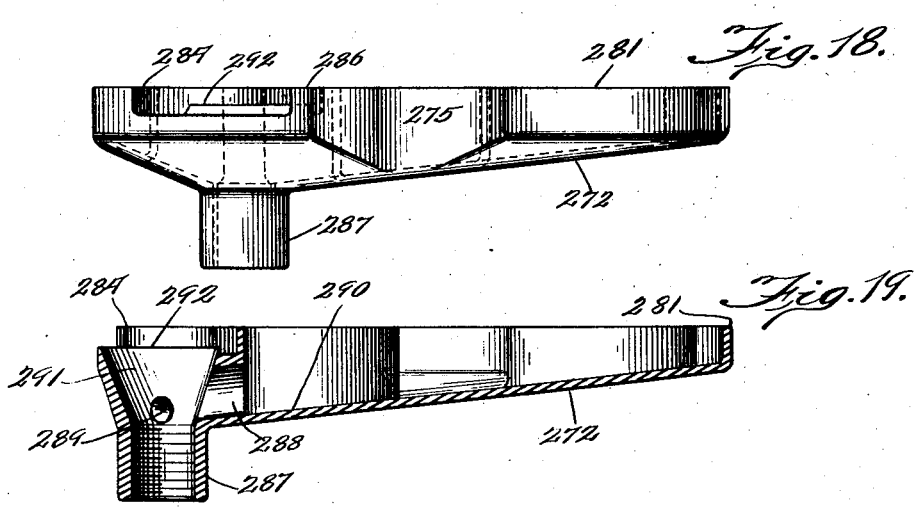

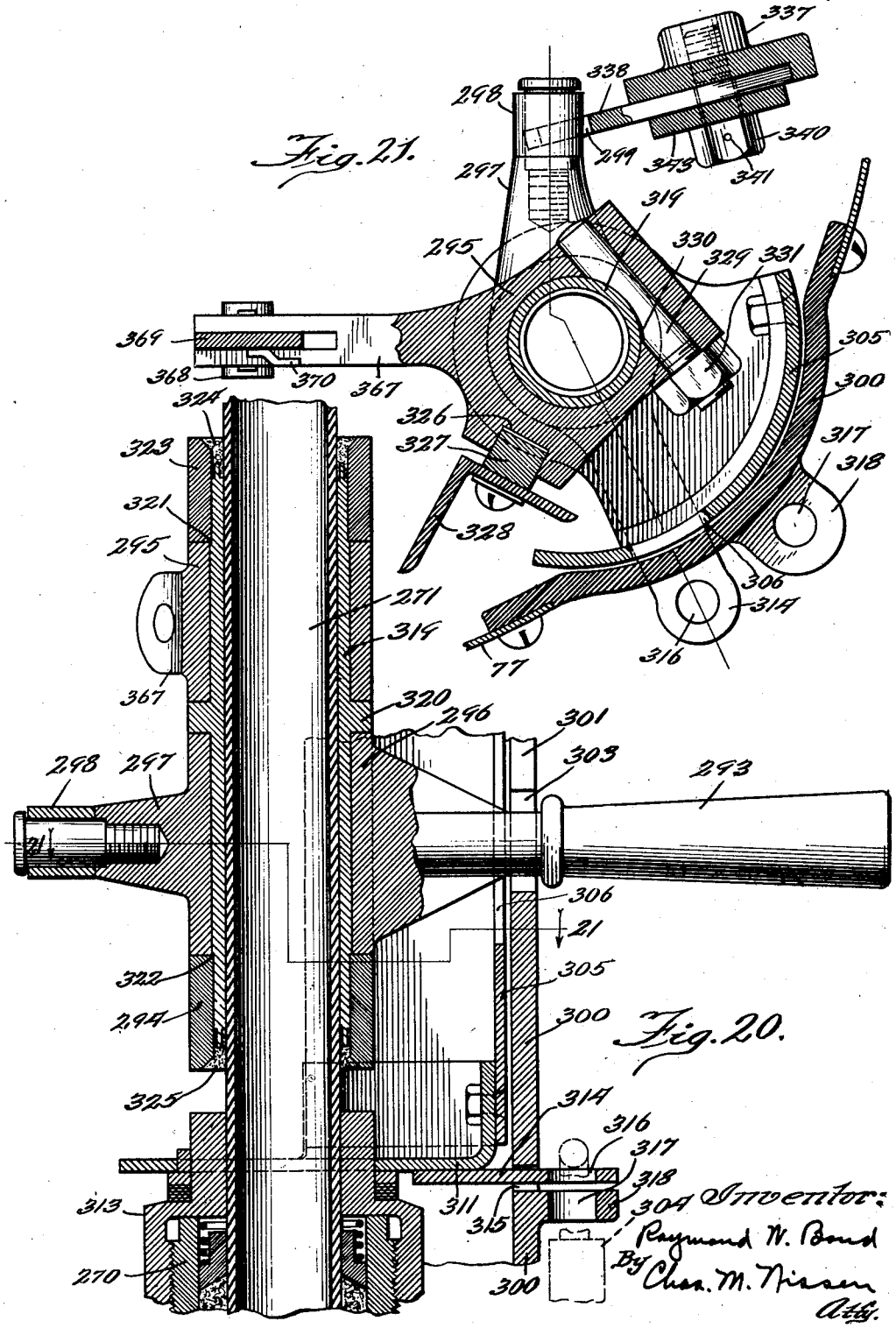

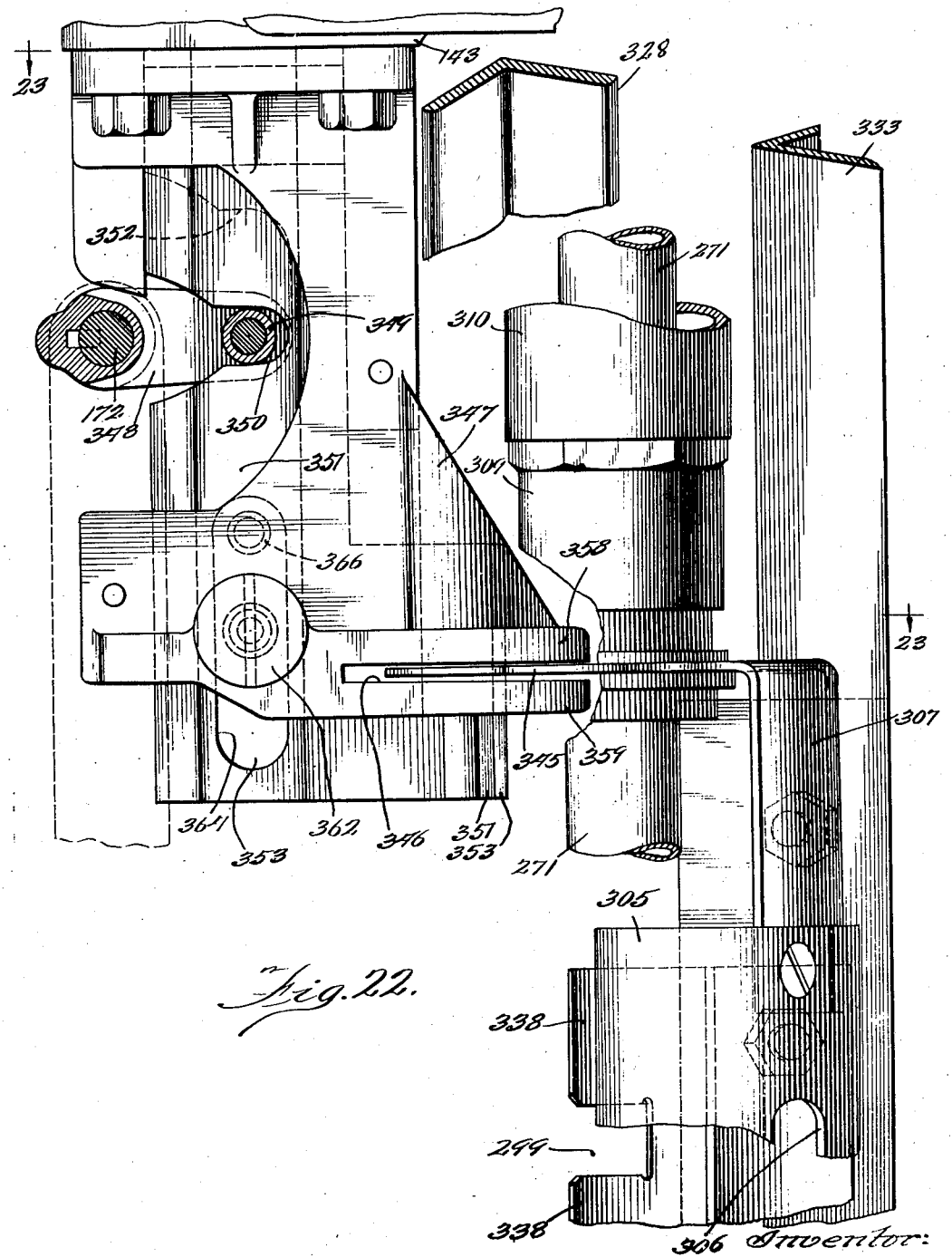

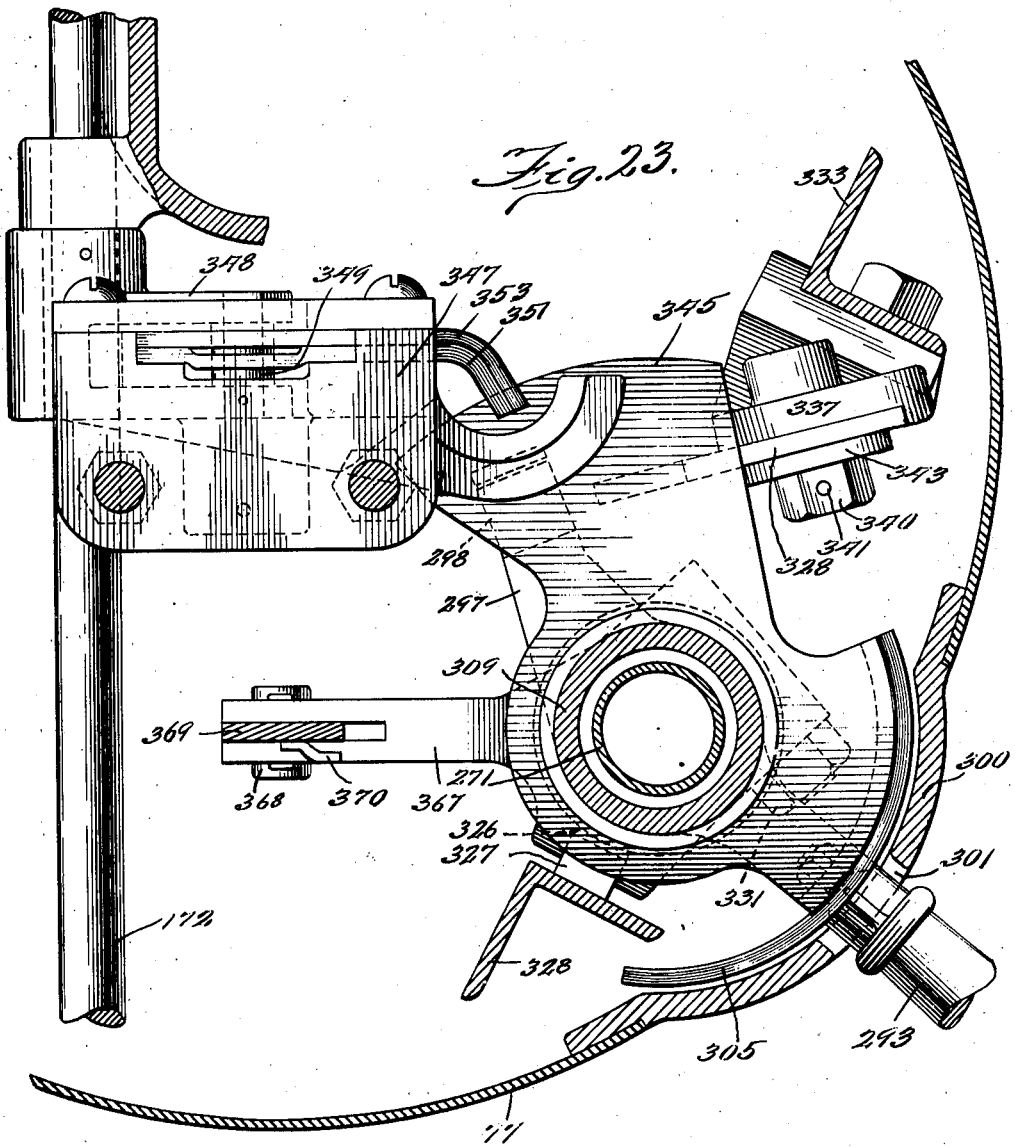

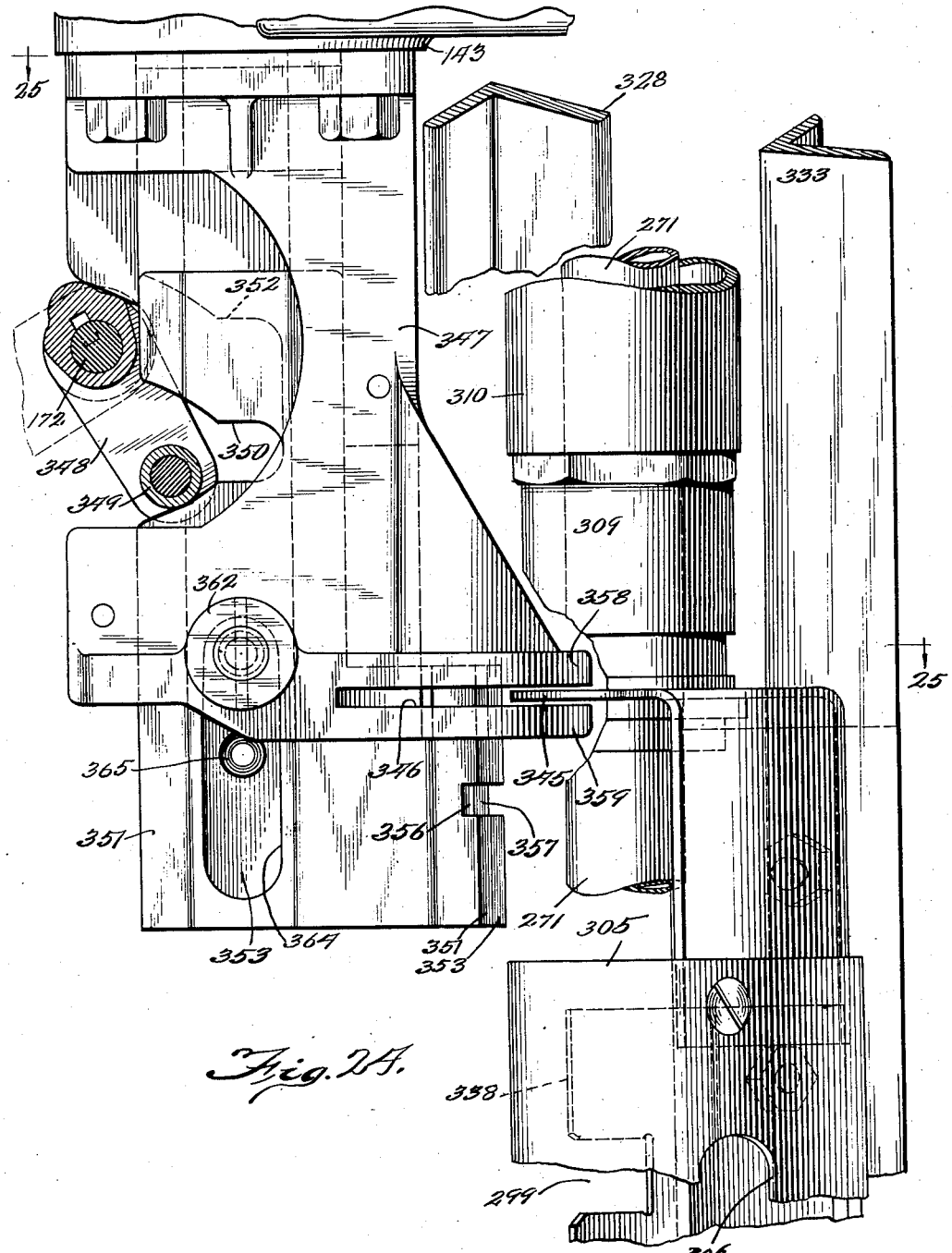

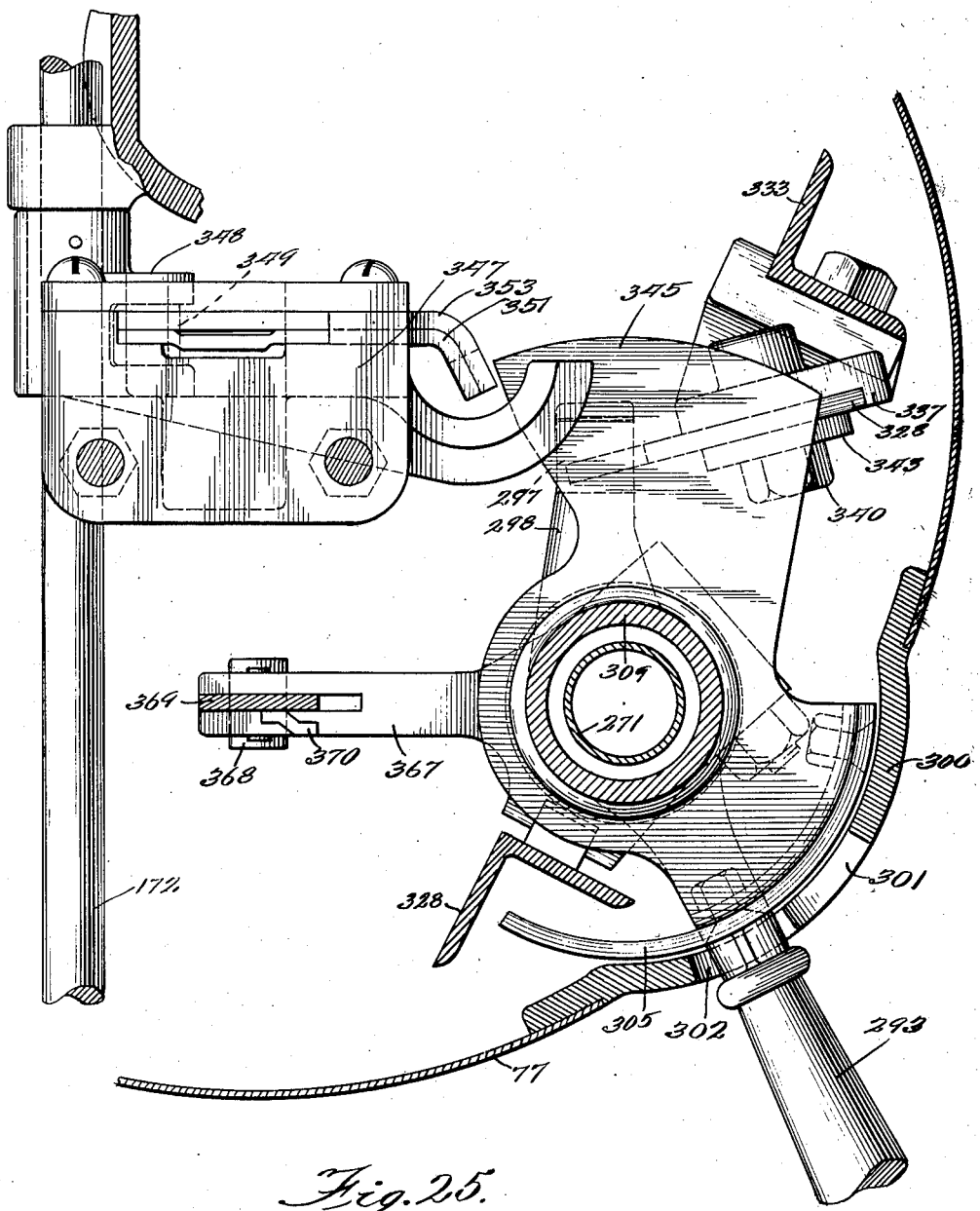

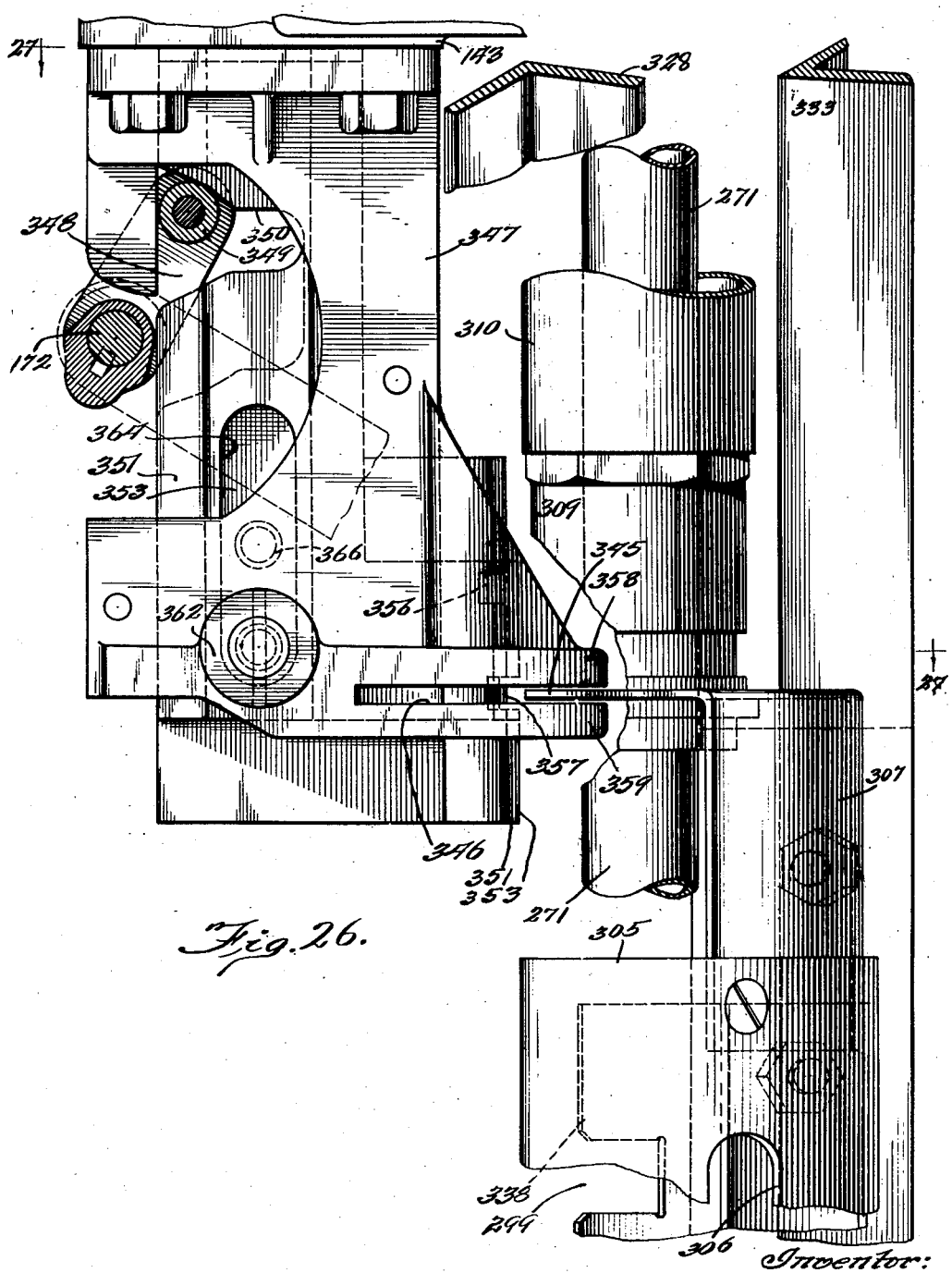

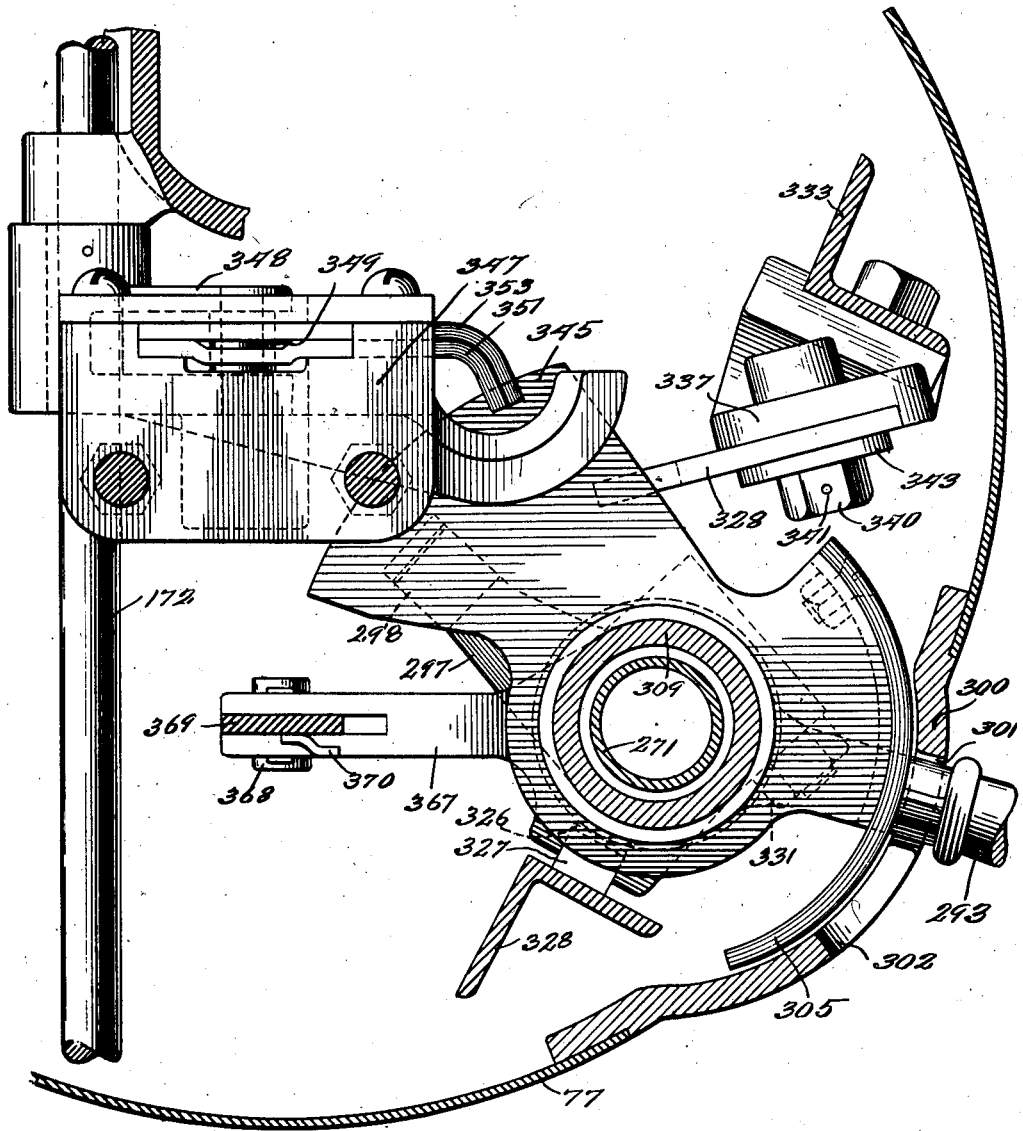

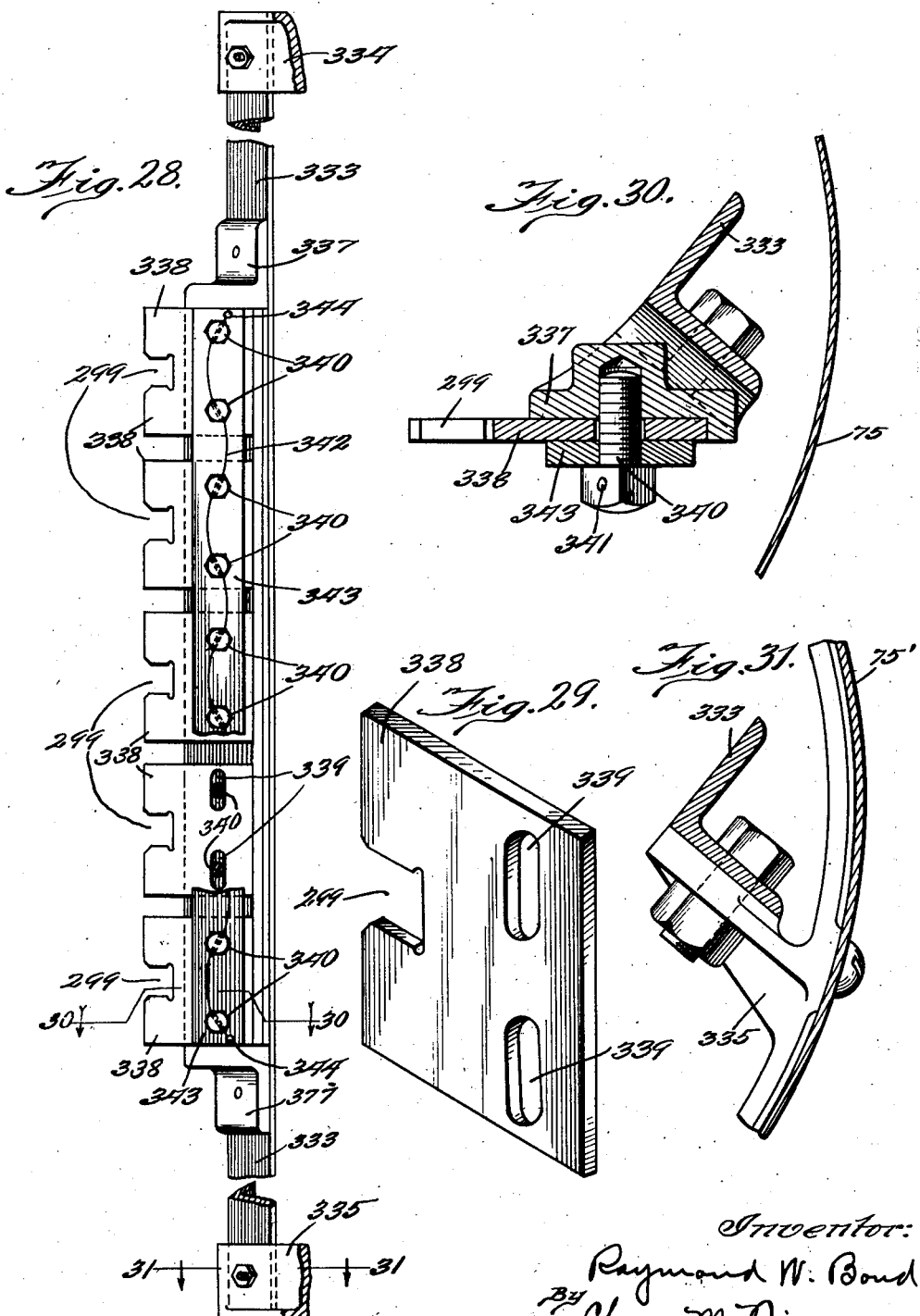

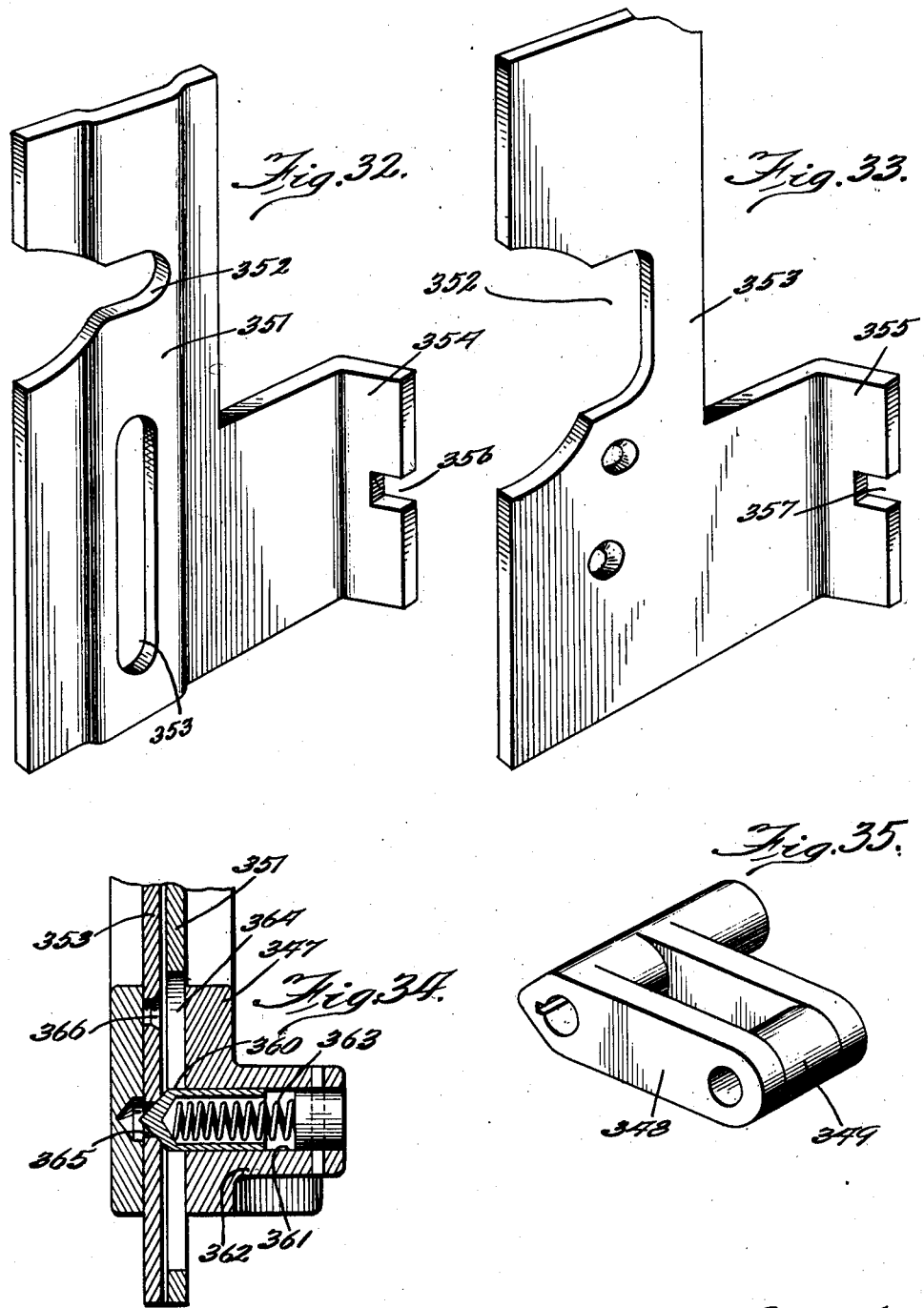

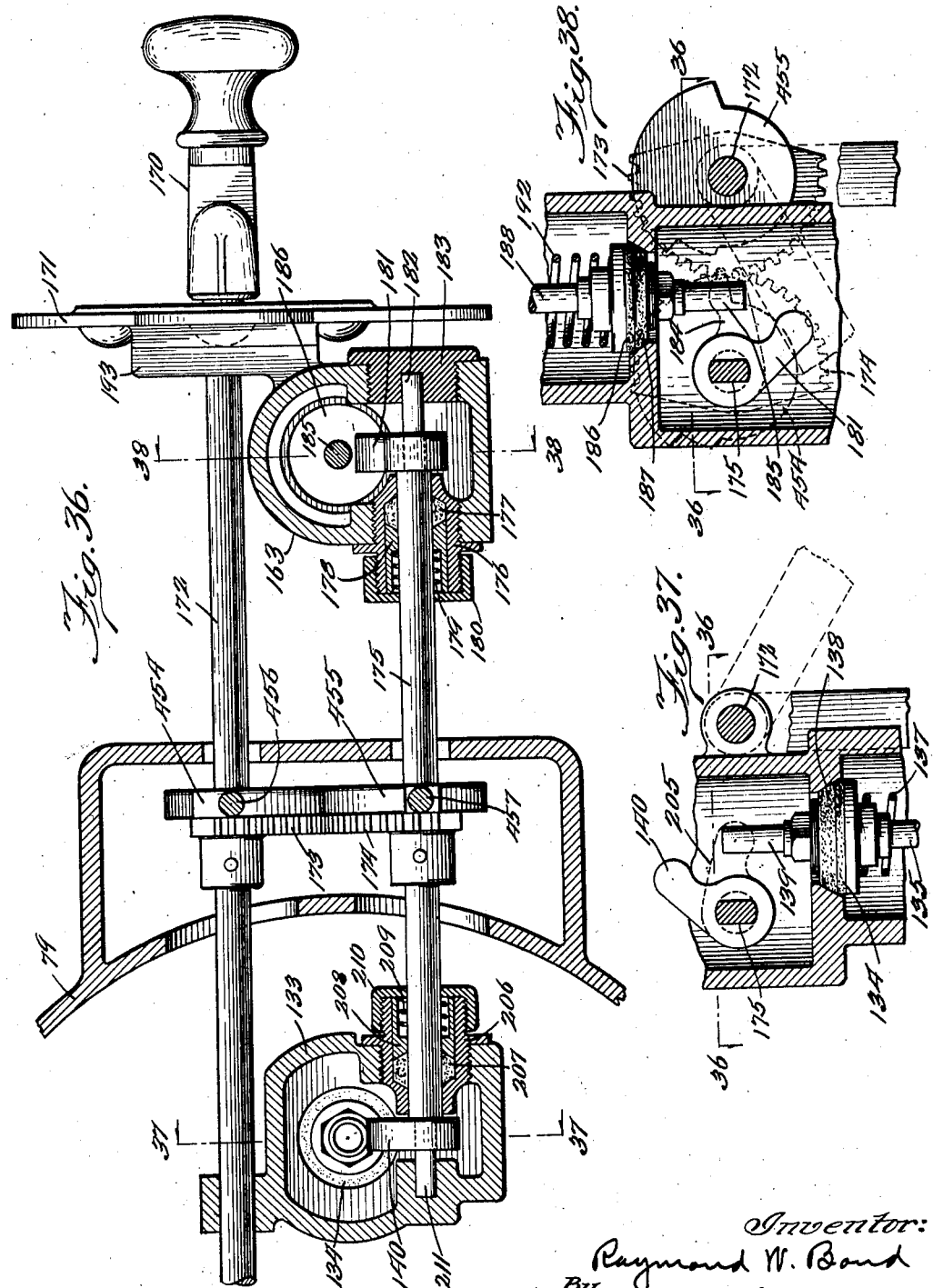

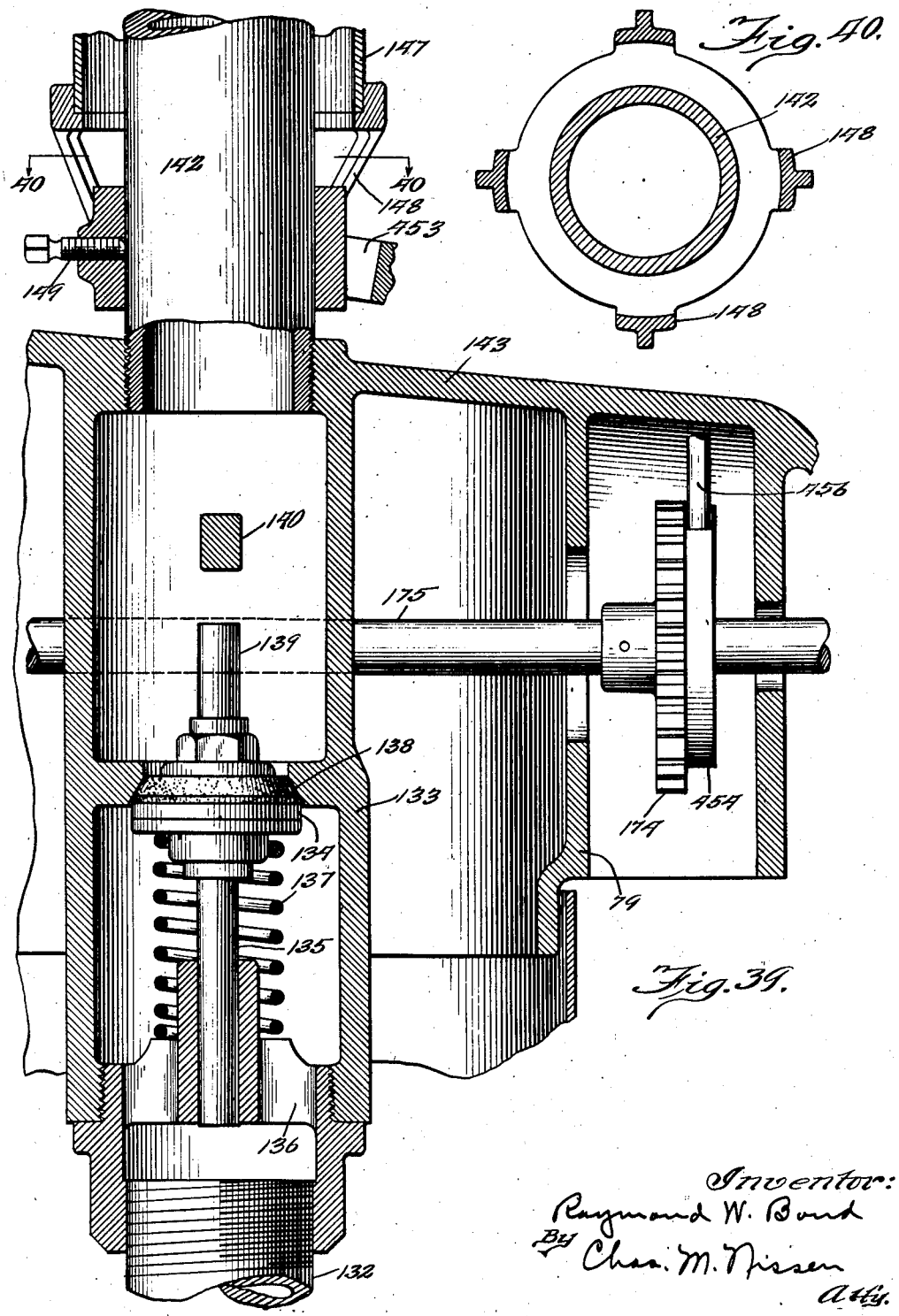

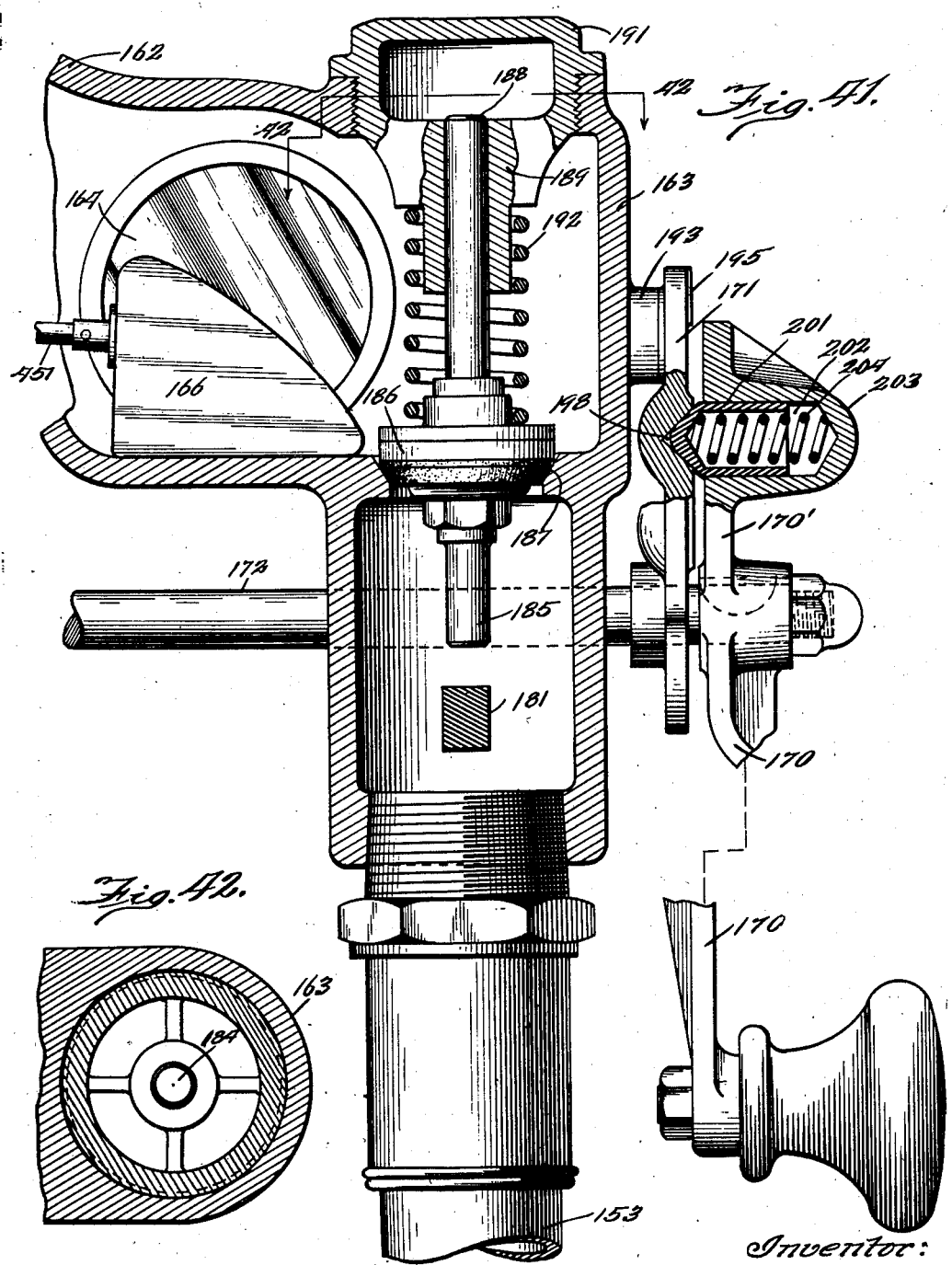

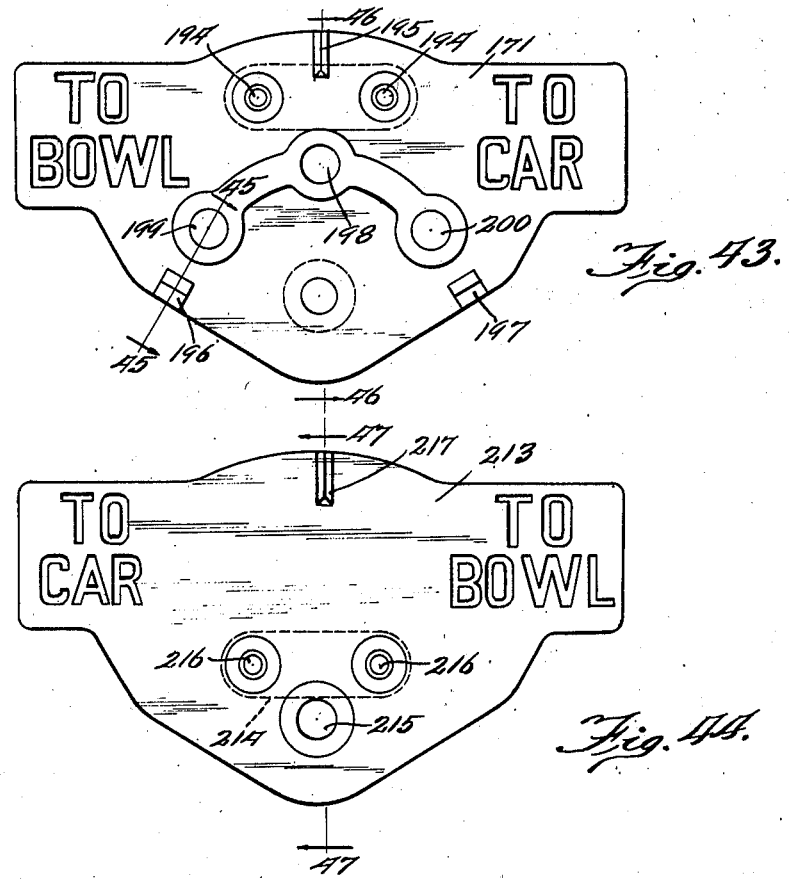
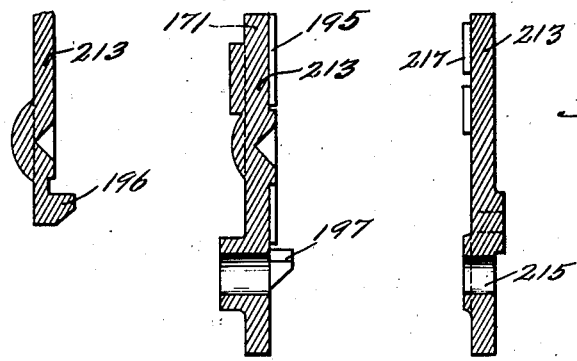

July 28, 1931.  R. W. BOND  1,816,513
DISPENSING APPARATUS OF THE VISIBLE TYPE
Filed March 18, 1929   35 Sheets-Sheet 29
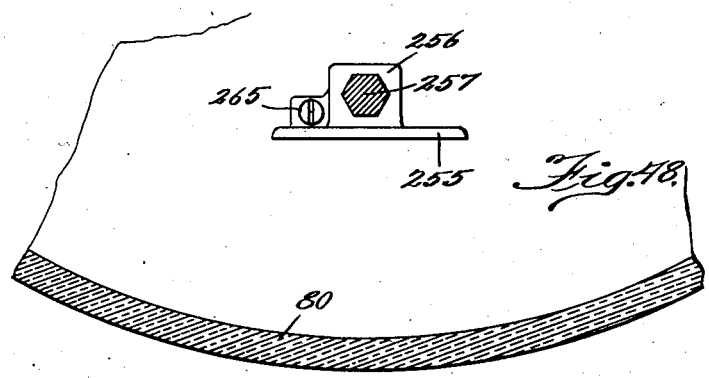
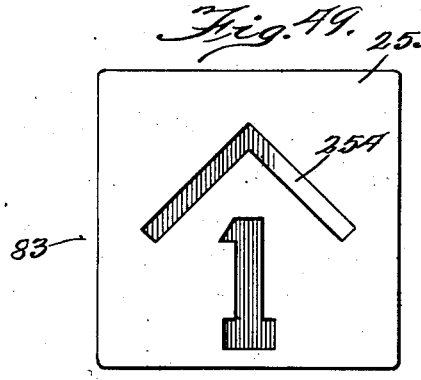
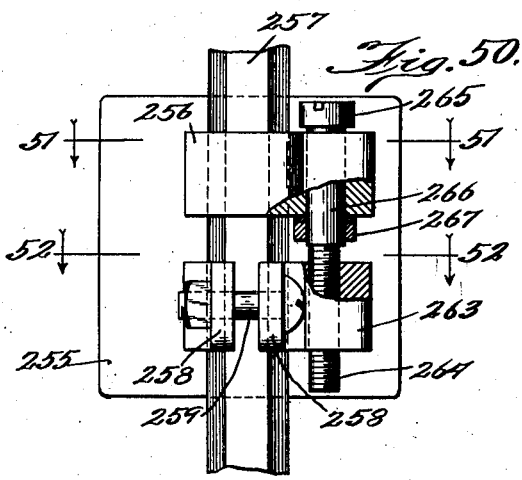
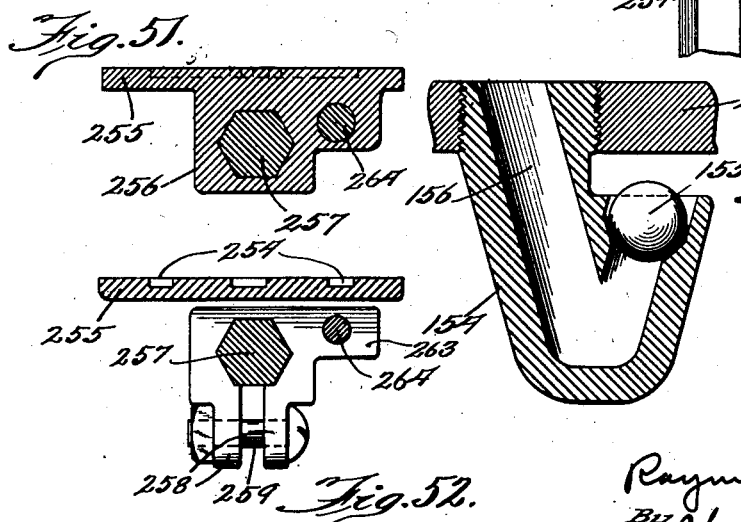

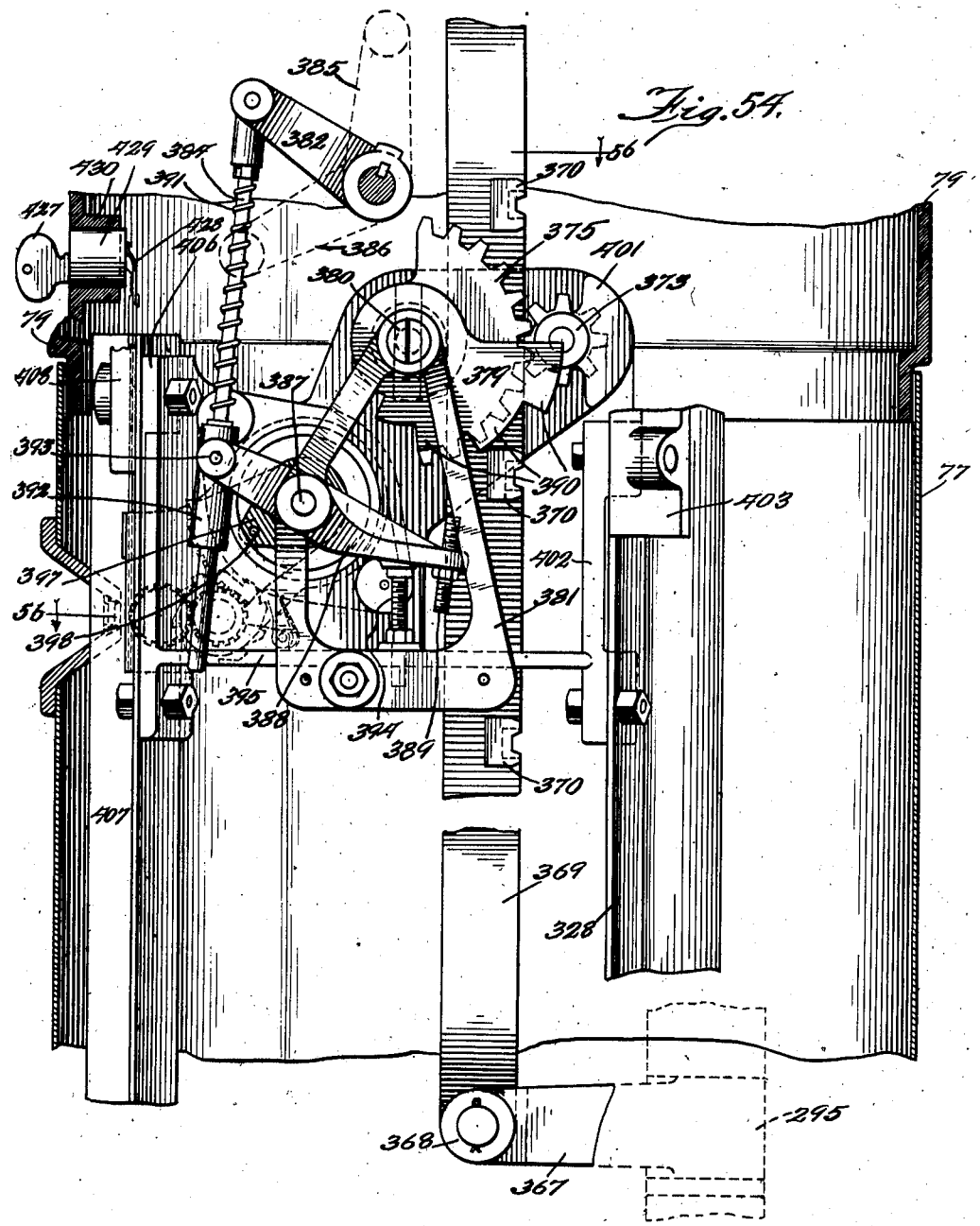

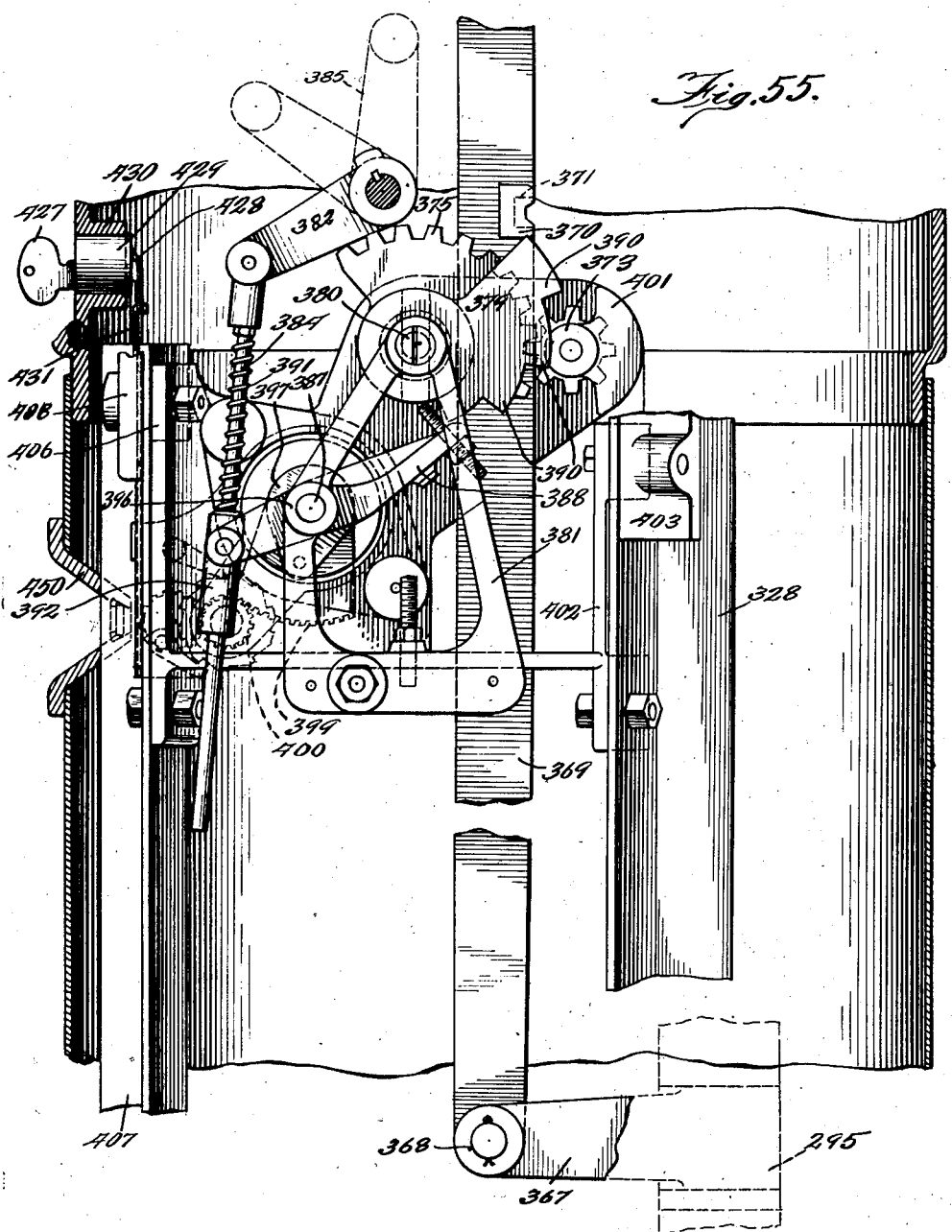

July 28, 1931. R. W. BOND 1,816,513
DISPENSING APPARATUS OF THE VISIBLE TYPE
Filed March 18, 1929 35 Sheets-Sheet 32

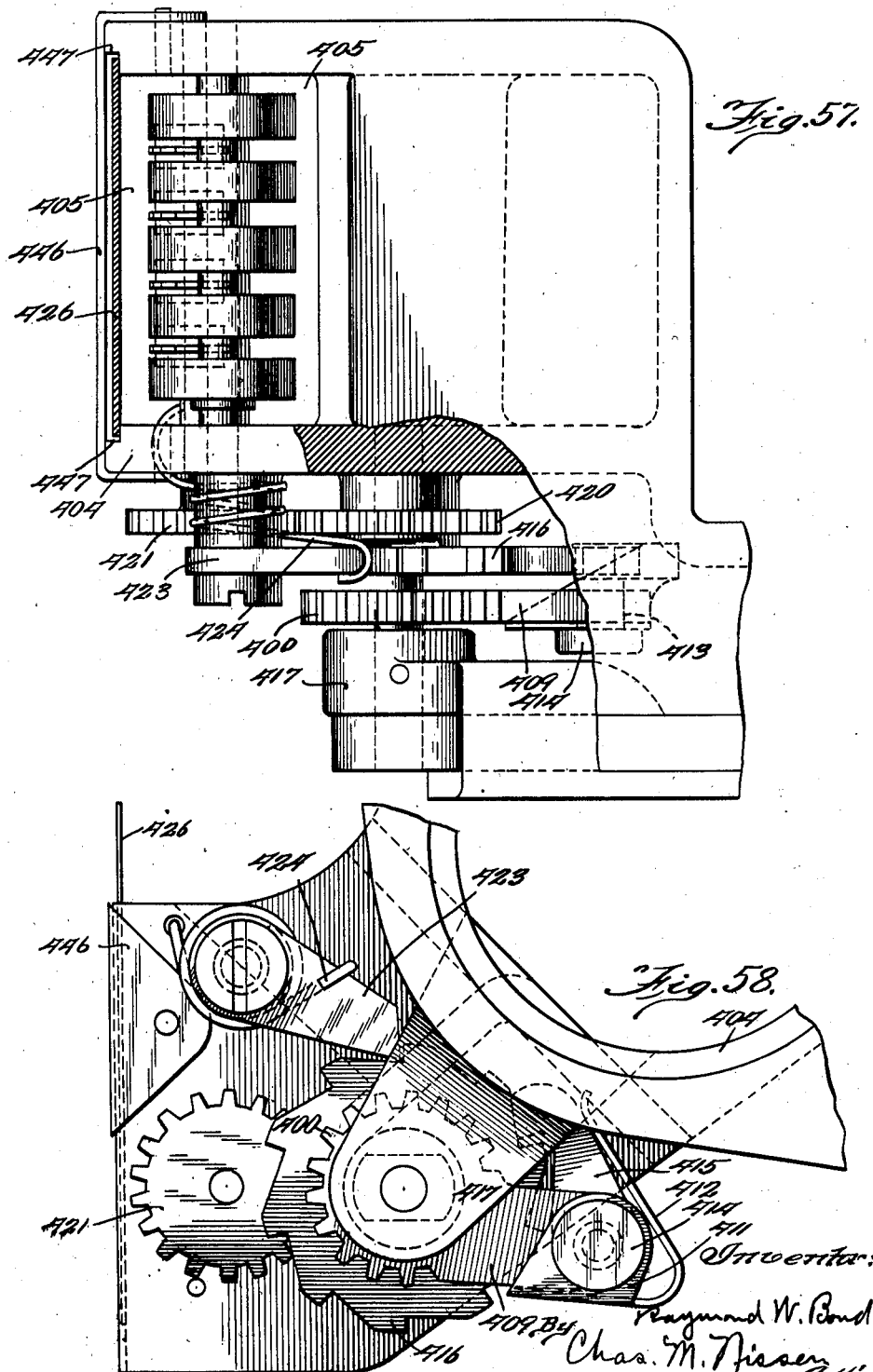

July 28, 1931. R. W. BOND 1,816,513
DISPENSING APPARATUS OF THE VISIBLE TYPE
Filed March 18, 1929 35 Sheets-Sheet 34
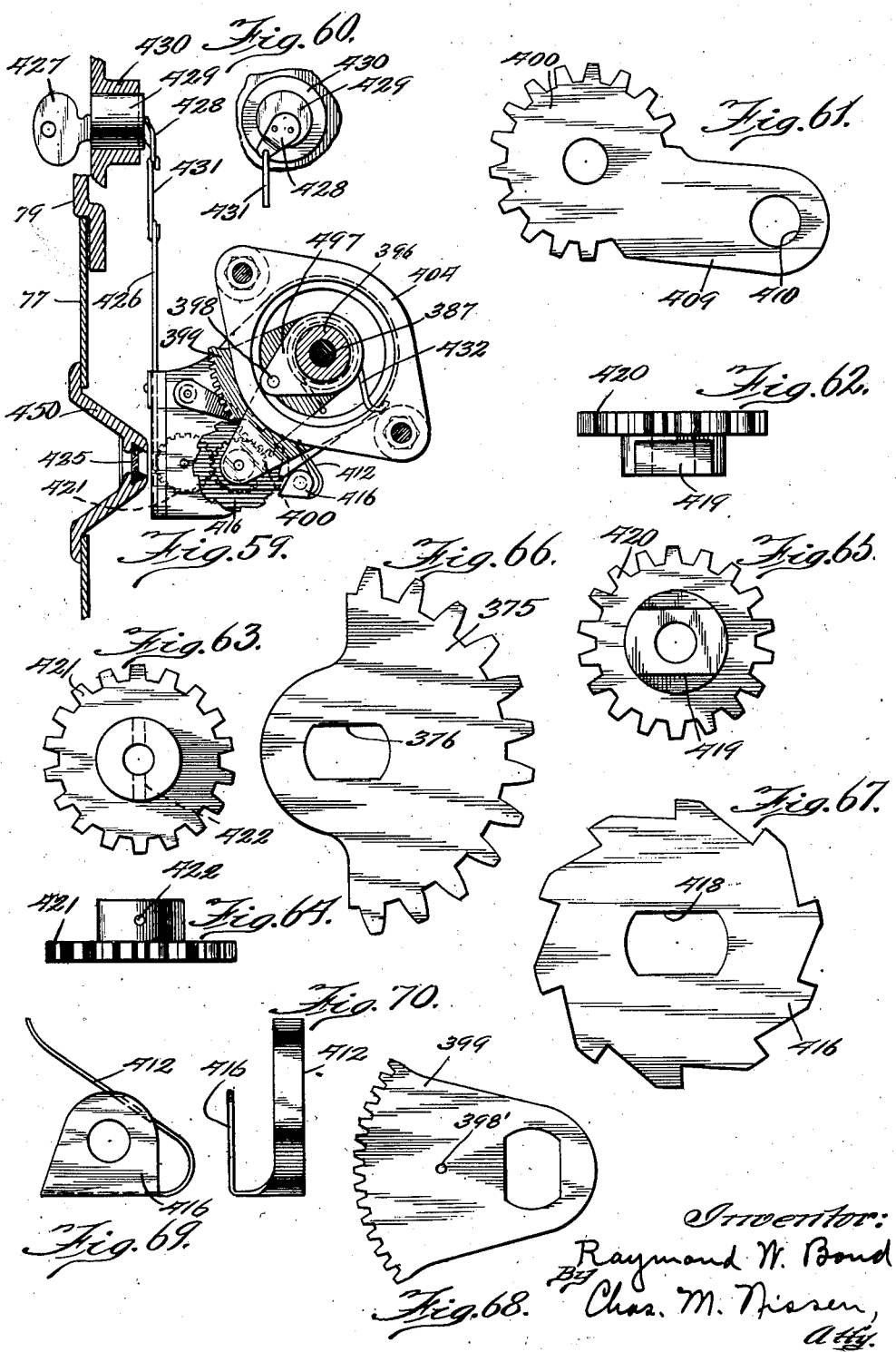

July 28, 1931. R. W. BOND 1,816,513
DISPENSING APPARATUS OF THE VISIBLE TYPE
Filed March 18, 1929 35 Sheets-Sheet 35

Inventor:
Raymond W. Bond
By Chas. M. Niasen
Atty.

Patented July 28, 1931

1,816,513

UNITED STATES PATENT OFFICE

RAYMOND W. BOND, OF FORT WAYNE, INDIANA, ASSIGNOR TO S. F. BOWSER & COMPANY, INC., OF FORT WAYNE, INDIANA, A CORPORATION OF INDIANA

DISPENSING APPARATUS OF THE VISIBLE TYPE

Application filed March 18, 1929. Serial No. 347,939.

My invention relates to dispensing apparatus and although it is particularly adapted to visible liquid dispensing apparatus, it may have a general application as to many features thereof, and one of the objects of the invention is the provision of improved and simplified mechanism for assuring the delivery of predetermined quantities of liquid dispensed by the dispensing apparatus.

Another object of my invention is the provision of improved and efficient mechanism to compel the operator to completely fill the visible bowl of dispensing apparatus to the quantity desired to be dispensed before it is possible to discharge any liquid from the bowl, and thus prevent fraud.

Another object of the invention is the provision of improved and efficient mechanism to compel the operator to completely drain the bowl of dispensing apparatus before it is again possible to fill the bowl.

A further object of the invention is the provision of means to prevent the closing of the discharge valve after it has once been opened, until the bowl of dispensing apparatus is completely drained.

A further object of the invention is the provision of improved and simplified interlocking mechanism in dispensing apparatus to force the proper sequence of operations while operating the dispensing apparatus, and thus prevent fraud in the dispensing of the liquid.

Another object of the invention is the provision of simple and efficient means for locking the sliding tube in a predetermined quantity stop position during the entire cycle of operation of dispensing a predetermined quantity of liquid.

Another object of the invention is the provision of simple and efficient means to render it impossible to dispense any liquid while the visible container is being filled.

Another object of the invention is the provision of simple and efficient means to render it impossible to add any liquid to the visible container of dispensing apparatus while liquid is being dispensed from such container.

Another object of the invention is the provision of mechanism in which the operation of opening the valve for filling the visible container prevents the removal of the quantity set lever from its quantity stop position in which it has been previously placed, until the operation of fully opening the discharge valve has been performed and the operator's control lever has been returned to neutral position.

Another object of the invention is the provision of mechanism in dispensing apparatus to prevent the operation of either the fill valve or the discharge valve when the quantity set lever is not in a quantity stop slot.

A further object of the invention is the provision of mechanism comprising a door actuated by the quantity set lever to entirely close the opening in the housing of the dispensing apparatus, in which the quantity set lever travels, when such quantity set lever is moved to quantity stop position.

A further object of the invention is the provision of actuating means for locking the fill valve and the discharge valve during the time that the quantity set lever is not in a quantity stop position.

Another object of the invention is the provision of mechanism by means of which the entire dispensing apparatus may be locked by a single lock.

A further object of the invention is the provision of mechanism in dispensing apparatus in which the adjustment of the quantity stops does not change the amount registered.

A further object of the invention is the provision of mechanism in which the total of the amount to be registered is dependent upon a sliding tube of the liquid dispensing apparatus, which sliding tube in turn constitutes the means for controlling the amount of liquid dispensed.

Another object of the invention is the provision of improved and efficient sliding overflow mechanical measuring mechanism.

Another object of the invention is the provision of an overflow measurement funnel in a visible or other container of dispensing apparatus, having a relatively large contour adjacent the inner walls of the container in which said funnel is located.

A further object of the invention is the provision of a relatively large and expanded upper intake opening of a sliding tube in a visible or other container of dispensing apparatus to more accurately predetermine the quantiy of liquid dispensed by the positioning of said sliding tube within said container.

Another object of the invention is the provision of an enlarged intake opening of a sliding measuring tube in a visible or other container of dispensing apparatus to enable the cost of construction and assembly to be reduced while maintaining such accuracy that a small variation in the height of such intake opening may occur without varying the predetermined quantity of liquid dispensed any more than a small fraction thereof.

Another object of the invention is the provision of improved and efficient canopy protecting mechanism for dispensing apparatus of the visible type for rendering the visible container thereof accessible from its upper end.

Another object of the invention is the provision of improved and efficient centrifugal mechanism for separating impurities from the liquid dispensed in the dispensing apparatus.

Another object of the invention is the provision of an air expansion chamber in very compact relation with a filter screen so that the same structure which affords support for the filter screen may also serve to provide the desired air expansion chamber.

Another object of the invention is the provision of improved and efficient filling mechanism for visible or other containers of dispensing apparatus to assure the downward movement of the liquid when entering the container and thereby reduce aeration of the liquid to a minimum.

A further object of the invention is the provision of improved and efficient mechanism for operating the dispensing apparatus from either side thereof.

Another object of the invention is the provision of an improved sight-glass and indicator mechanism for liquid dispensing apparatus.

A further object of the invention is the provision of improved and efficient indicators of the reflection type for visible containers of dispensing apparatus.

Another object of the invention is the provision of improved guards for glass containers of dispensing apparatus spaced apart to provide openings on opposite sides of the container for visibility of indicators of the reflection type arranged within the glass container.

Another object of the invention is the provision of improved and efficient means for accurately registering the total quantity of liquid dispensed by the dispensing apparatus.

Another object of the invention is the provision of means for easily adapting totalizing counter-mechanism to various capacities of visible bowls or other containers of dispensing pumps to which it may be desired to connect such totalizing counter-mechanism.

A further object of the invention is the provision of simple and efficient means for setting the mechanism to register each of the different quantities dispensed combined with means for securely holding the same in each of such positions.

A further object of the invention is the provision of improved and efficient means for operating quantity registering mechanism in connection with the operation of the discharge valve so that complete registration will be made before the discharge valve is opened, thereby preventing fraud in the dispensing of the gasoline from the dispensing unit.

Another object of the invention is the provision of improved means operable at each successive time that the discharge valve is opened or moved from neutral position to discharge position to cause the quantity counting-mechanism to repeat the registration of the number of gallons dispensed.

A further object of the invention is the provision of improved mechanism associated with the discharge valve shaft so that one portion which controls the amount registered is set and operated separately and independently of the other portion which is actuated by the discharge valve shaft and effects the registration of the number of gallons for which the mechanism has been set.

A further object of the invention is the provision of improved mechanism for preventing adjustment of the quantity stops from changing the amount registered by quantity counter-mechanism.

Another object of the invention is the provision of improved means for controlling the amount to be registered by quantity counter-mechanism comprising mechanism connected to and operated by a sliding tube of liquid dispensing apparatus, which sliding tube in turn constitutes means for controlling the amount of liquid dispensed Another object of the invention is the provision of mechanism associated with an overflow pipe of dispensing apparatus for setting the quantity counter-mechanism in accordance with the control of the liquid dispensed effected by the setting of the overflow pipe.

Another object of the invention is the provision of improved means for preventing the totalizing counter-mechanism from being read and the total amount of liquid dispensed over a period of time being known, except by authorized persons.

Other objects of the invention will appear hereinafter, the novel features and combinations being set forth in the appended claims.

In the accompanying drawings—

Figs. 1 and 2 are elevational views of visible dispensing units embodying my invention;

Fig. 3 is a sectional elevation of the canopy structure and of the upper portion of the visible container with certain mechanism therein;

Fig. 4 is a sectional elevation of the lower portion of the visible container and of the manifold on which it is mounted;

Figure 5:
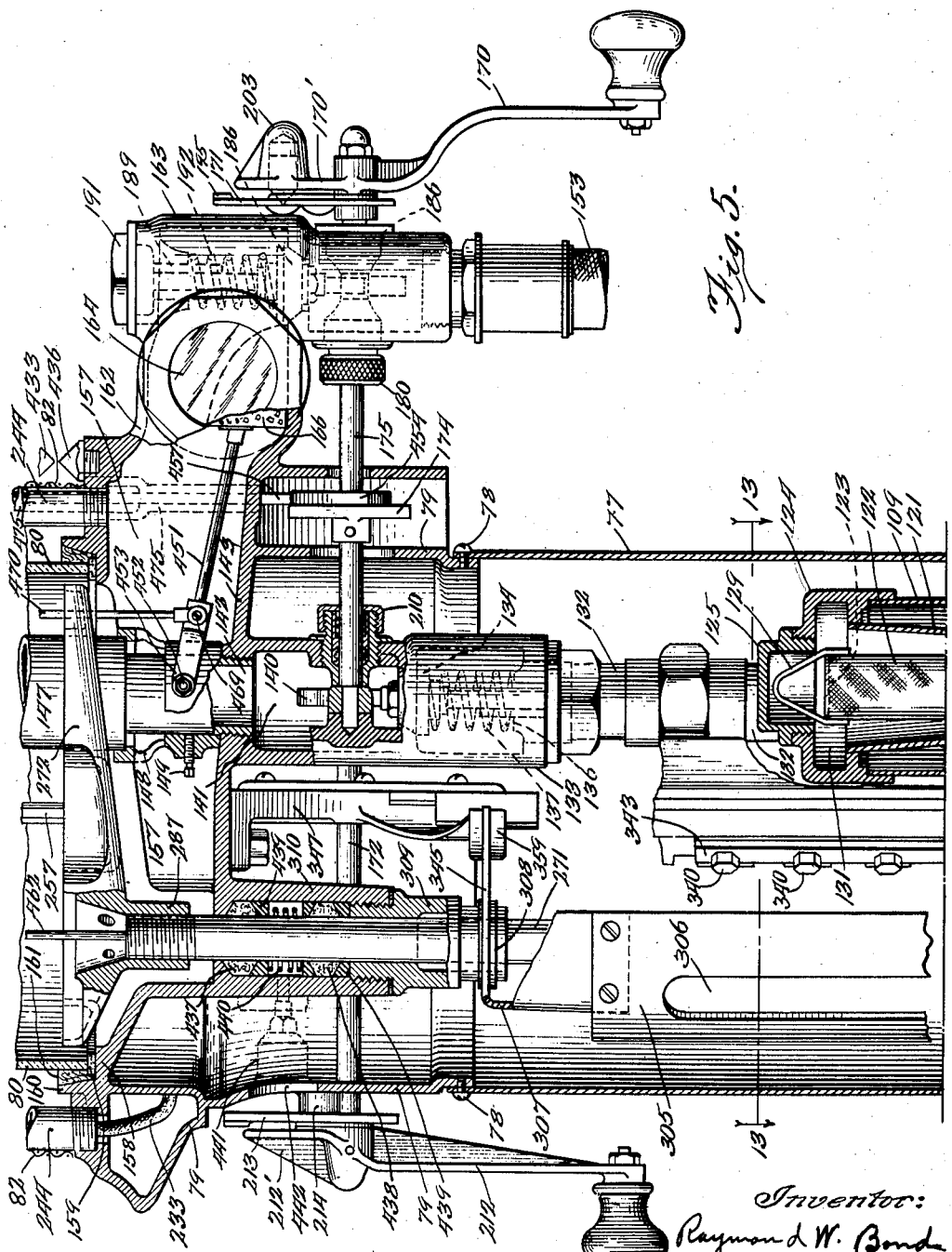
Fig. 5 is a sectional elevation of that portion of the dispensing unit comprising the manifold and the parts connected thereto.
Figure 6:
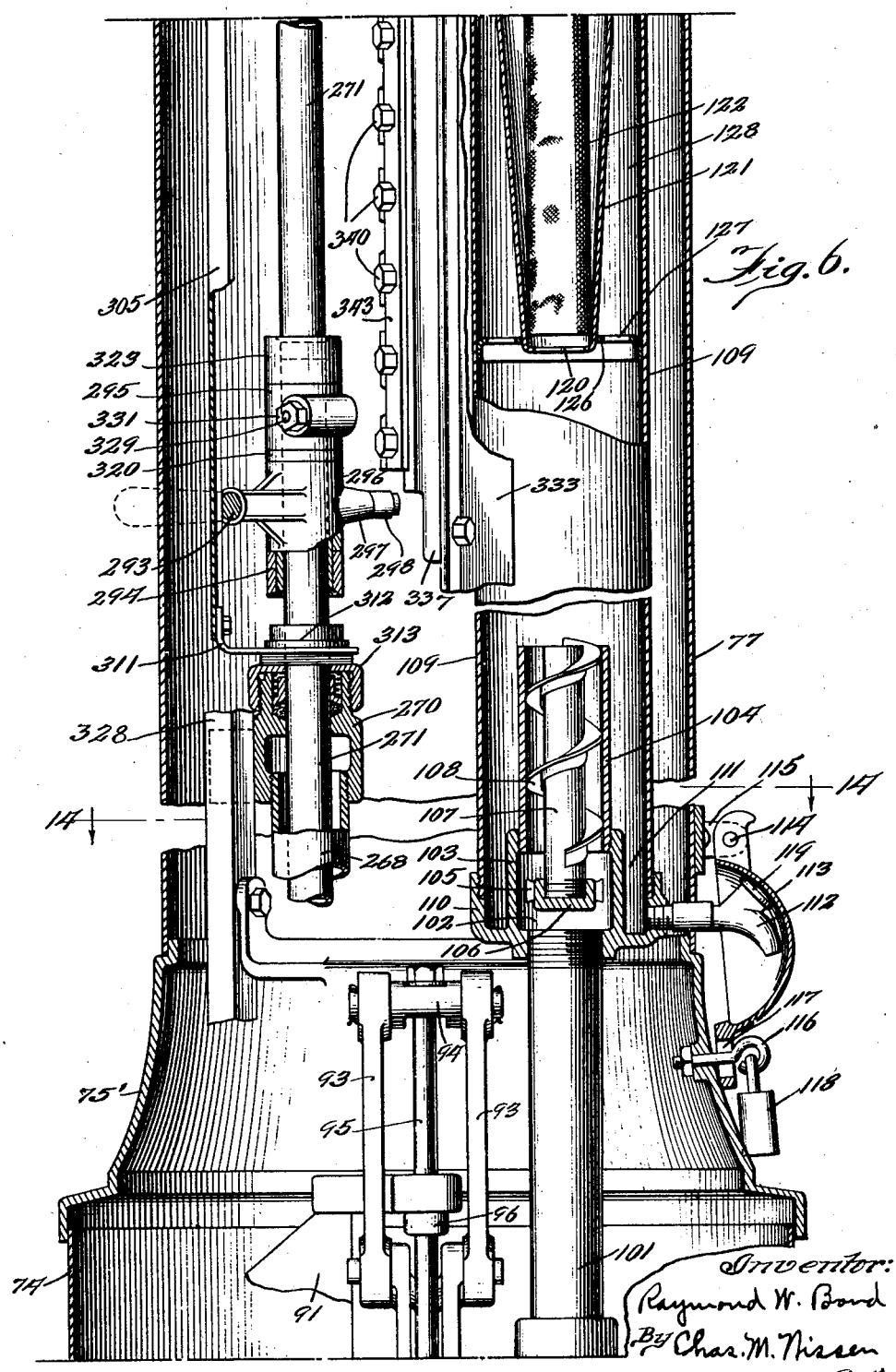
Fig. 6 is a sectional elevation of that portion of the structure extending below that shown in Fig. 5.
Figure 7:
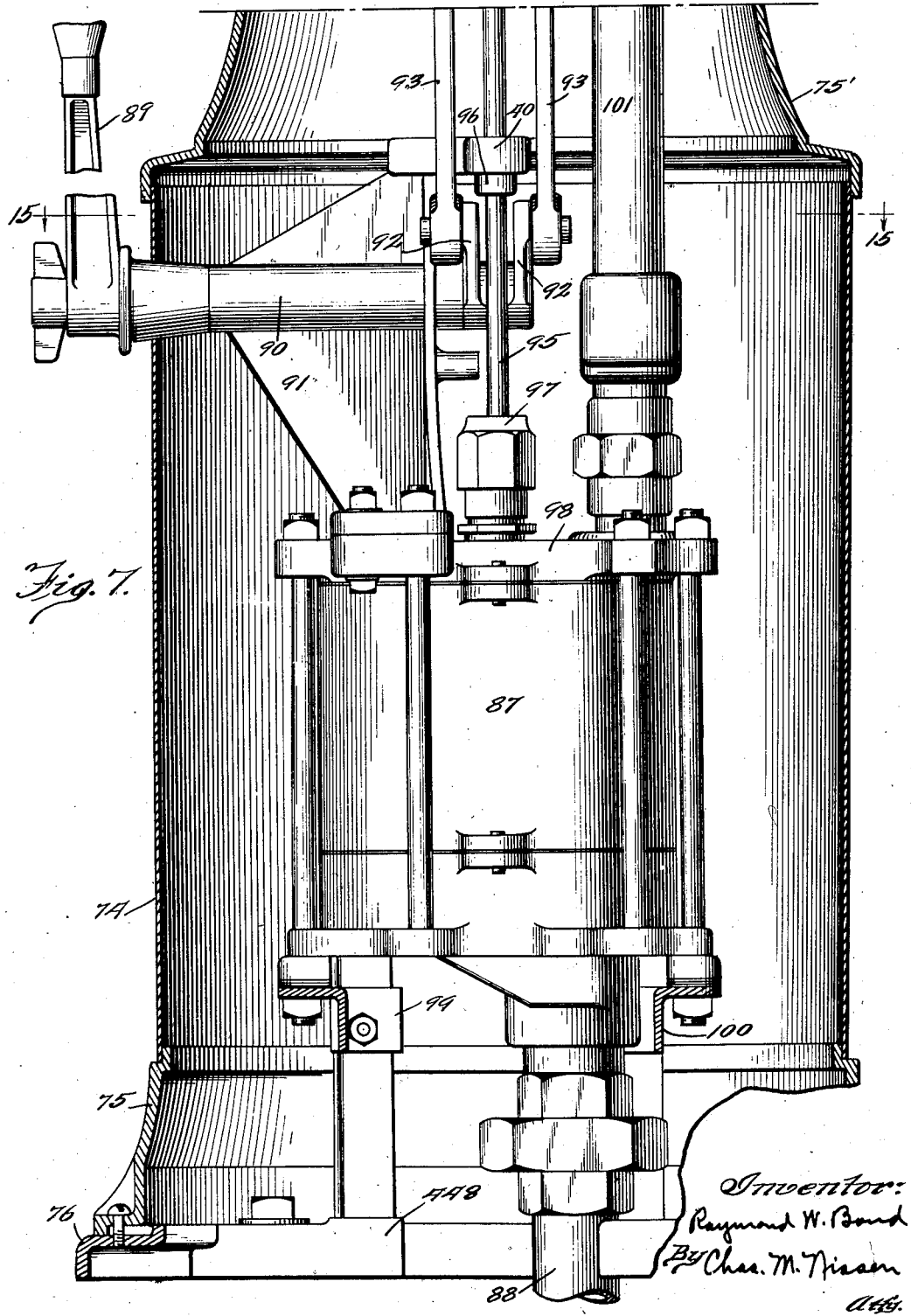
Fig. 7 is a sectional elevation of the housing at the base of the dispensing unit with the pumping apparatus shown therein in elevation, Figs. 3, 4, 5, 6 and 7 placed end to end constituting a complete sectional elevation of the entire dispensing unit shown in Fig. 1.
Figure 8:
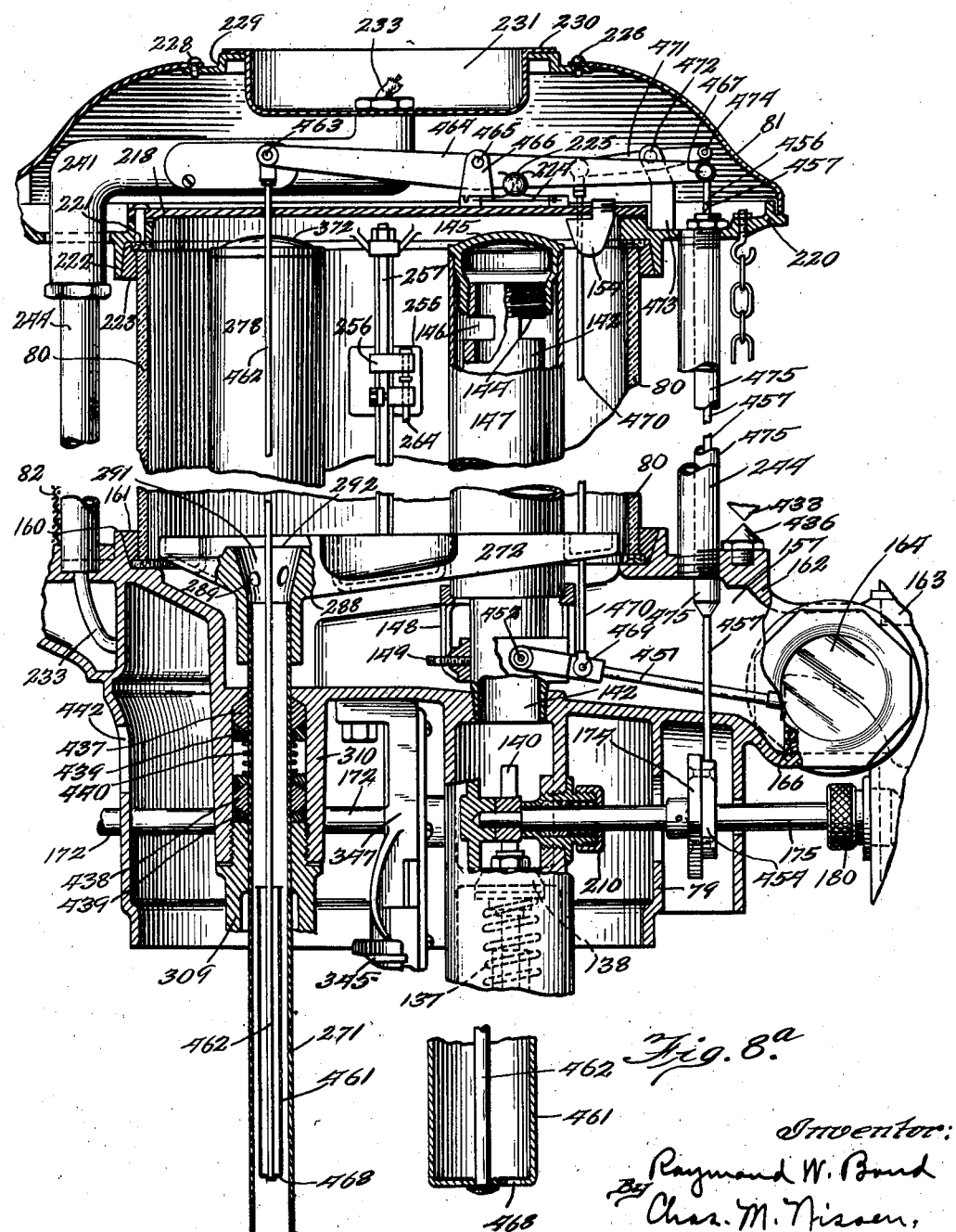
Fig. 8 is a sectional elevation of the upper and lower portions of the visible container and of the mechanism associated therewith.
Figure 9:
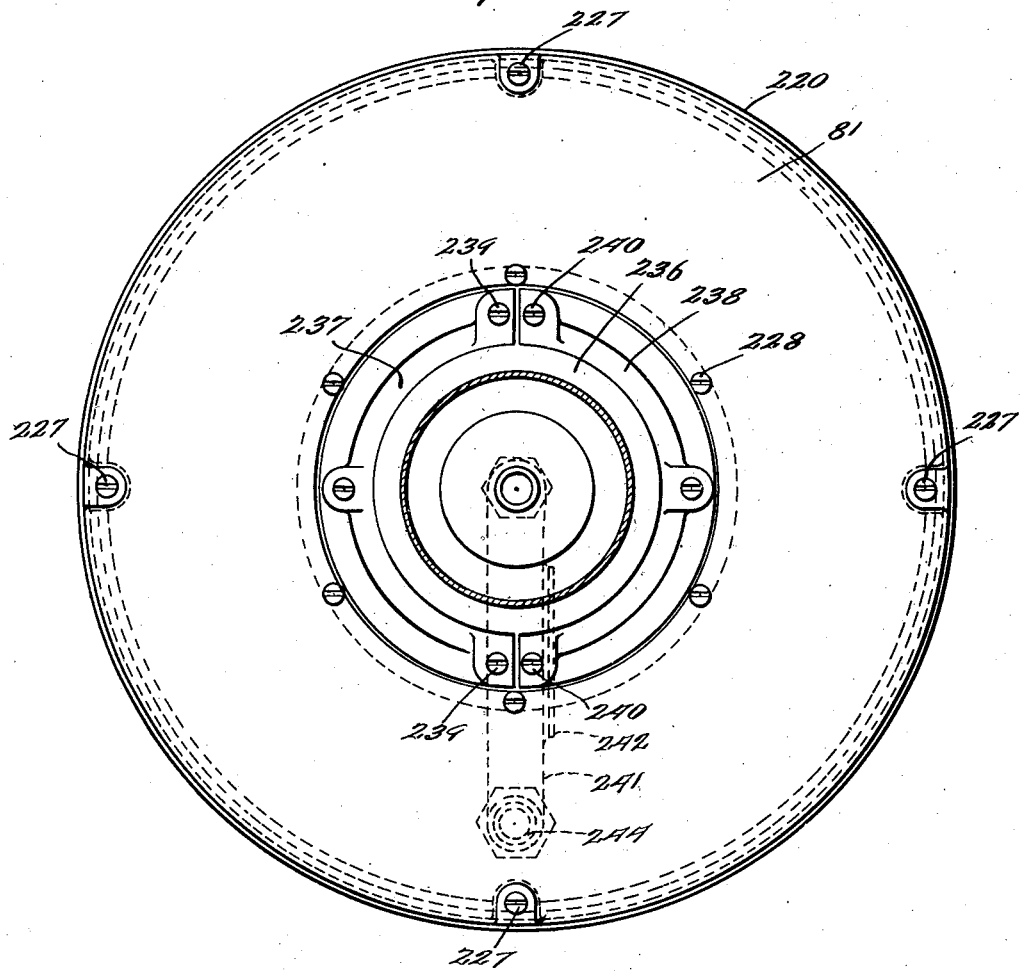
Figure 10:
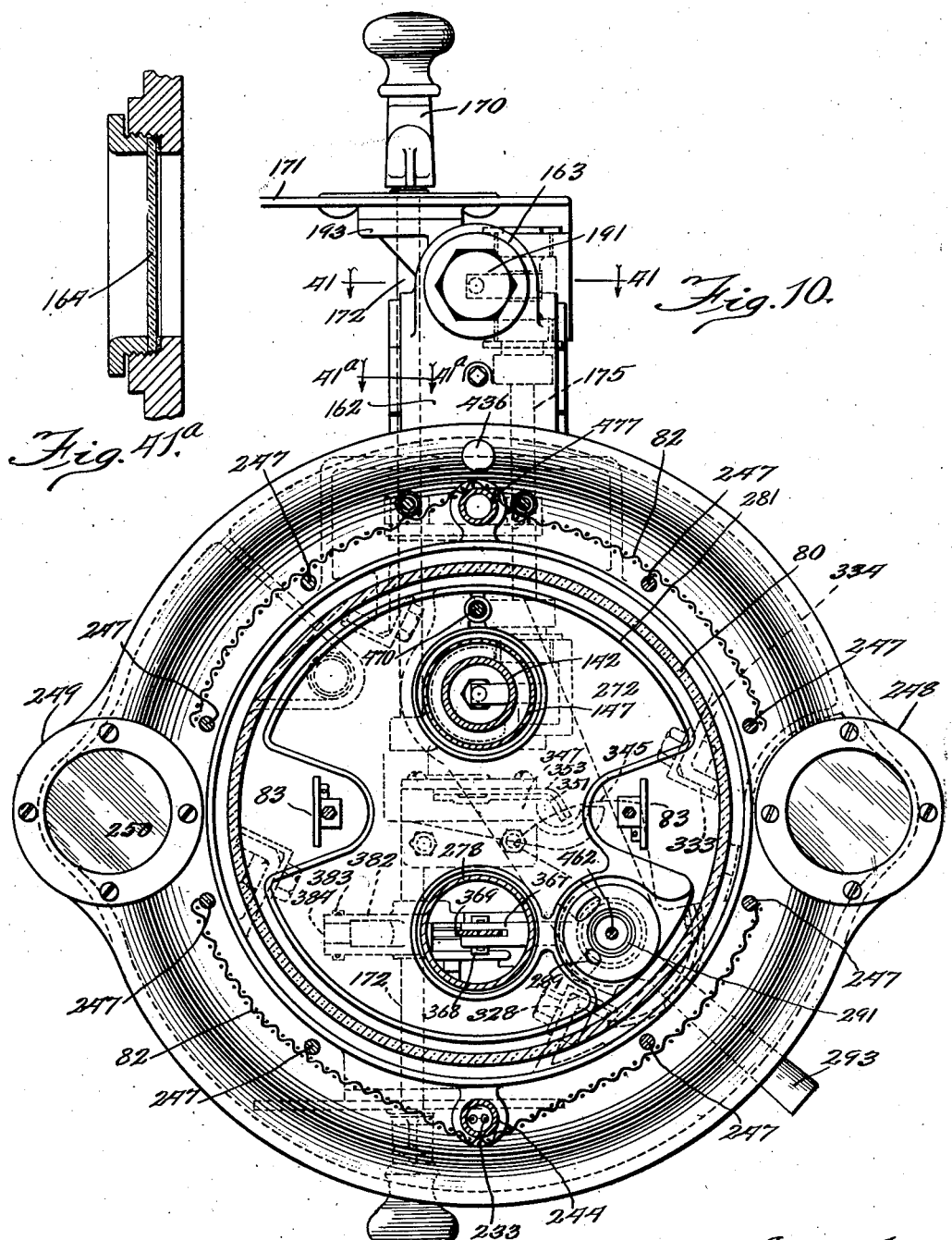
Figure 11:
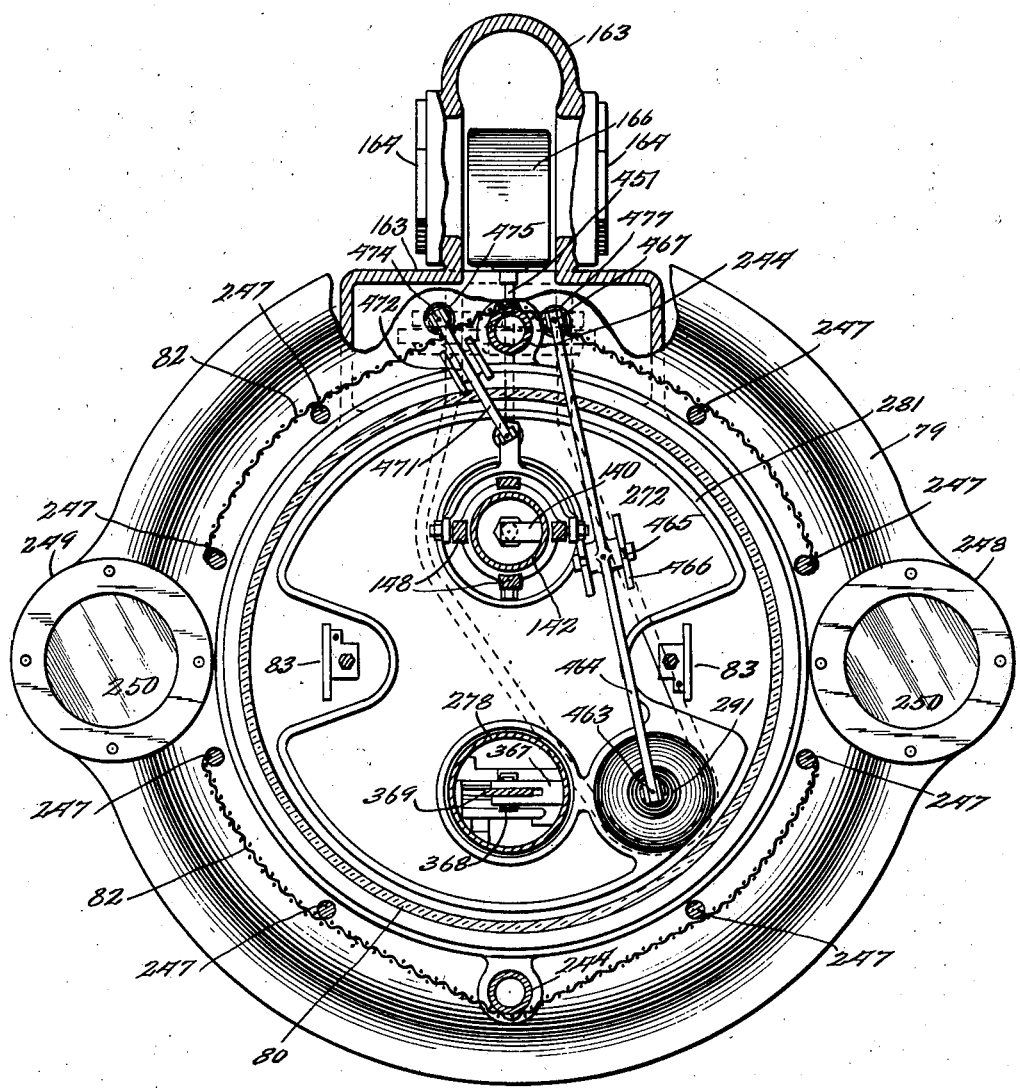
Figure 12:
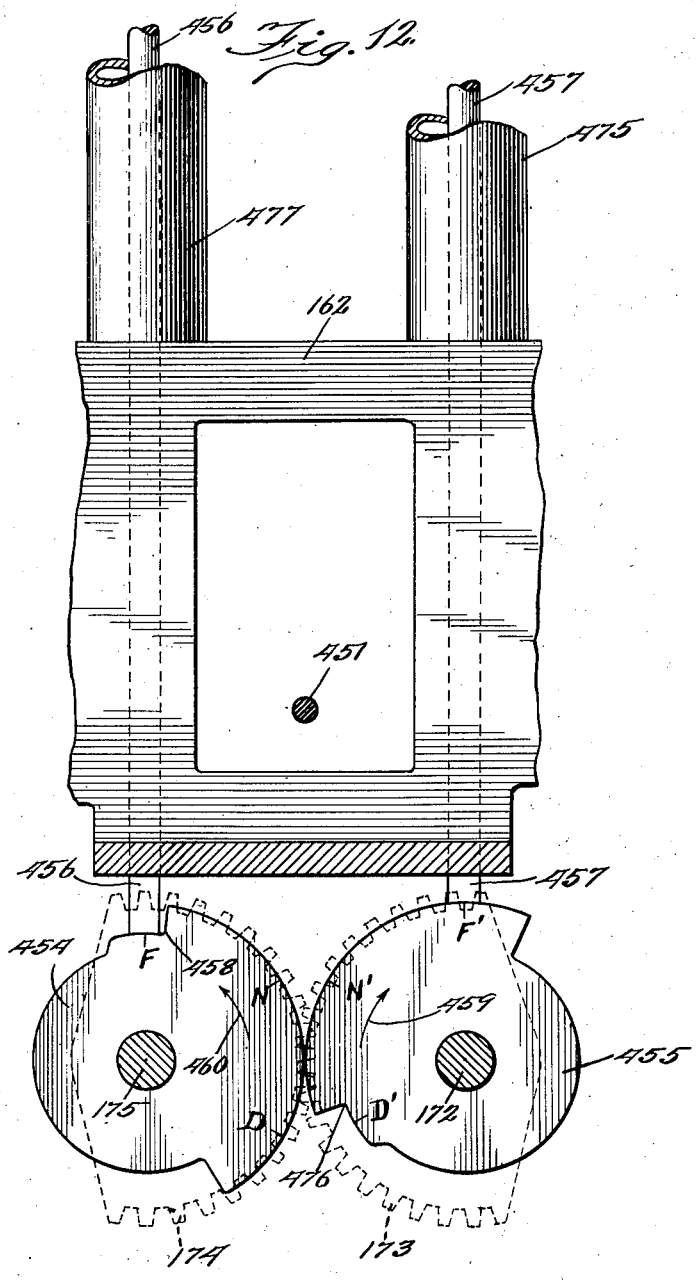
Figure 13:
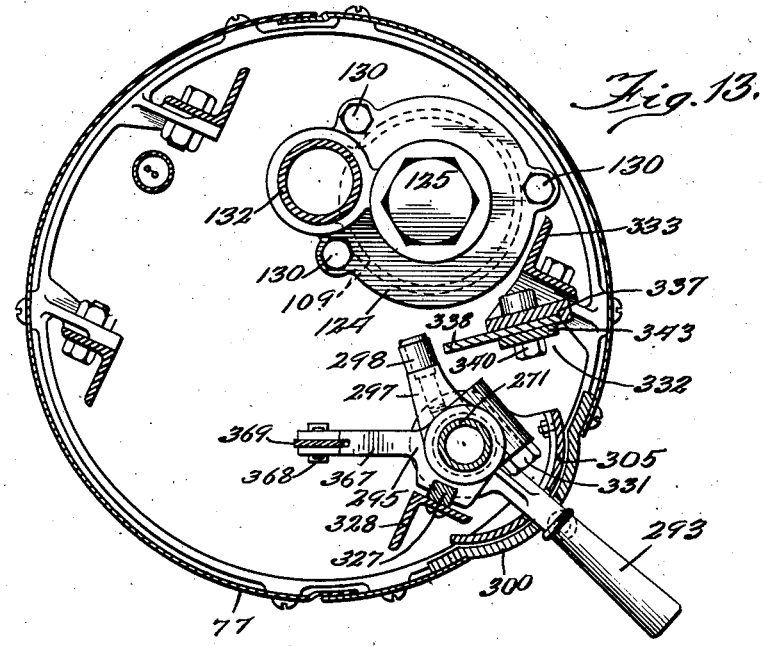
Figure 14:
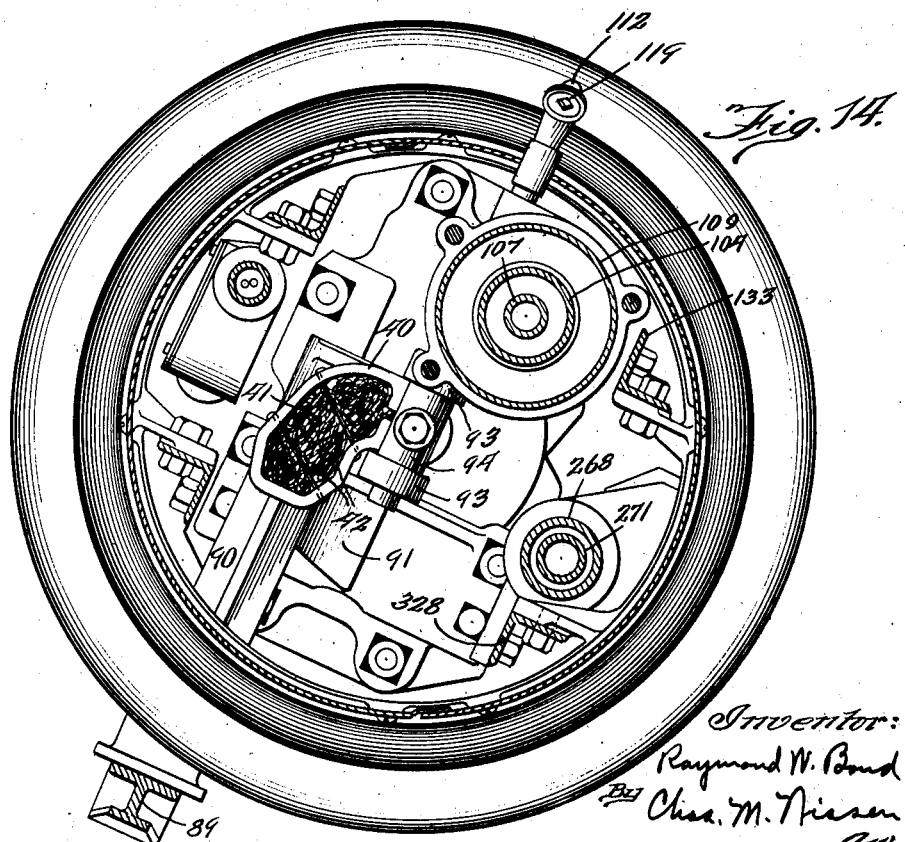
Figure 15:
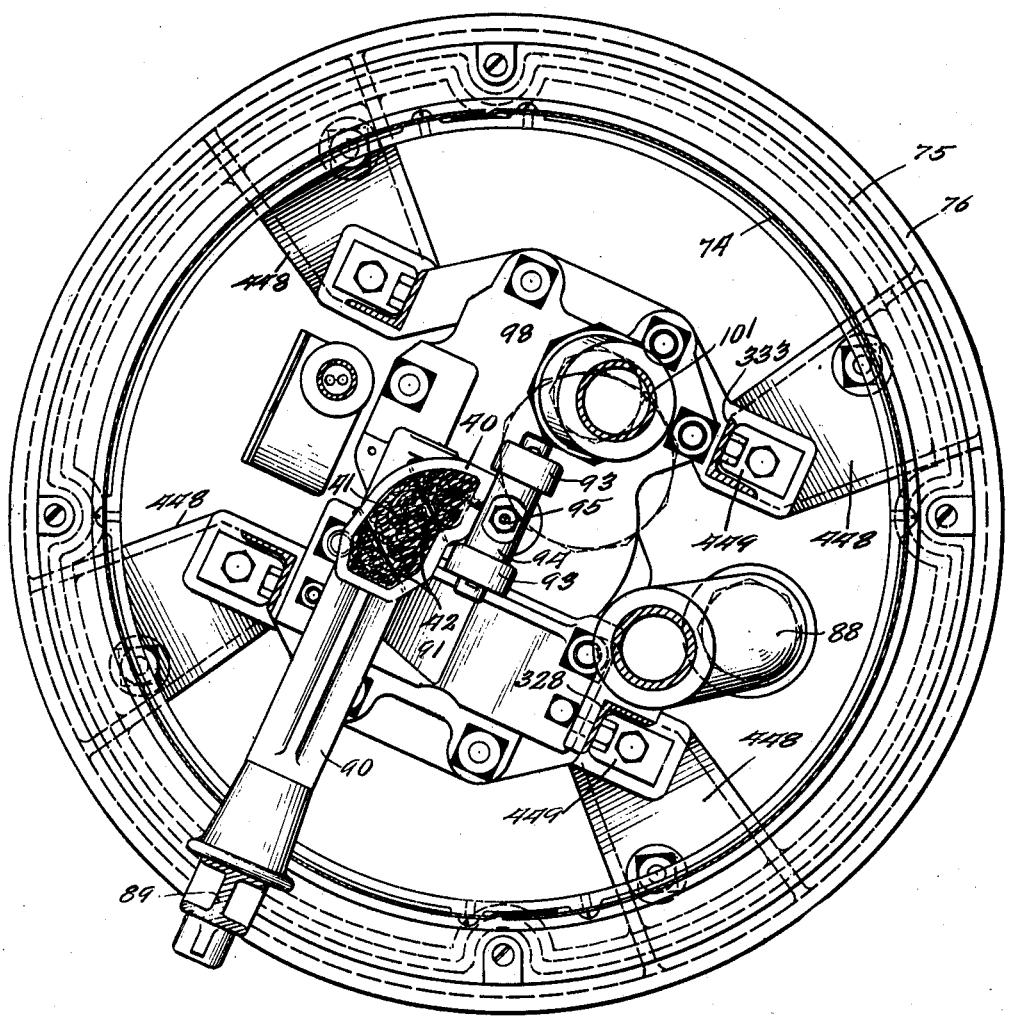
Figure 56:
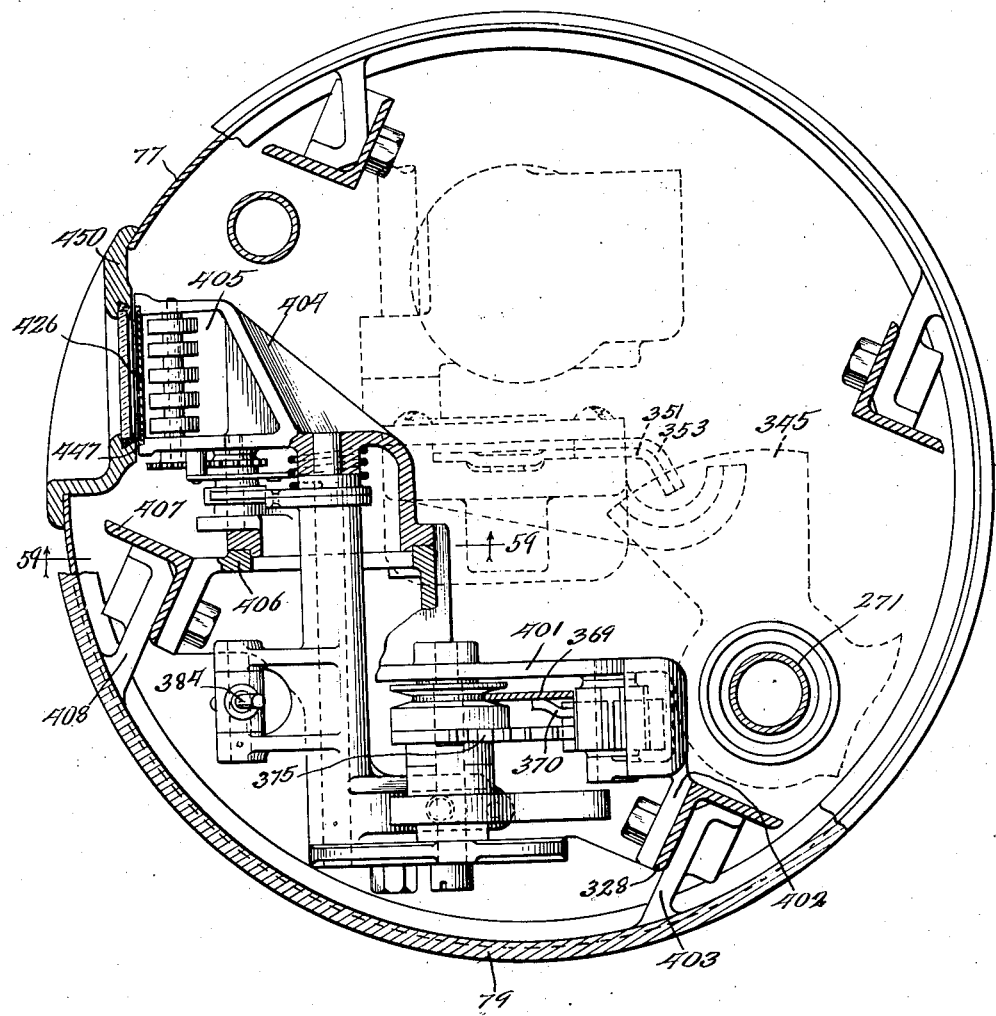
Figure 71:
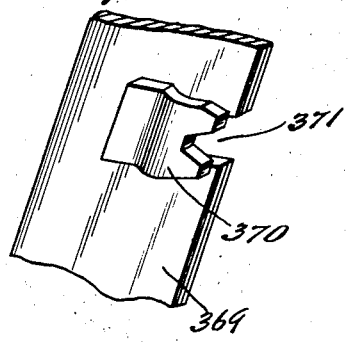
Figure 72:
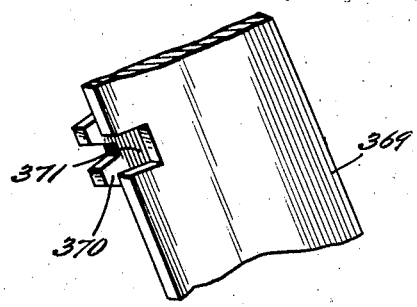
Figure 73:
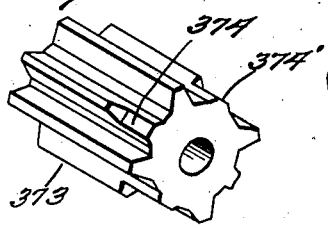
Figure 74:
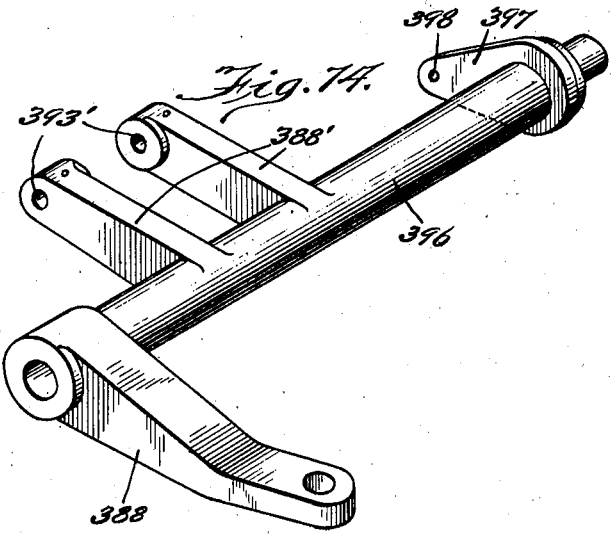
Figure 75:
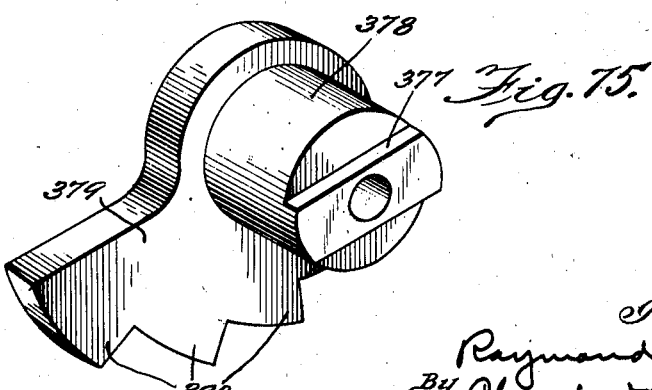

Fig. 8$^a$ is a section of the bucket in the overflow pipe;

Fig. 9 is a plan view taken on the line 9—9 of Fig. 3;

Fig. 10 is a sectional plan view taken on the line 10—10 of Fig. 4;

Fig. 10$^a$ is a sectional elevation of the lighting unit shown in Fig. 10;

Fig. 11 is a plan view with a portion broken away and certain portions in section to show certain mechanism illustrated in elevation in Fig. 8;

Fig. 12 illustrates in elevation certain details broken away and enlarged;

Fig. 13 is a sectional plan view on the line 13—13 of Fig. 5;

Fig. 14 is a sectional plan view on the line 14—14 of Fig. 6;

Fig. 15 is a sectional plan view on the line 15—15 of Fig. 7;

Fig. 16 is a plan view of the dispensing apparatus with the visible container and the parts associated therewith and therein omitted, Fig. 16 being a plan view of the manifold on which the visible container is mounted;

Fig. 17 is a plan view of the measuring funnel constituting the enlarged and expanded intake of the measuring sliding tube shown in Fig. 5 extending into the bottom of the visible container;

Fig. 18 is an elevational view of the funnel shown in Fig. 17;

Fig. 19 is a cross-sectional view of Fig. 17 on the line 19—19 looking in the direction of the arrows;

Fig. 20 is a sectional elevation of a quantity set lever and the sliding tube connected thereto;

Fig. 21 is a sectional plan view on the line 21—21 of Fig. 20;

Fig. 22 is a sectional elevation of the interlocking mechanism for compelling such sequence in the operation of the dispensing apparatus that no liquid can be discharged from the visible container while the latter is being filled and no liquid can be added to the container while the dispensing operation is taking place;

Fig. 23 is a sectional plan view taken on the line 23—23 of Fig. 22;

Fig. 24 is an elevational view of the interlocking mechanism when the fill valve is open to effect filling of the visible container to a predetermined height or level;

Fig. 25 is a sectional plan view on the line 25—25 of Fig. 24;

Fig. 26 is an elevational view of the interlocking mechanism showing the position of the parts when the discharge valve is open to effect a dispensing operation from the visible container through the dispensing hose;

Fig. 27 is a sectional plan view on the line 27—27 of Fig. 26;

Fig. 28 is an elevational view of the quantity stop slots which are mounted in the housing of the dispensing apparatus in fixed position relative thereto with each individual quantity stop secured in adjusted position and sealed;

Fig. 29 is a perspective view of one of the adjustable quantity stop slot plates;

Fig. 30 is a sectional plan view on the line 30—30 of Fig. 28;

Fig. 31 is a sectional plan view on the line 31—31 of Fig. 28;

Fig. 32 is a perspective view of one of the interlocking recessed plates shown in Figs. 22, 24 and 26 in elevation;

Fig. 33 is a perspective view of the other recessed interlocking plate shown in elevation in Figs. 22, 24 and 26;

Fig. 34 is a sectional elevation of the yielding retaining mechanism located between the interlocking plates shown in Figs. 32 and 33, the interlocking plate of Fig. 33 being shown in part at the left-hand portion of Fig. 34 and the interlocking plate of Fig. 32 being shown in part at the right-hand portion of Fig. 34;

Fig. 35 is a perspective view of the double arm operating lever shown in sectional elevation in Figs. 22, 24 and 26 in position for operating in the recesses of the interlocking plates shown in perspective in Figs. 32 and 33;

Fig. 36 is a sectional plan view of the filling valve and discharge valve and the mechanism for operating the same;

Fig. 37 is a sectional elevational view on the line 37—37 of Fig. 36 looking in the direction of the arrows and showing the filling valve;

Fig. 38 is a sectional elevational view on the line 38—38 of Fig. 36 looking in the direction of the arrows, the valves of Figs. 37 and 38 being shown in plan on the lines 36—36 of Figs. 37 and 38;

Fig. 39 is an enlarged sectional elevation of the filling valve connected to the fill tube which extends into the visible container;

Fig. 40 is a sectional plan view taken on the line 40—40 of Fig. 39;

Fig. 41 is a sectional elevation of the discharge sight-glass and indicator, this view being taken on the line 41—41 of Fig. 10 looking in the direction of the arrows;

Fig. 41$^a$ is a sectional elevation taken on the line 41$^a$—41$^a$ of Fig. 10;

Fig. 42 is a sectional plan view taken on the line 42—42 of Fig. 41 showing the spider for guiding the stem of the discharge valve shown in Fig. 38 in elevation and in plan at the right-hand portion of Fig. 36;

Fig. 43 in an elevational view of the indicating plate associated with the operating lever shown at the right-hand portion of Fig. 41;

Fig. 44 is an elevational view of the indicating operating lever plate at the left-hand side of the dispensing unit shown in Fig. 1, Fig. 43 showing the plate at the right-hand side of the dispensing unit illustrated in Fig. 1;

Fig. 45 is a section of a portion of Fig. 43 taken on the line 45—45 looking in the direction of the arrows;

Fig. 46 is a sectional elevation taken on the line 46—46 of Fig. 43;

Fig. 47 is a sectional elevation taken on the line 47—47 of Fig. 44;

Fig. 48 is a sectional plan view of a portion of the visible container to show the position of the depth indicators therein relative to the inner wall of the visible container;

Fig. 49 is an elevational view of the indicator of the reflection type;

Fig. 50 is a rear view of the structure shown in Fig. 49 mounted on the supporting rod shown in sectional plan view in Fig. 48;

Fig. 51 is a sectional plan view on the line 51—51 of Fig. 50;

Fig. 52 is a sectional plan view taken on the line 52—52 of Fig. 50;

Fig. 53 is a sectional elevation of the vacuum breaker for the top of the visible container as shown in Fig. 3;

Fig. 54 is an elevational view of the totalizing counter-mechanism mounted on the upper portion of the housing of the dispensing unit adjacent the lower end of the visible container;

Fig. 55 is a sectional elevational view similar to Fig. 54 but showing the positions of the parts when operated to effect registry of a predetermined number of gallons to be dispensed;

Fig. 56 is a sectional plan view taken on the line 56—56 of Fig. 54;

Fig. 57 is an enlarged plan view of the totalizer shown in Fig. 56;

Fig. 58 is an elevational view of the structure shown in Fig. 57;

Fig. 59 is a sectional elevation taken on the line 59—59 of Fig. 56;

Fig. 60 is a rear end elevation of the locking mechanism shown at the upper left-hand portion of Fig. 59;

Figs. 61, 62, 63, 64, 65, 66, 67, 68, 69 and 70 show details of the totalizing counter-mechanism shown in Figs. 54, 55, 56, 57, 58 and 59;

Figs. 71 and 72 are perspective views of the rack teeth mounted on the vertical rod connected to the quantity stop lever for actuation in elevation thereby;

Fig. 73 is a perspective view showing the mutilated gear which is associated with the vertical rack bar shown in Fig. 54;

Fig. 74 is a perspective view of the quantity stop arm mechanism of the totalizing counter-apparatus; and Fig. 75 is a perspective view of the rear portion of the stepped quantity sector plate, the other side of which is shown in elevation in the totalizing counter-apparatus in Figs. 54 and 55.

In the accompanying drawings, Figs. 1 and 2 represent elevational views of the entire dispensing unit which is adapted to be mounted in fixed and permanent position at the place of use such as at a filling station.

In my co-pending application, Serial No. 326,659, filed December 17, 1928, for an improvement in dispensing apparatus of the visible type, I have shown and described a dispensing unit of the same general type as that shown in the present application, but the latter embodies certain improvements not disclosed in said co-pending application; in said co-pending application, Serial No. 326,659, I have particularly described and claimed the interlocking mechanism for compelling certain predetermined sequence in the filling and dispensing operations, and the present application embodies additions thereto and improvements thereon. In my co-pending application, Serial No. 334,981, filed January 25, 1929, for apparatus including totalizing counter-mechanism for dispensing pumps, I have described and claimed the totalizing counter-mechanism herein shown, in co-operation with the various features of the entire dispensing unit.

As shown in Fig. 7, an enclosing cylindrical casing 74 is mounted on a pedestal ring 75 which in turn is secured to the base ring 76; surmounting the cylindrical casing 74 is a ring casting 75' carrying a sectional detachable housing 77, as shown in Fig. 6. To the upper end of the housing 77 is secured at 78 a manifold casting 79, as shown in Fig. 5.

Surmounting the manifold 79 is a glass cylinder 80, the top of which is covered by the canopy 81, as shown in Fig. 3.

The glass container 80 is protected on opposite sides by the woven wire guards 82 which are spaced apart as shown in Figs. 1 and 10 so as to provide vertical openings for observation of the quantity indicators 83.

Surmounting the canopy 81, as shown in Fig. 3, is a segmental globe 84 which may be provided with glass panels 85 on opposite sides for advertising matter which may be illuminated by the incandescent lamp 86 within the globe, as shown in Fig. 3. By placing Figs. 3, 4, 5, 6 and 7 end to end the entire dispensing unit may be observed in sectional elevation. Fig. 7 shows a hand-operated pump 87 connected to the suction pipe 88 leading from the gasoline supply pipe tank under ground. By means of the lever 89, as shown in Figs. 1 and 7, the shaft mounted in the bearing 90 on the bracket 91 on top of the pump may be oscillated to secure up and down movements of the crank arms 92 which are pivoted to the lower ends of the spaced-apart links 93, the latter being pivoted at their upper ends to the cross-head 94, as shown in Fig. 6. This operation secures vertical reciprocating movements of the piston rod 95 which is guided through the bearing 96 mounted on the bracket 91. The piston rod 95 also extends through the stuffing-box 97 on top of the cylinder 98 of the pump 87. The lower end of the pump 87 is mounted on brackets 99 and 100 which are secured to the bed plate ring 76 by means of vertical angle irons.

The pump plunger 95, as shown in Fig. 7, may be lubricated by an oil cup 40 which is open at its upper side, as shown in Figs. 14 and 15, and is adapted to contain oil-soaked waste 41 held in place by the cross-rods 42.

The pump 87 is of well-known construction and the outlet therefrom is connected by the discharge pipe 101 to the centrifugal filter shown in Fig. 6. The gasoline first enters the chamber 102 in the casing 103 from the upper end of the discharge pipe 101. Into the upper end of the casting 103 is screw-threaded an upstanding pipe 104. Within the chamber 102 is a spider support 105 having a central closed screw-threaded socket 106 for receiving the vertical cylindrical support 107 to which is secured the spiral or centrifugal blade 108.

The gasoline when pumped up along the discharge pipe 101 will be whirled with a centrifugal motion along the spiral passageway defined by the spiral blade 108, thus throwing the heavier ingredients outwardly by centrifugal force so that such heavier ingredients will settle out of the gasoline along the inner wall of the larger cylindrical casing 109 which surrounds and is spaced from the tube or pipe 104. As shown in Fig. 6, both the upper and the lower ends of the pipe 104 are open.

The lower end of the cylinder 109 is secured to the cylindrical support 110. The annular chamber 111 which surrounds the casting 103 is immediately below the space surrounding the tube 104 and there is therefore provided sufficient annular space for receiving from the spirally flowing gasoline the heavier impurities such as water and solid particles.

The heavier ingredients from the gasoline which are separated by centrifugal operation may be removed by means of the spigot 112 which is normally covered by the spherical cap 113 pivotally connected at 114 to a bracket 115 mounted on the lower portion of the casing 77, as shown in Fig. 6.

An eye-bolt 116 extends through an opening 117 in the lower end of the semi-spherical cover 113 and a padlock 118 may be used to lock the spigot 112 against being tampered with by unauthorized persons. When the cover 113 is unlocked and tipped up the spigot 112 may be opened by applying a key at 119 as shown in Figs. 6 and 14, to effect removal of the collected sediment and water in the annular chamber 111 and the space surrounding the tube or pipe 104.

From the tube 104 the gasoline passes upwardly through the hole or opening 120 at the lower end of the conical partition 121 as shown in Fig. 6. In this conical partition is mounted a fine mesh cylindrical filter screen 122 with the upper end closed by the circular screen 123 as shown in Fig. 5.

Secured to the upper end of the tube 109 is a supporting cap 124 which has a screw-threaded opening in its top to receive the retaining cap 125 which, when in place as shown in Fig. 5, covers the wire bail 129 and may engage the latter to hold the cylindrical screen 122 in place at the lower end of the conical partition 121 as shown in Figs. 5 and 6.

A horizontal partition 126 is located intermediate the ends of the tube 109 and secured to the inner wall of the latter as shown in Fig. 6. This partition is perforated at 127 to permit the gasoline to enter the air chamber 128. The upright conical partition 121 therefore affords means for forming an air chamber 128, as well as a means for assisting in supporting the cylindrical screen 122. The purpose of the air chamber 128 is to provide a cushion for the expansion of the gasoline as it is pumped out of the tank in the ground where the temperature is apt to be lower than the temperature above ground. In other words, the expansion of gasoline due to change in temperature as it is being pumped above ground will be cushioned by the air chamber 128 at the upper end of the tube 109 surrounding the conical partition 121.

By referring to Fig. 5 it will be seen that the cap 125 is removable from the support 124. Fig. 13 is a plan view on the line 13—13 of Fig. 5 and shows the cap 125 concentric with the support 124 and the tube 109. The support 124 and the tube 109 may be anchored as illustrated at 130, 130. The space above the cap 125 is sufficiently unobstructed to permit not only the removal of the retaining cap 125, but also the manual removal of the screen 122 by means of the bail 129 for the purpose of cleaning the screen or renewing the same when it becomes so clogged with impurities as to restrict the free flow of the gasoline.

It should be understood that the gasoline passes upwardly from the tube 109 through the opening 120 in the bottom of the conical partition 121 into the lower open end of the screen 122 and laterally through the walls of the latter into the space surrounding the screen and within the inner walls of the conical partition 121; thence the gasoline flows into the chamber 131 as shown in Fig. 5. The lateral passageway leads from the chamber 131 into the vertical pipe 132 which is connected to the valve casing 133 shown in Fig. 5 as being integral with the manifold 79.

In the valve casing 133 is mounted the filling valve 134 as shown in dotted lines in Fig. 5 and in full lines in Figs 36 and 37. The lower valve stem 135 is guided in a spider bearing 136 as shown in Fig. 5 and a spring 137 is relied on to automatically close the valve 134 when the valve operating mechanism is released. It should be noted that the tendency for the upwardly flowing gasoline is to close the valve 134 against its seat 138 as shown in Figs. 5 and 37. The valve 134 is open only when the upper valve stem 139 is forcibly pushed down by the tappet 140 against the action of the spring 137. When this occurs the pumped gasoline will enter the chamber 141 shown in Fig. 5 and thence the gasoline flows upwardly through the pipe 142. The lower end of the tube 142 is screw-threaded into an opening in the upper side of the supporting plate 143 which is shown in Fig. 5 integral with the manifold 79.

By placing Figs. 3, 4 and 5 end to end it will be seen that the pipe 142 extends upwardly through the glass cylinder 80 to the upper end thereof as shown in Fig. 3. The extreme upper end of the pipe 142 is provided with screw threads 144 for receiving the closed cap 145. Immediately below this cap 145 are lateral openings 146 in the upper end of the tube 142 to permit the gasoline to flow out of the upper end of this tube into the annular chamber formed by the pipe 147 which is spaced from the tube 142. The pipe 147 extends downwardly from the glass cylinder 80 and is supported at its lower end by the spider bracket 148, the latter being secured by the set screw 149 to the pipe 142 as shown in Fig. 5.

The cap 145 is provided with an annular shoulder 150 which fits over the top circular edge of the tube 147 and co-operates with the annular seat 151 of the spider bracket 148 to securely clamp the tube 147 in fixed and rigid connection to the pipe 142 when the bracket 148 is secured to the latter by means of the set screw 149.

The upper end of the outer tube 147 is provided with vent openings 152 to permit air to enter the tube 147 from the upper portion of the visible bowl or container 80 so that the entire tube 147 will be drained of gasoline when a dispensing operation is being made to the tank of an automobile through the delivery hose 153. Air is permitted to enter from the atmosphere into the visible container 80 through the vacuum breaker 154 which is shown in elevation in Fig. 3. This vacuum breaker comprises a ball check-valve 155 (Fig. 53) which permits entering of the air from the atmosphere through the inlet 156 into the upper end of the visible container, but prevents gasoline from escaping from the upper end of the cylinder 80. This vacuum breaker prevents outward flow of gasoline from the visible container, but permits flow of air into the same from the atmosphere.

While the air vents 152 at the upper end of the pipe 147 and the vacuum breaker 154 permit free flow downward of the gasoline from the visible bowl or container and from the tube 147, it is desirable to prevent areation of the gasoline by reducing the splashing thereof to a minimum when it enters the visible container 80 during the filling operation thereof. For this purpose the gasoline is directed from the upper end of the tube 142 into the outer tube 147 and to the lower end thereof so that the gasoline will enter the chamber 157 in the upper side of the manifold 79. This chamber 157 has an annular seat 158 on which rests a cork ring washer or gasket 159 for receiving the lower end of the glass cylinder 80. It should be understood that the upper opening in the manifold 79 is circular and concentric with the annular seat 158 and therefore also concentric with the glass cylinder 80.

Surrounding the horizontal annular seat 158 is an upstanding annular flange 160 spaced from the cylinder 80 to provide an annular groove to receive litharge 161 to co-operate with the cork washer 159 to effect a liquid-tight seal between the lower end of the glass cylinder 80 and manifold 79. It will thus be seen that the upper opening of the chamber 157 registers with the lower opening of the glass cylinder 80.

Mounted on the manifold 79 is a sight-glass casing 162 which is provided with a chamber in direct communication with the chamber 157. Connected to the sight-glass casing 162 is a discharge valve casing 163 as shown in Fig. 5. The sight-glass casing 162 and the discharge valve casing 163 are shown integral with the manifold 79. On opposite sides of the casing 162 are mounted sight-glass windows 164 for observation of the float 166 which is mounted on the rod 451 pivoted at 452 to the lower ring 453 of the spider bracket 148. The filling of the visible bowl or container 80 will also fill the chamber 157 and this filling operation preparatory to dispensing gasoline to a customer will be indicated by the float 166 moving upwardly with the rod 451 between the sight-glass windows 164. The float 166 also operates certain interlocking mechanism hereinafter more fully described to compel complete emptying of the visible bowl or container 80, by rendering it impossible to close the discharge valve 186 until all liquid has been drained from the chamber 157, thereby preventing fraud in the dispensing of the gasoline.

When the operator swings the controlling lever 170 in a clockwise direction he will rotate the shaft 172 shown in Fig. 36 and thereby rotate the segmental gear 173 which is fixed to the shaft 172. The segmental gear 173 meshes with another segmental gear 174 which is secured to the shaft 175. The shaft 175 extends through a stuffing-box 176 which is screw-threaded into an opening in the casing 163. The packing 177 in the stuffing-box 176 is held in place by the packing gland 178 and the spring 179. A screw-threaded cap 180 surrounds the shaft 175 and holds the spring 179 in place when screwed onto the stuffing-box 176.

A tappet 181 is secured to a reduced portion of the shaft 172; the reduced portion 182 of the shaft 175 is journaled in the recess in the screw-threaded cap bearing 183 secured to the casing 163 as shown in Fig. 36.

Therefore when the operator removes the controlling lever toward the left or in a clockwise direction along the plate 171, the tappet 181 will be moved to its dotted line position 184 shown in Fig. 38, to engage the lower end of the valve stem 185 of the discharge valve 186 which when closed rests against the seat 187 as shown in Figs. 5 and 38. The upper valve stem 188 is guided in the bearing 189 as shown in Fig. 5. A spring 192 is located between the removable cap 191 and the top of the valve 186. By means of this spring the valve seat 187 may be machined through the opening in the top of the casing 163 and then the valve 186 together with its lower stem 185 and upper stem 188 may be assembled readily by inserting the same through the opening in the upper part of the casing 163; then placing the spring 192 in place and fitting the guide 189 over the stem 188 and securing the assembled structure in place by means of the cap 191.

It will be seen by referring to Figs. 36, 37 and 38 that when the operating lever 170 is moved in one direction the shaft 175 will be rocked so as to move the tappet 181 upwardly to its dotted line position 184, as shown in Fig. 38, and that when the operating lever 170 is moved in the opposite direction the shaft 175 will be rocked so as to move the tappet 140 downwardly to its dotted line position shown at 205 in Fig. 37. The tappets 181 and 140 although secured to the same shaft 175 are so arranged that the tappet 181 will operate under the discharge valve 186 and the tappet 140 will operate above the filling valve 134. The operating mechanism for the filling valve and the discharge valve is therefore so interconnected that these two valves cannot possibly be opened at the same time. Whenever the filling valve is opened, the discharge valve will be closed, and whenever the discharge valve is opened, the filling valve will be closed, by reason of the connections between the valves which are in effect interlocking in this respect.

In the same manner that the shaft 175 extends through a stuffing-box into the casing 163, the other end extends through a stuffing-box 206 which is secured to the casing 133. The packing 207 is held in place by the packing gland 208 and a spring 209, which in turn is held in place by the cap 210 as shown at the left-hand portion of Fig. 36. The tappet 140 is mounted on the reduced portion 211 of the shaft 175, which reduced portion 211 is journaled in a bearing in the valve casing 133.

The plate 171 shown in Figs. 43 and 44 is secured to the bracket 193 by means of flat-headed screws, openings for which are shown at 194, 194 in Fig. 43. At 195 in Figs. 43 and 46 is shown a forwardly extending projection on the plate 171 to afford an indicator to co-operate with the upper arm 170' of the operating lever to enable the operator to more accurately place the operating lever in central or neutral position. Abutments or stops are provided at 196 and 197 as shown in Figs. 43, 45 and 46 to limit the swinging movements of the operating lever 170 to their positions "To car" and "To bowl", the bowl being the visible container 80.

The plate 171 is also provided with conical recesses 198, 199 and 200, as shown in Fig. 43, to receive the conically nosed detent 201, as shown in Fig. 41. This conical detent fits into a cylindrical chamber 202 in the boss 203 on the arm 170' and a spring 204 within the boss 203 constantly urges the conical detent 201 toward the plate 171. The conical recess 198 corresponds to the neutral or central position of the operating lever 170. The conical recess 199 corresponds to the position of the operating lever where its upper arm 170' indicates dispensing of the gasoline "To bowl", and the recess 200 corresponds to the position of the operating lever for indicating dispensing of the gasoline "To car". The conical detent 201 being held yieldingly in place can readily be forced up onto the flat surface of the plate 171, but when the recesses are reached the detent will snap into the same and hold the operating lever in the desired positions. The limit stops 196 and 197 will prevent the operator from swinging the operating lever too far in either direction.

In order that the filling valve and the discharge valve may be operated from either side of the dispensing unit, the shaft 172 of Fig. 36 is extended entirely through the manifold 79 to that side of the dispensing unit opposite the discharge valve and is provided with a manual operating lever 212, as shown in Fig. 5. This operating lever is provided with an upper indicating arm 212' which moves over the plate 213 secured to the boss 214 on the lower portion of the manifold 79.

The plate 213 is shown in elevation in Fig. 44. The shaft 172 shown in Fig. 5 extends through the opening 215 in the plate 213 in Fig. 44. Openings are also provided at 216, 216 for screws to secure the plate 213 to the elongated boss 214. At the upper central portion of the plate 213 is an outwardly extending indicator projection 217 in position to co-operate with the indicator arm 212' to enable the operator to readily determine the neutral or central position of the operating lever 212. The plate 213 is provided with indications "To bowl" and "To car" in a manner similar to the indications on the plate 171 in Fig. 43. These indications are oppositely placed on the plate 213 relative to the plate 171 by reason of the fact that the plate 213 is on the opposite side of the dispensing unit as to the plate 171. At the same time that the lever 212 is swung the lever 170 will also be swung since both levers are rigidly connected to the shaft 172 to swing together, with the rocking of the shaft 172. Therefore the yielding detent 201 on the arm 170' will co-operate with the conical recesses 198, 199 and 200 to hold both of the operating levers in the positions to which they have been moved. That is, when the operating lever 212 is swung "To bowl" position it will be held there by the detent 201 after being snapped into the conical recess 199, and when the operating lever 212 is moved "To car" position it will be held there by the detent 201 snapping into the conical recess 200. When the lever 212 is moved to neutral position or central position it will be held there by the detent 201 snapping into the conical recess 198.

It can readily be seen by referring to Figs. 36, 37, 38, 39 and 41 that by operating the lever 212 "To bowl" position the filling valve 134 will be opened while the discharge valve 186 remains closed, and when the operating lever 212 is moved "To car" position the discharge valve 186 will be opened and the filling valve will remain closed.

From the foregoing it will be seen that the discharge valve and the filling valve may be operated from either side of the dispensing unit, the same shaft 172 being rocked by either the lever 170 or the lever 212, both of these levers being rigidly secured to the shaft 172. By referring to Fig. 36 it will be seen that the use of the segmental gears 173 and 174 enables both valves 134 and 186 to be operated by the use of only two stuffing-boxes 206 and 176, whereas if the segmental gears 173 and 174 were not used, four stuffing-boxes would be necessary for the shaft 172. Thus by the use of the counter-shaft 175 operated by the segmental gears 173 and 174 from the main shaft 172, two stuffing-boxes are eliminated, thereby simplifying the construction.

The upper end of the glass cylinder 80 is provided with a liquid-tight cover comprising a circular plate 218 which is secured at its periphery by means of cap screws 219 to the ring frame 220, as shown in Fig. 3. This ring frame is provided with a lower annular horizontal seat adapted to rest on the cork washer 221 on top of the glass cylinder 80. An annular flange 222 extends downwardly from the ring frame 220 to afford an annular space to receive the litharge 223 to co-operate with the cork washer 221 and effect a liquid-tight seal at the upper end of the glass cylinder 80.

The heads of two spaced-apart cap screws 219' which assist in securing the plate 218 to the ring frame 220, are provided with perforations to receive a wire 224 the ends of which are sealed with solder 225 so that after the parts have been assembled in the bowl or glass container 80 and the accuracy of the measurements hereinafter described have been tested and found to be satisfactory, the cover plate 218 may be screwed down and sealed to the frame 220 which has been permanently connected to the top of the glass cylinder 80 by the litharge filling 223.

The peripheral portion of the frame 220 is provided with an upstanding annular flange 226 to receive the bottom of the canopy 81. This canopy may be secured by means of the screws 227 to the periphery of the ring 220 as shown in Figs. 3 and 9.

Secured to an opening in the upper side of the canopy 81 by means of the screws 228 is a ring support 229 for receiving on its upper side the annular flange 230 of the electric junction box 231 which is adapted to contain electrically insulated wire leads 233 and 234 for the incandescent lamp 86 in the transparent protecting casing 232 mounted between the glass plates 85 of the globe 84. The junction box 231 is also adapted to contain the connector 235 for the leads 233 and 234 to facilitate assembly of the mountings for the incandescent lamp 86.

The globe 84 is mounted on a pedestal 236 which rests on top of the flange 230 and together with the latter is supported by the ring 229. The pedestal 236 together with the globe 84 are held in place on the ring support 229 by means of the ring clips 237 and 238 and the screws 239 and 240, as shown in Figs. 3 and 9.

Secured to the bottom central portion of the junction box 231 is a conduit 241 with an opening therein covered by the removable plate 242. It should be particularly noted that the conduit 241 extends off to one side so as to pass through an opening in the ring frame 220 at the left-hand portion thereof, as viewed in Fig. 3. By placing Figs. 3 and 4 end to end it will be seen that the lower end of the conduit 241 is connected at 243 to the upper end of the conduit pipe 244, the lower end of which is screw-threaded at 245 to the manifold 79. The lead 233 comprising a pair of insulated wires may therefore be led down from the junction box 231 through the conduits 241 and 244 to the chamber 246 in the manifold 79 and thence to any convenient source of electric supply, preferably by leading the electrically insulated wires through the casings of the dispensing unit to underground conduits at the place where the dispensing unit is installed.

When it is necessary to gain access to the interior of the glass cylinder 80 for the purpose of cleaning the interior walls thereof, the canopy 81 may be disconnected from the frame 220 by removing the screws 227 and also by removing the screws 228, leaving the junction box 231 and the globe 84 supported on the conduit 241, the latter serving as a bracket arm for this purpose. By lifting the canopy 81 from the upstanding flange 226 the entire globe and the parts connected thereto may be swung laterally off the top of the visible container while the conduit 244 serves as a vertical axis of swinging movement. In other words, by detaching the canopy 81 and lifting the same from the ring 220, the conduit 241 together with the globe supported thereon may be swung on the axis of the conduit 244 to move the globe off to one side. The seal 225 may then be broken and the cover plate 218 removed to secure access to the inner walls of the glass cylinder 80 so that the latter may be cleaned.

It should be understood, however, that the ring frame 220 remains permanently in position since it is bolted by means of the long bolt rods 247 to the manifold 79, as shown by placing Figs. 3 and 4 end to end. As shown in Fig. 10, which is a sectional plan view on the line 10—10 of Fig. 4, there are a plurality of bolt rods 247 spaced from each other and spaced from the glass cylinder 80. As shown in Fig. 10, these bolt rods 247 are distributed around the glass cylinder 80 so as to afford vertical rests for the woven wire guards 82, 82. The latter are secured to the bottom of the ring frame 220 at their upper ends and to the upper sides of the manifold 79 at their lower ends and are of sufficient area to amply protect the glass cylinder 80 against breakage. Spacers are left between the lateral vertical edges of the guards 82, 82 to provide sufficient spaces for observation of the quantity indicators 83, as shown in Figs. 1 and 10. Two sets of quantity indicators are arranged within the glass cylinder 80, one set for observation from one side of the dispensing unit and the other set for observation from the other side thereof.

In order that the quantity indicators may be easily observed, I have arranged an indirect lighting system comprising incandescent lamp holders 248 and 249 on opposite sides of the manifold 79, as shown in Fig. 2. Each of these incandescent lamp holders is provided with an upper opening covered by a transparent glass plate 250, as shown in Fig. 10ᵃ. The incandescent lamp 251 is mounted in a socket 252 which is secured by means of the bracket 253 to the inner wall of the holder 249. Both of the indirect lighting devices 248 and 249 illuminate the sides of the glass cylinder 80 and the contents thereof between the guards 82, 82 without causing any glare by shining directly into the eyes of the observer. It will thus be seen that the quantity indicators may be observed from either side of the dispensing unit by means of illumination which is directed upwardly toward the quantity indicators and against the bottom or mirror surface of the gasoline in the glass cylinder 80. This will enable the observer to much better see the reflection of the inverted V-shaped groove 254 in the plate 255 shown in Fig. 49.

The quantity indicators 83 each comprises a plate 255 with an inverted V-shaped groove 254 therein immediately above the number representing the depth in gallons or liters of the gasoline in the glass cylinder 80. On the rear side of the plate 255 is a bracket 256, as shown in Figs. 50 and 51, and this bracket is provided with a vertical opening which is adapted to fit on a vertical rod 257 which is hexagonal in cross-section.

The rear side of the plate 255 is also provided with a pair of clamping brackets 258, 258 which fit over the vertical rod 257 and are adapted to be bolted thereto by means of the bolt 259, as shown in Fig. 50. The vertical hexagonal rod 257 is connected at its lower end at 260 to the manifold 79, as shown in Fig. 4, and the upper end of the hexagonal rod 257 is secured at 261 to the ring frame 220, as shown in Fig. 3. The lower end of the rod 257 may be cylindrical and fit into a corresponding recess at 260 while the upper end may fit into a hexagonal recess in the bracket 261. A nut 262 may be relied on to secure the rod 257 to the bracket 261 while the lower end of the rod 257 will be kept from moving laterally by the socket 260.

Reverting to Figs. 50 and 52 it will be seen that the clamp 258 is provided with a laterally extending arm 263 to receive the screw-threaded portion 264 of the adjusting screw 265, the upper cylindrical portion 266 of which fits loosely in the bracket 256. To the lower end of the cylindrical portion 266 is secured a collar 267 in position to abut against the bracket 256. The plate 255 may be secured to the rod 257 approximately in the correct position to enable the indicator groove 254 to effect the desired reflection from the lower mirror surface to the gasoline level in the glass cylinder 80. It should be understood that when the glass cylinder 80 is filled with a predetermined quantity of gasoline, say one gallon or one liter, the level thereof in the glass cylinder 80 should be such that the lower mirror surface of the gasoline level will be exactly at the upper point of the inverted V-shaped groove 254. When this occurs the reflection of the inverted V-shaped groove in the bottom mirror of the gasoline level will form the letter X to the observer. If the indicator groove 254 is not in the proper position the desired letter X will not be formed by the reflection. Therefore upon turning the screw 265 shown in Fig. 50 an accurate adjustment of the elevation of the inverted V-shaped groove 254 may be made by lifting or lowering the plate 255. While the clamp 258 holds the bracket 263 rigidly connected to the rod 257, the bracket 256 may be slid up or down on the rod 257 by adjusting the position of the screw 265.

By referring to Figs. 3 and 4 it will be seen that each of the quantity indicator plates may be approximately adjusted in position by the clamp 258 and therefore very accurately set in the desired adjustment position by means of the adjusting screw shown at 265 in Fig. 50.

In order to provide ample reflecting or mirror surface at the bottom of the gasoline level the vertical rods 257 are spaced from the interior walls of the glass cylinder 80, as shown in Fig. 48. The indirect illuminating devices shown in Figs. 1, 2, 10 and 10ᵃ direct the light onto both sets of vertical quantity indicator plates and form shadows in the inverted grooves 254 which become distinctly visible when the desired X is formed by accurate reflection, as above described. Also, during daylight the inverted grooves 254 are distinctly visible by direct observation and are very effective in forming an X to the observer when the lower or mirror surface of the liquid level is at the upper point of the inverted V-shaped groove.

In order to predetermine the depth to which the glass cylinder 80 shall be filled with gasoline while the filling valve 134 is open and before the latter is closed, so as to assure the filling of the bowl or glass container to the indicator 83 corresponding to the quantity to be dispensed, I have provided an overflow pipe and connections, with the upper end adjustable in elevation in the glass cylinder 80. The lowermost section 268 of the overflow pipe is shown in Fig. 6 and is connected to the supply tank under ground.

On a fixed support 269 is mounted a stuffing-box 270 which is screw-threaded to the top of the overflow pipe section 268. Slidable through the stuffing-box 270 and up and down within the section 268 is an overflow pipe section 271 of smaller diameter. The lower end of the overflow pipe section 271 always remains in communication with the interior of the overflow pipe section 268 and the overflow pipe is therefore extensible vertically in length.

By placing Figs. 5 and 6 end to end it will be seen that the extensible overflow pipe 271 carries at its upper end a funnel 272 which is expanded laterally over such a wide area as to almost completely fill the cross-section of the glass cylinder 80 wherever the funnel is located.

As shown in Fig. 17, the funnel 272 is of such configuration as to permit of its free and unobstructed movement vertically up and down in the glass cylinder 80 along the various structures mounted within the glass cylinder with most of its periphery closely adjacent the interior wall of the glass cylinder. The lateral recesses 274 and 275 in the funnel 272 are provided for clearance of the funnel from the quantity indicators mounted within the glass cylinder. The openings 276 and 277 in the funnel 272 are provided to enable the funnel to move up and down in the cylinder 80 with ample clearance from the tubes 147 and 278. The recesses 274 and 275 are bounded by vertical walls 279 and 280 which extend upwardly from the bottom of the funnel 272 so that the upper edges of these walls 279 and 280 are in the same plane as the upper edge of the wall 281. It should also be understood that the upper edges of the upright walls 284, 285 and 286 are in the same plane as the upper edge of the wall 281. The space within the funnel 272 is therefore entirely surrounded by walls, the upper edges of which are at the same elevation or in the same horizontal plane.

The upper end of the extensible overflow pipe 271 as shown in Fig. 5 is connected to the depending screw-threaded extension 287 at the bottom of the funnel 272. This screw-threaded extension is near the peripheral portion of the funnel as shown in Figs. 17 and 19, and passageways 288 and 289 lead thereto from the downwardly inclined bottom of the funnels 272, such downward incline being shown at 290 in Fig. 19. Immediately above the screw-threaded extension 287 is a supplemental funnel 291, the upper edge 292 of which is in a plane below the upper edge of the main funnel 272. While the liquid in the glass cylinder when at such depth as to entirely immerse the funnel 272 may overflow the upper edges of the walls of the funnel 272, the liquid will at the same time overflow the edge 292 of the supplemental funnel 291.

Without the supplemental funnel 291 with its lower intake edge 292 of reduced length it would take longer for the liquid in the glass cylinder to overflow the edges of the funnel 272, because the greater length of such upper compared with the upper edge of the funnel 291 would cause more adhesion and liquid surface tension. In other words, by the provision of the supplemental funnel 291 with its upper edge 292 at a lower elevation the liquid will settle to the desired level more quickly by reason of less adhesion and liquid surface tension.

When the funnel is placed at the desired elevation, for instance corresponding to the three gallon or fifteen liter indicator, and the bowl is filled with gasoline until it overflows the funnel, the overflowing gasoline will be received by the entire funnel, but as soon as the overflow has continued until the depth reaches three gallons or fifteen liters, the small amount at the periphery of the funnel 272 will quickly leave the edge 181 and flow to the edge 292 of the supplemental funnel which for the reason stated would quickly bring the level of the liquid to a state of equilibrium so that the indicators can be accurately read.

It should be understood that it is desired to move the funnel structure to an elevation where the upper edge 292 of the supplemental funnel 291 will correspond to the setting of the quantity indicator 83 so that when the bowl or glass container is filled, the liquid will overflow the funnel and settle to the level of the upper edge 292 of the supplemental funnel, which level should correspond with the upper point of the inverted V-shaped groove in the quantity indicating plate 255 (Figs. 1 and 49).

With the foregoing funnel structure arrangement greater accuracy in measurement is obtained and the cost of construction and assembly is reduced by enabling a funnel structure of cast metal to be made. This is for the reason that the expanded area of the funnel structure effects such displacement of the liquid that any variation in the depth of the liquid between the funnel structure and the interior walls of the glass cylinder will not cause any appreciable variation in the quantity of gasoline delivered.

For instance, in a five gallon dispensing unit, a variation of 1.1 cubic inches at the one gallon quantity will cause no greater inaccuracy in the quantity delivered than 1/200 of the one gallon quantity. On account of the displacement of the liquid which is effected by the larger funnel 272 the variation in the depth of the liquid of .058 inches will cause no greater variation in the volume of the liquid at and near the upper edge 292 of the supplemental funnel 291 than 1.5 cubic inches and this is approximately 1/200 of the quantity delivered.

In a dispensing unit having a maximum capacity of twenty liters, it is preferable to have four divisions as represented by four quantity indicators at various elevations, each quantity indicator representing five liters. With such a dispensing unit there should be no greater variation at the point of measurement than 1.5 millimeters in depth so that there will be no greater variation than approximately 1/200 of the quantity delivered.

Therefore, the dispensing apparatus may be readily adjusted to secure very accurate measurement of the quantities delivered, notwithstanding the fact that the displacement unit 272 is made of cast metal with none of its upper edges machined. Slight irregularities in such upper edges of the displacement unit and the upper edge 292 of the supplemental funnel will not militate against the accuracy of the setting of the apparatus for certain predetermined quantities to be delivered. The displacement unit therefore facilitates assembly of the apparatus, adjustment of the quantity indicators and adjustment of the quantity stops, to obtain accurate measurement of the quantities delivered.

The quantity stop lever 293 shown in Figs. 1, 6, 10, 13, 20, 23, 25 and 27 is mounted on the overflow pipe 271 between the bearings 294 and 320, as shown in Fig. 20, the latter being fixed to the overflow pipe 271 to move bodily up and down therewith while the hub 296 of the quantity stop lever 293 is free to rotate between the bearings 294 and 320 relatively to the tube 271.

The hub 296 carries an arm 297 on which is mounted a roller 298 adapted to enter any one of the five quantity stop slots shown at 299 in Fig. 28.

As shown in Fig. 1, an elongated slotted plate 300 is mounted on the exterior of the casing 77. This plate is provided with a vertical slot 301 having at intervals recesses 302 which extend toward the left, as viewed in Fig. 1. At the lower end of the slot 301 is another slot 303 which extends toward the right, as shown in Figs. 1 and 20, and when the lever 293 is in this lowermost slot the padlock 304 may be used to lock the lever 293 in its lowermost position and at the same time lock the funnel structure 272 in the position indicated at the bottom of the visible container or bowl 80.

By referring to Figs. 5 and 6 placed end to end it will be seen that a door 305 having the shape of a segment of a cylinder is provided with an elongated slot 306 through which the quantity stop lever 293 is adapted to extend and along which it may slide. The upper end of the door 305 is provided with a right-angle bracket arm 307 journaled on a bearing 308 at the lower end of the packing gland member 309, which in turn is supported by the packing box 310, as shown in Fig. 5.

Connected to the lower end of the door 305 is another right-angle bracket arm 311 journaled at 312 to the cap 313 on top of the stuffing-box 270.

It will thus be seen that the door 305 is mounted for oscillation on the upright axis of the overflow tube 271.

By referring to Fig. 20 it will be seen that the lower bracket arm 311 has secured thereto a plate 314 which extends to the exterior of the dispensing unit through a slot 315. The outer portion of the plate 314 is provided with a hole 316. When the quantity stop lever 293 is moved along the slot 301 in the plate 300 to its lowermost position and toward the right in the slot 303 as viewed in Figs. 1 and 20, the hole 316 will be moved above the hole 317 in the lug 318 which projects from and is integral with the plate 300 as shown in Figs. 20 and 21. The padlock 304 may then be applied to the holes 316 and 317 to lock the quantity stop lever 293 in its lowermost position.

As shown in Fig. 20, the sleeve 319 is secured to the overflow pipe 271 so as to move bodily therewith. This sleeve is provided with a collar 320 intermediate its ends and also with shoulders at 321 and 322. The cylindrical bearing 294 fits against the shoulder 322 and a retaining collar 323 fits against the shoulder 321. When the parts are assembled as shown in Fig. 18, the retaining members 294 and 323 are soldered as at 324 and 325 to the sleeve 319 and the exterior of the overflow pipe 271. The hub 296 is rotatable on the sleeve 319 between the bearings 294 and 320. By means of this arrangement the quantity stop lever 293 may be oscillated on the axis of the overflow pipe 271 and relatively thereto and when the lever 293 is lifted and lowered along the slots 301 and 306 it carries with it the overflow tube 271 and the displacement funnel unit in the visible container or bowl 80.

The hub 295 which is mounted between the bearings 320 and 323 on the sleeve 319, as shown in Fig. 20, is provided with a slot 326 which fits over a vertical bar or bearing block 327 secured to the angle support 328, as shown in Fig. 21. The vertical angle support 328 is secured at its upper end as indicated in Fig. 10 and at its lower end as indicated in Fig. 14 so as to be rigidly connected to the stationary supporting structure of the dispensing unit. This can readily be understood by referring to Fig. 4 since Fig. 10 is a sectional plan view on the line 10—10 of Fig. 4 and by also referring to Fig. 6 since Fig. 14 is a sectional plan view on the line 14—14 of Fig. 6.

The vertical guide bar 327 shown in Fig. 21 is therefore mounted in fixed position and extends over a sufficient height to correspond with the vertical movement of the quantity stop lever 293 along the slot 301. This arrangement is for the purpose of keeping the overflow tube 271 and the displacement unit 272 from rotating relatively to the glass cylinder. The displacement unit will therefore always be moved along vertical lines and at its various heights compelled to occupy the same positions relative to the glass cylinder 80.

To facilitate assembly, the hub 295 is provided with a clamping rod 329 which has an arcuate slot 330 therein fitting over the sleeve 319, as shown in Fig. 21. When the nut 331 is loose on the screw-threaded portion of the locking device 329, the tube 271 may be rotated to enable its upper screw-threaded end as shown in Fig. 5 to be secured to the downwardly extending screw-threaded portion 287 of the displacement unit 272. After the overflow tube 271 has been secured to the displacement unit 272 and the latter has been adjusted to its proper position in the glass cylinder 80, the nut 331 shown in Fig. 21 may be tightened so as to cause the arcuate slot 330 in the locking rod 329 to clamp the hub 295 to the sleeve 319 with the slot 326 in the hub 295 fitting over the guide bar 327. Since the sleeve 319 is soldered to the tube 271 the clamping of the hub 295 to the sleeve 319 will rigidly secure the overflow tube 271 to the hub 295 and prevent the tube 271 from rotating. Therefore the vertical guide bar 327 will maintain the displacement unit in the glass cylinder 80 for movement along vertical lines only.

When the quantity stop lever 293 is moved vertically along the slot 301 the arm 297 and the roller 298 will occupy the positions illustrated in Fig. 13 relative to the quantity stop plate mechanism 332 which is secured in fixed vertical position to the vertical angle support 333. The upper and lower ends of the quantity stop plate mechanism are secured rigidly to the supporting framework of the dispensing unit as shown in Figs. 28 and 30. A support 334 for the upper end of the angle iron 333 is shown in Fig. 28 and in dotted lines in Fig. 10 and such support 334 may be integral with the manifold 79. The lower support 335 for the lower end of the angle iron 333 may in a similar manner be connected to the housing 75' and also the base 176.

Secured to the vertical angle iron 333 is an auxiliary vertical support 337 as shown in Figs. 28 and 30 and to the support 337 is secured a series of quantity stop plates 338. These quantity stop plates are each provided with a slot 299 for receiving the roller 298 on the quantity stop lever 293. In order to adjust the vertical position of each quantity stop plate 338 individually each is provided with two slots 339, 339 through which extend the cap screws 340, as shown in Figs. 28 and 30. The heads of each of these cap screws is perforated at 341 to receive a sealing wire 342. After the quantity stop plates 338 have each been adjusted so as to occupy the desired elevations and the cap screws 340 have been tightened so as to clamp the retaining plates 343 against the various quantity stop plates 338 to hold them securely in adjusted position, the wire 342 is extended through the perforations 341 of the heads of the various cap screws 340 and the ends of the wire 342 are then sealed at 344, 344.

Secured to the bracket 307 is a quadrant interlocking plate 345, as shown in elevation in Figs. 5 and 22, and in plan in Fig. 23. This quadrant plate is adapted to move into a slot 346 in the depending bracket 347 which is secured to the bottom of the plate 143 of the manifold, as shown in Figs. 5 and 22.

The quadrant plate 345 by being mounted on the bracket 307 is connected to the quantity stop lever 293 by means of the door 305 so that whenever the quantity stop lever 293 is moved laterally into one of the notches 302 of the plate 300, the quadrant plate 345 is moved clockwise. While the quantity stop lever is capable of being moved vertically along the slots 301 and 306, the quadrant plate 345 always remains in the same horizontal plane being pivoted on the bearings 308 and 312 for lateral movement with the quantity stop lever on the axis of the overflow tube 271.

Interlocking mechanism controlled by the transverse operating shaft 172 is associated with the quadrant plate 345 so as to lock the quantity stop lever against lateral movement at certain times, to compel the desired predetermined sequence in the operation of the dispensing apparatus. As shown in Fig. 22, there is keyed to the shaft 172 so as to rock therewith a double arm lever 348 which is provided with a roller 349. This double arm lever 348 with its roller 349 is shown in perspective in Fig. 35. The roller 349 fits in a slot 350 in the interlocking plate 351, as shown in Fig. 22. This interlocking plate 351 is shown in perspective in Fig. 32. The roller 349 of the double arm lever or crank 348 also extends into the larger slot 352 in another interlocking plate 353, as shown in Fig. 22. The interlocking plate 353 is shown in perspective in Fig. 33. As shown in Fig. 23, the interlocking plates 351 and 353 are mounted to slide vertically in guideways in the bracket 347. The plates 351 and 353 also have a sliding movement relatively to each other. The vertical sliding movement of the interlocking plates 351 and 353 are effected by the swinging of the crank 348.

The roller 349 fits in the slot 350 of the plate 351 so that whenever the shaft 172 is rocked, the plate 351 is moved up or down. The slot 352 in the plate 353 is of such length, however, that it is moved only at certain times by the crank 348.

As shown in Figs. 32 and 33, the plates 351 and 353 are provided with right-angle extensions 354 and 355, respectively. When the crank 348 is in its horizontal position shown in Fig. 22, the notches 356 and 357 in the plates 354 and 355 register with each other and are in such a position that the quadrant plate 345 is free to move through both of the notches 356 and 357. The quadrant plate 345 may therefore then be moved to the position shown in Fig. 23. Consequently when the operating levers 170 and 212 are in their neutral positions the crank 348 will also be in its horizontal or neutral position with both the filling valve 134 and the discharge valve 186 in closed positions and during such neutral positions of the various parts the quantity stop lever 293 may be moved vertically along the slot 301.

It should also be understood that when the quantity stop lever 293 is at its lowermost limit and moved into the slot 303 and locked in such slot by the padlock 304, the quadrant plate 345 is in the slots 356 and 357 of the interlocking plates 351 and 353. Therefore when the padlock 304 locks the quantity stop lever against lateral movement, the crank 348 is also locked against movement by the slots 356 and 357 fitting over the quadrant plate 345. This in turn locks the transverse shaft 172 and also the operating levers 170 and 212.

In order to prevent the plate 345 from being bent by forcible attempts to operate the levers 170 and 212, the plate 345 plays in the slot 346 between the strong arms 358 and 359 which are integral with the depending bracket 347 as shown in Fig. 22. Any bending of the plate 345 up or down will immediately cause the same to abut the same against the faces of the slot 346.

When the crank 348 is moved down as shown in Fig. 24, both of the plates 351 and 353 will be moved down along the guideways in the depending bracket 347. Before this can be done, however, the quantity stop lever 293 must be moved into one of the notches 302 and likewise the roller 298 on the arm 297 must be moved into one of the quantity stop slots 299, because such movement will rotate the plate 345 in a clockwise direction, as viewed in plan, and release this plate from the slots 356 and 357 in the plates 351 and 353. Such position of the plates 345 is shown in Fig. 25.

Only after the quantity stop lever has been moved to a quantity stop position can either operating lever 170 or 212 be moved "To bowl" position and when this occurs the crank 348 will be moved down as shown in Fig. 24 and the plates 351 and 353 will be moved to the position shown in the same view. In this position the quantity stop levers will be locked in the quantity stop position in which it has been set, because the upper portions of the angular plates 354 and 355 will act as abutments against return movement of the plate 345. Only when both of the slots 356 and 357 are moved upwardly to register with the slot 346 can the plate 345 be returned or moved in an anti-clockwise direction.

It will thus be seen that the quantity stop bar 293 cannot be moved out of a notch 302 and along the slot 301 after the levers 170 and 212 have been moved "To bowl" position as it is then necessary to go "To car" position and return to neutral position before being able to re-set the quantity stop bar 293. That is to say, the levers 170 and 212 must first be thrown "To bowl" position, then to neutral, then "To car" position, and then back to neutral in the order mentioned before it is possible to re-set the quantity bar 293, as hereinafter more fully explained.

When the interlocking mechanism is in the position shown in Fig. 23 and the quantity stop lever 293 is moved vertically along the slot 301 and thence to the left into one of the notches 302 as shown in Fig. 25, the funnel structure 272 will occupy an elevation in the visible container 80 corresponding to one of the depth indicators 83. Then when one of the operating levers 170 or 212 is moved "To bowl" position the crank 348 will be moved from its position shown in Fig. 22 to its position shown in Fig. 24 and at such time the filling valve 134 will be open so that upon operating the pump 87 by means of the operating lever 89, gasoline will flow into the visible container 80 until it overflows the funnel structure 272, whereupon the lever 170 or 212 is moved back to neutral position to effect closure of the filling valve 134.

The crank 348 will then be moved upwardly and carry with it the plate 351. Such upward movement of the crank 348 back to its horizontal position will not, however, cause the roller 349 to return the plate 353.

As shown in Fig. 34, the bracket 347 carries a conically pointed cylindrical detent 360 which fits into a cylindrical opening 361 in the boss 362 and is provided with a spring 363. This detent 360 extends through a slot 364 in the plate 351 and thence into the socket 365 or 366 in the plate 353. Therefore when the plate 353 is moved down the detent 360 will engage the socket 366 and hold the plate 353 down. When the plate 351 is moved back up the slot 364 slides freely over the detent 360 while the plate 353 is held down by the detent 360 engaging the socket 366. The slot 350 in the plate 351 being narrow causes the latter to move up when the crank 348 is returned to horizontal position, but the slot 352 being longer in a vertical direction as shown in Fig. 33, is not engaged by the crank roller 349 when the latter is moved upwardly to horizontal position. Therefore when the filling valve is closed by the return of the operating lever 170 or 212 back to neutral position, the slot 357 in the flange 355 of the plate 353 remains in its lower position and the angle plate 355 continues to act as an abutment against return movement of the plate 345 and therefore the quantity stop lever 293 is still locked in its quantity stop position, as shown in Fig. 25.

The next step in the operation is the movement by the operating lever 170 or 212 "To car" position which effects an upward movement of the crank 348 from its horizontal position, as viewed in Fig. 22. This movement will cause both of the plates 351 and 353 to be moved upwardly to positions shown in Fig. 26, because the roller 349 will engage the upper side of the slot 352 in the plate 353 as soon as the arm 348 moves upwardly. This can readily be seen by referring to Fig. 24 by assuming the crank 348 in a horizontal position with the roller 349 in engagement with the upper side of the slot 352. Fig. 22 shows the initial positions of the various parts, but after the crank 348 has been moved down to the position shown in Fig. 24, the upper edge of the slot 352 has been moved to a lower position as may be seen by comparing the same with the shaft 172. Therefore when the crank 348 is moved back to horizontal position from its lower position shown in Fig. 24, the roller 349 is ready to engage the upper edge of the slot 352 as soon as it begins to move upwardly from the horizontal position of the crank 348.

When the plate 353 is thus moved upwardly the socket 365 therein will be engaged by the detent 360 as shown in Fig. 34. Of course, when the crank 348 is swung upwardly from its horizontal position to its position shown in Fig. 26, the plate 351 will also be moved upwardly. Therefore while the slot 357 in the angle plate 355 of the plate 353 will be restored to initial position in registry with the slot 346 the slot 356 in the angle plate 354 of the plate 351 will be moved to its position shown in dotted lines in Fig. 26 substantially above the slot 346. It will thus be seen that both during the period when the filling valve is opened and the bowl is being filled to the level of the funnel unit and when the discharge valve is opened for delivery of gasoline to a car, the quantity stop mechanism will be locked against re-setting.

After the bowl has been filled to the desired level and the predetermined quantity of gasoline delivered, the operating lever 170 or 212 may be moved back to neutral position and this will effect a down swinging movement of the crank 348. The roller 349 by engaging the slot 350 will move the plate 351 down while the plate 353 is held by the detent 360 fitting in the socket 365. The downward movement of the plate 351 will be free and unobstructed by reason of the slot 364 through which the detent 360 extends, as shown in Fig. 34. The final downward swing of the crank 348 will restore the notch 356 to its initial position where it will be in registry not only with the slot 346, but also with the slot 357, whereupon the quadrant plate 345 may again be moved in an anti-clockwise direction so as to release the quantity stop mechanism and permit movement of the quantity stop lever 293 back into the slot 301. Then the quantity stop lever may be freely moved up or down so as to re-set the quantity stop mechanism for the next operation.

In addition to the above described interlocking mechaninsm for compelling such sequence in the operation of the filling valve and the discharge valve that the filling valve must first be opened and then closed before the discharge valve can be opened, and the discharge valve must again be closed before the quantity stop lever will be released, I have provided additional interlocking mechanism to compel the operator to completely fill the visible bowl with the quantity indicated by the position of the funnel unit before it is possible to discharge any gasoline from the bowl, thus preventing any fraud in the dispensing of the gasoline. For this purpose, I have secured to the shafts 172 and 175 the cams 454 and 455, respectively, as shown in Figs. 12 and 36, with which are associated locking rods 456 and 457 extending upwardly and connected to actuating mechanism as illustrated in Figs. 8 and 11. When the operating lever 170 is moved "To bowl" position the shaft 172 is moved in an anti-clockwise direction as viewed in Fig. 12 and the shaft 175 is consequently moved in a clockwise direction by reason of the intermeshing gears 173 and 174. When the operating lever 170 is moved "To bowl" position and the shaft 172 is moved in an anti-clockwise direction as viewed in Fig. 12, this shaft is moved in a clockwise direction as viewed in Fig. 22. Therefore the lever 348 will occupy the position shown in Fig. 24 and the cams 454 and 455 will occupy the positions shown in Fig. 12 when the filling valve 134 is opened by means of the mechanism shown in Fig. 36.

When the operating lever 170 is in its initial and neutral position the rod 456 will rest on the higher portion of the cam 454 at the neutral point designated N in Fig. 12, and as shown in Fig. 36 at such time the rod 457 will be at the neutral point designated N' in Fig. 12. When the operating lever 170 is moved "To bowl" position and the fill valve 134 is opened the cam 454 will be moved in an anti-clockwise direction until the rod 456 drops into the locking recess 458 of the cam 454, the rod 456 then occupying the position designated F indicating the filling position of the bowl and at such time the rod 457 occupies the position shown in Fig. 12 at the point designated F' on the higher portion of the cam 455. Therefore when the operating lever 170 is moved "To bowl" position it is locked in such position by the vertical rod 456 dropping into the locking recess 458. Any attempt to move the lever 170 back to initial position in the direction indicated by the arrow 459 in Fig. 12 will be prevented, because the gears 173 and 174 will attempt to move the cam 454 in the direction of the arrow 460 and this cannot be done so long as the rod 456 is in the locking recess 458. Therefore the return of the control lever 170 to neutral position is prevented until the rod 456 has been removed from the cam face at 458 and such rod cannot be thus removed until the bowl has been filled to the level predetermined by the quantity stop lever and the positioning of the funnel unit at one of the depth indicators in the visible bowl.

The funnel unit having been set to the quantity desired and the fill valve 134 having been opened, the gasoline is pumped into the bowl until it overflows the funnel unit into the overflow pipe 271 through which the excess gasoline returns to the main storage tank under ground. When the gasoline flows from the funnel unit into the overflow pipe 271 a portion of the liquid will flow into the elongated cup 461 which is connected to the bottom of the rod 462. This rod is pivoted at its upper end at 463 to the left-hand end of the rocker arm 464 which is fulcrumed at 465 to a bracket 466 on top of the plate 218. The right-hand end of the rocker arm 464 is pivoted at 467 to the upper end of the rod 456.

It should be understood that the interlocking rod 456 is heavier than the rod 462 and the bucket 461 connected thereto. Therefore when the cam 454 is moved in a clockwise direction to the position shown in Fig. 12, the locking rod 456 will overbalance the weight of the rod 462 and the bucket 461 and drop into the recess 458. This rod 456 will not be released, however, until the visible bowl has been filled to the level predetermind by the position of the quantity stop lever by means of which the funnel unit has been moved to the desired elevation corresponding to the depth indicator indicating the quantity of gasoline to be dispensed. When the bowl has been filled to this level and the gasoline overflows into this bucket 461 the weight of the liquid in this bucket will be sufficient to overbalance the weight of the rod 456 and release this rod from the cam face 458 of the cam 454, after which the latter may be moved in the direction indicated by the arrow 460 in Fig. 12 which corresponds to movement of the operating lever 170 back to neutral position in preparation to move this operating lever "To car" position.

In order to re-set the releasing mechanism for the rod 456 a restricted opening 468 is provided in the bottom of the bucket 461 so that the gasoline will be drained from this bucket before the next operation of filling the bowl is to be performed. (See Figs. 8 and 8ª.)

From the foregoing it will be seen that after setting the funnel unit to the quantity desired and moving the control lever 170 to fill position, the fill valve 134 will be opened but it will then be impossible to change from this position until the bowl has been filled to the quantity desired when the overflow into the overflow pipe 271 from the funnel unit will unlock the control shaft 172 and allow it to be returned to neutral position, thereby forcing the operator to fill the bowl completely to the quantity desired before it is possible to discharge any liquid through the discharge valve; thus the operator will be prevented from perpetrating any fraud on the customer purchasing the gasoline.

I will now describe the mechanism for compelling complete discharge of the bowl. When the bowl is filled the float 166 shown in Fig. 5 will rise to swing upwardly the rod 451 on its pivot 452. At 469 to the rod 451 is pivoted the lower end of a rod 470 which extends upwardly through the bowl 80 and through the cover plate 218 thereof, as shown in Fig. 8. The upper end of the rod 470 is pivoted to the left-hand end of the rocker arm 471 which is fulcrumed at 472 to the bracket 473 mounted on the ring frame 220, as shown in Fig. 8. Pivoted to the right-hand end of the rocker arm 471 at 474 is the vertical rod 457 which extends downwardly through a tube 475 to the cam 455, as shown in Fig. 12. Therefore when the float 166 is lifted by the filling of the bowl an upward pressure is exerted on the rod 470 and a downward pressure on the rod 457 against the outer face of the cam 455. As before stated, when the fill valve is open the rod 457 occupies the position on the cam 455 designated F' in Fig. 12.

Now after the bowl has been filled with the quantity of gasoline indicated by the position of the funnel unit and the cam 454 has been released, the operator can move the control lever 170 to neutral position and thence "To car" position. When the control lever is in neutral position the locking rods 456 and 457 will occupy the positions on the cams 454 and 455 designated N and N' in Fig. 12.

When the control lever is moved from neutral position to discharge position or "To car" position the cams 454 and 455 will be moved in the directions indicated by the arrows 459 and 460 and the discharge valve shown at 186 in Figs. 36 and 38 will be opened. During this operation of opening the discharge valve the cam 455 will be rotated in a clockwise direction until the rod 457 drops into the locking recess 476. The rod 457 will be moved downwardly as soon as released from the outer face of the cam because of the pressure exerted thereon by the float 166. During the discharge of the gasoline from the bowl the rod 457 will occupy the position designated D' in Fig. 12. The cam face at 476 will lock the operating lever 170 against return movement to neutral position until the rod 457 is released and this rod will not be released until all of the gasoline has been discharged from the bowl through the discharge valve, because so long as the gasoline is flowing from the bowl the float will be in its raised position and not until the float is lowered after the discharge of the gasoline will the float move down to its initial position and thereby pull the rod 457 out of the recess 476. Then and not until then can the operating lever 170 be moved from discharge position or "To car" position back to its central or neutral position.

It will thus be seen that when the bowl is filled the float 166 exerts a downward pressure on the locking rod 457 so that when the cam 455 is moved to discharge position the rod 457 will be moved down into position behind the cam face 476 and the cam 455 will be locked in this position. As the last portion of the liquid is drained from the chamber 157 in the manifold 79 the float will be lowered, thereby exerting a reverse action on the rod 457 to lift the same out of its position behind the cam face 476. The length of the rod 457 is so adjusted that when the float rests on the bottom of the chamber 157 the lower end of the rod 457 will clear the outermost face of the cam 455. It will therefore be impossible to close the discharge valve after it has once been opened to dispense gasoline until all of the liquid has been drained from the visible container or bowl and from the chamber 157, thus preventing fraud, as above explained. It should be particularly noted that the locking rods 456 and 457 are entirely enclosed so as to protect them not only against the elements, but also and especially from being tampered with by the operator. The locking rod 457 extends through the tube 475 and the locking rod 456 extends through the tube 477, as shown in Fig. 12. The lower ends of these tubes are screw-threaded to the manifold 79 as indicated in Fig. 8 and the upper ends of these tubes are screw-threaded to the ring-frame 220. The interlocking mechanism for compelling the filling of the bowl after the fill valve is opened and the interlocking mechanism for compelling discharge of the gasoline after the discharge valve is opened are entirely enclosed and therefore inaccessible to the operator, although accessible to authorized persons for adjustment or repair when the canopy 81 and the plate 218 are removed for the purpose of cleaning the inside walls of the visible container 80.

Associated with the quantity stop mechanism and the mechanism for operating the filling and discharge valves is totalizing counter-mechanism which is so arranged as to be set by the quantity stop mechanism and operated by the operating lever 170 or 212 to effect registration of the quantity of gasoline to be dispensed before the gasoline begins to flow from the visible container to a car, that is, to the gasoline tank of an automobile. The arrangement is such that after the bowl or visible container has been filled to the desired level and the operating lever moved to neutral position and delivery is about to be made to the car by movement of the operating lever from neutral position "To car" position, registration of the amount to be delivered will be made during approximately the first half movement of the operating lever from the neutral position "To car" position. To the hub 295 as shown in Figs. 13 and 54 is connected a radial arm 367 to the outer end of which is pivoted at 368 a vertical bar 369. The arm 367 moves along vertical lines as determined by the guide bar 327 shown in Figs. 13 and 21. Mounted on the vertical bar 369 are rack gear teeth 370 spaced apart to correspond with the quantity stop notches of the quantity stop mechanism. The gear teeth 370 are shown in elevation in Fig. 54 and in perspective in Figs. 71 and 72 and are mounted in offset positions on the vertical bar 369 in registry with the slot 371 therein.

When the bar 269 is moved vertically by vertical movement of the quantity stop lever 293, the upper end thereof extends into the tube 278 shown in Figs. 3 and 4. The upper end of the tube 278 is hermetically sealed by the cap 372. Therefore, although the tube 278 extends into the glass cylinder 80, it is entirely closed against ingress of any liquid since the tube 278 is used only to afford ample space for vertical movement of the mutilated rack bar 369.

Associated with the rack bar 369 and its spaced-apart teeth 370 and its slots 371, is a mutilated gear 373 shown in elevation in Fig. 54 and in perspective in Fig. 73. This gear 373 has eight teeth, every other one of which is cut away to provide a flat surface 374 which is adapted to be engaged by the right-hand edge of the bar 369 when the gear 373 is between two slots 371. It should be understood that the left-hand portion of the gear shown in Fig. 373 meshes with the segmental gear 375 shown in Figs. 54 and 55, whereas the right-hand portion of the gear shown in Fig. 73 co-operates with the right-hand edge of the bar 369, the slots 371 and the double-toothed devices 370.

When the bar 369 moves vertically from the position shown in Fig. 54 the flat face 374 is engaged by the right-hand edge of the bar 369 and the adjacent gear teeth 373 engage the bar 369 to lock the gear 373 against rotation. When one of the gear toothed devices 370 is reached, however, the gear 373 will be rotated through an angle represented by two teeth since the full tooth of the gear 373 back of the flat-faced tooth 374 may engage the rack gear 370 while the tooth of the gear 373 to the right of the flat face 374 as viewed in Fig. 73 is free to enter the slot 371; then by continued movement of the bar 369 the gear 373 will be turned so that the next flat face 374' of Fig. 73 will lie between two complete teeth that will engage the right-hand edge of the bar 369.

In this manner the segmental gear 375 will be moved through a predetermined angle depending upon how many of the toothed devices 370 have stepped the gear 373 around, two teeth at a time. It should be particularly understood that the segmental gear 375 meshes with the unmutilated portion of the gear 373 and that the teeth of the gear 373 back of the plane of the gears 370 bear against the right-hand edge of the rack bar 369 to lock the gears 373 and 375 against movement until one of the slots 371 is reached when the gear 373 is free to rotate two teeth and such rotation will be effected by the double-toothed rack device 370 engaging a full-toothed tooth of the gear 373 and then meshing with the gear tooth of the gear 373 between two flat faces thereof.

As shown in Fig. 66, the segmental gear 375 is provided with an opening having opposite flat surfaces 376 which are adapted to fit over corresponding flat faces 377 on the hub 378 of the segmental stop plate 379 shown in Fig. 75. The hub 378 is journaled at 380 to the frame 381, as shown in Fig. 54.

On the transverse operating shaft 172 as shown in dotted lines in Fig. 10, is a crank 382 to which is pivoted at 383 an upright rod 384. When the operating lever 170 or the lever 212 is moved "To bowl" position the crank 382 occupies the position indicated by the dotted lines 385 in Fig. 54. The neutral position of the operating lever 170 corresponds to the full line position of the crank 382 in Fig. 54. When the lever 170 is moved from neutral position "To car" position the crank 382 will be moved to the dotted line position illustrated at 386 in Fig. 54.

The registering mechanism shown in Fig. 54 is so constructed and arranged that during approximately the first half of the movement of the operating lever 170 from its neutral position "To car" position, registration of the quantity delivered may be made so that even before the discharge valve 186 is opened registration will have been effected. This result is obtained by setting the tappet 181 shown in Fig. 38 so that it will not engage the stem 185 to open the valve 186 until after the crank 382 has been moved down sufficiently to effect the registration desired.

Pivoted at 387 to the frame 381 is a double-armed lever 388 the right-hand end of which as shown in Fig. 54 is provided with an adjustable screw 389 in position to impinge against one of the radial abutments 390 as shown in Figs. 54 and 75.

Movement to the lever 388 is imparted by the spring 391 and the sleeve 392 which is pivoted at 393 to the arm 388 and slides along the rod 384. Therefore while the rod 384 always moves up and down the same distance upon each operation of the crank 382 to its dotted line position 386, the arm 388 will be swung only such distance as is permitted by the radial stops or abutments 390. Fig. 55 when compared with Fig. 53 will show the maximum movement of the arm 388 for registering the delivery of four gallons or twenty liters of gasoline. This is due to the fact that the rack bar 369 has been moved to its uppermost position and the gear 375 moved in an anti-clockwise direction to its maximum extent.

If gallons of gasoline are to be registered and the maximum capacity of the bowl is five gallons, there should be five of such double-toothed devices as those designated 370. If the maximum capacity of the visible container is twenty liters, there should be four of such double-toothed devices 370; one for each of the depth indicators, each representing five liters.

If a less number of double-toothed devices than that corresponding to the capacity of the bowl is operated, the lever 388 will not move to such a great extent and a less quantity of gasoline will be registered. In other words, the quantity registered will be in accordance with the setting of the funnel unit and the quantity to which the bowl is filled.

When the lever 388 is released by movement of the crank 382 to its full line position shown in Fig. 54 the lever 388 will be restored to its initial full line position shown in Fig. 54 and rest in such initial position against the adjustable abutment 394 which is mounted on the stationary frame 395. The lever 388 is shown in perspective in Fig. 74, the perforations being shown at 393' in the arms 388' for the pivotal connection shown at 393 in Fig. 54 to the sleeve 392. The arm 388 may have integral therewith the sleeve 396 to be journaled on the shaft 387 shown in Fig. 54. Cast integral with the sleeve 396 as shown in Fig. 74 is a radial plate 397 having a perforation therein at 398. The radial plate 397 is riveted through the holes 398 and 398' to the segmental gear 399, as shown in Fig. 59 and Figs. 68 and 74. The segmental gear 399 meshes with the segmental gear 400 which is shown in elevation in Fig. 61 and also in Fig. 58. The frame 401 for supporting the mutilated gear 373 is shown in elevation in Fig. 54 and in plan in Fig. 56. This frame is secured by means of the angle iron 402 to the frame 403 which is mounted on the manifold 79. The frame 404 for supporting the totalizing counter-mechanism 405 is mounted on the frame 406, which in turn is secured to the angle iron 407 mounted on the bracket 408 and the latter is secured to the manifold 79.

As shown in Fig. 61, the segmental gear 400 is provided with an arm plate 409 perforated at 410. This plate 409 is shown assembled in the elevational view in Fig. 58 and in the plan view in Fig. 57.

Mounted on the right-hand end of the plate 409, as shown in Fig. 58, is a plate 411 which is provided with a spring extension 412 as shown in elevation in Figs. 58 and 69 and in end view in Fig. 70. A shaft 413 with a large head 414 is mounted on the plate 409 to hold the plate 411 and the spring 412 in position and to serve as a journal bearing for the pawl 415. The spring 412 rests against the back of the pawl 415 to hold it in engagement with the ratchet wheel 416, as shown in Fig. 58. When the arm 388 is moved against one of the radial stops 390 and the segmental gear 399 rotates the gear 400, the arm 409 will be swung down on its pivotal connection with the bracket arm 417 which is secured to the frame 404 as shown in Figs. 57 and 58. The downward movement of the arm 409 will cause the pawl 415 to rotates the ratchet wheel 416 in a clockwise direction.

As shown in Fig. 67, the ratchet wheel 416 is provided with an opening having flat faces 418 adapted to fit on corresponding flat faces 419 of the gear wheel 420 shown in Fig. 65. The gear wheel 420 meshes with a gear 421 which is pinned to the operating shaft of the totalizing counter-mechanism, provision for such connection being indicated by the perforations 422 in Figs. 63 and 64. The totalizing counter-mechanism 405 is of the usual and well-known construction, that shown in Fig. 57 being capable of registering 99,999 gallons or 99,999 liters according to whether it is constructed to register gallons or liters.

When the operating lever is moved from "To car" position back to neutral position the crank 382 will be moved to its full line position shown in Fig. 54 and thereupon the arm 388 will be moved down against the abutment 394. This operation will return the segmental gear 399 to its initial position and at the same time rotate the arm 409 back to its position shown in full lines in Fig. 58. The ratchet wheel 416 will be held by the pawl 423 against return movement while the pawl 415 will snap over the ratchet teeth. The pawl 423 is held down yieldingly by the spring 424.

It should be particularly noted that when the crank 382 is moved from its full line position 386 shown in Fig. 54 the arm 388 will be released, but the spring 391 being a compression spring will not move the lever 388 back to its initial position. In order to move the lever 388 back to its initial position a spring 432 is provided. One end of this spring is secured to the frame 404 as shown in Fig. 59 and the other end thereof is secured to the lower edge of the segmental gear plate 399. This spring 432 is relied on to turn the sleeve 396 shown in Fig. 74 in a clockwise direction, the arm 397 being riveted to the segmental gear plate 399 at 398, 398′ and the sleeve 396 being integral or rigidly secured to the arm 397. The spring 432 for restoring the lever 388 to its initial position against the stop 394 will also restore the arm 409 to its full line position shown in Fig. 58.

In order to assure the dropping of the pawls 415 and 423 into the desired notches in the ratchet wheel 416 the stops 389 and 394 are adjusted so as to secure a slight overthrow of the plate 409 in both directions of its movement. For instance, when the plate 409 is moved down its limit will be determined by the adjustment of the stop 389 and a slight downward overthrow will assure the dropping of the pawl 423 into one of the notches of the ratchet wheel 416, as shown in Fig. 58.

The numbers of the wheels of the counter-mechanism 405 are located back of a transparent window 425 which is mounted in the frame 450 as shown in Fig. 59. The preferred location of the counter-mechanism is illustrated in Figs. 2, 54, 55 and 56, Fig. 56 being a sectional plan view taken at the location of the window frame 450 shown in Fig. 2.

An opaque curtain or shutter 426 is mounted to slide up and down in the frame 404 between the totalizing counter-mechanism and the glass window 425. This shutter or curtain may be lifted by means of a key 427 which is adapted to rotate the cylinder 429 to the inner end of which is connected a lever plate 428. The cylinder 429 is mounted in a housing 430 secured to the manifold 79. The lever plate 428 is connected by a link 431 to the shutter 426. By means of this construction only authorized persons having a key 427 can at any time secure a reading of the totalizing counter-mechanism.

By referring to Fig. 57 it will be seen that a guide plate 446 may be secured at its ends to the frame 404. The shutter 426 is also guided at its vertical lateral edges along the grooves 447, 447 in the frame 404.

In order that the level of the liquid in the visible container may be brought to a horizontal plane the dispensing unit shown in Fig. 1 may be mounted with the aid of a plumb-bob 433. This plumb-bob is hung from the ring frame 220 by means of a chain 434 attached to the frame 220 at 435. An upwardly extending pointer 436 may be attached to the manifold 79 as shown in Figs. 1 and 4 to cooperate with the plumb-bob 433.

In Fig. 5, the packing 437 and 438 in the stuffing-box 310 is held in place by auxiliary packing glands 439 between which is located a spring 440 so as to afford an oil chamber to which is connected an oil cup as shown by the dotted lines 441 in Fig. 5. The oil in the oil cup 441 may be replenished through the opening 442.

The vertical angle irons referred to for supporting various parts of the dispensing apparatus are secured rigidly in position at their upper ends in the manner illustrated in Figs. 13, 14, 31 and 56. The lower ends of the angle irons are also rigidly secured in fixed positions in the manner illustrated in Figs. 7 and 15. Inwardly extending bracket arms 448 (Figs. 7 and 15) integral with the base plate 76 are provided with attaching devices 449 rigidly securing the lower ends of the angle irons to these bracket arms 448.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. Dispensing apparatus comprising a container, a discharge valve therefor, a shaft operating said valve, a stop cam on said shaft, an upright rod engaging said cam, a float located in position to be acted on by the liquid before it passes through said valve, and connections between said rod and said float to release said rod from said stop cam only after the liquid has been drained from said container.

2. In dispensing apparatus, the combination with a pump, of means for operating the same, a visible container, quantity stop mechanism for predetermining the quantity of liquid to be dispensed from said visible container, a discharge hose and nozzle connected to said visible container, valve mechanism for controlling the flow of liquid to and from said container, manual means for controlling said valve mechanism, and interlocking mechanism between said manual means and said quantity stop mechanism to prevent resetting of the latter until after said manual means, has been operated through a predetermined cycle of movements.

3. Dispensing apparatus comprising a visible container, a filling valve, a discharge valve, quantity stop mechanism for predetermining the quantity of liquid with which said container is filled when said filling valve is opened, means for operating said valves to first open said filling valve until said container is thus filled, then closing said filling valve and opening said discharge valve to dispense the liquid from said container, and interlocking mechanism associated with said quantity stop mechanism and said valve operating means to prevent the resetting of said quantity stop mechanism until after said filling valve has been closed and said discharge valve opened.

4. The combination with dispensing apparatus comprising a container, quantity stop mechanism and means for controlling the filling of the container according to the setting of the quantity stop mechanism, of totalizing counter-mechanism for registering the quantity of liquid delivered, means operated by the quantity stop mechanism for setting the totalizing counter-mechanism, and means for operating said totalizing counter-mechanism according to its set position.

5. The combination with dispensing apparatus comprising quantity stop mechanism and dispensing controlling means, of totalizing counter-mechanism, connections between the quantity stop mechanism and said counter-mechanism for setting the latter, and means actuated by said controlling means for operating said counter-mechanism upon the operation of the dispensing apparatus to dispense liquid therefrom.

6. In dispensing apparatus, the combination with a visible container, of a filling valve, a discharge valve, quantity stop mechanism for predetermining the quantity of liquid with which said container is filled when said filling valve is open, an overflow pipe connected to said quantity stop mechanism and adjustable in elevation thereby in said visible container, and means comprising a cup suspended in said overflow pipe for preventing opening of the discharge valve until said visible container has been filled to the depth predetermined by the adjusted location of the upper end of said overflow pipe.

7. In dispensing apparatus, the combination with a visible container, of a fill valve for controlling the flow of liquid into said container, an overflow pipe adjustable in elevation in said visible container, a discharge valve, means comprising a rock shaft for operating said discharge valve, an abutment rotatable with said shaft, and means operable by flow of liquid into said overflow pipe for engaging said abutment to prevent opening of said discharge valve until after said visible container has been filled to the depth predetermined by the adjusted elevation of said overflow pipe.

8. In dispensing apparatus, the combination with a container, of an overflow pipe extending thereinto to adjustable elevations, quantity stop mechanism connected to said overflow pipe to adjust the same to predetermine the depth to which said container is to be filled with liquid, means comprising a fill valve for controlling the flow of liquid into said container, interlocking mechanism for preventing change of said quantity stop mechanism while liquid is flowing into said container, a discharge valve, and interlocking mechanism for preventing opening of said discharge valve until said container has been filled to said predetermined depth.

9. In dispensing apparatus, the combination with a container adapted to receive liquid to be dispensed, of an overflow pipe extending into said container for adjustment in elevation, a fill valve for controlling the flow of liquid into said container, a discharge valve, means comprising a shaft for operating said valves, a stop cam on said shaft, an upright rod engaging said cam to prevent opening of said discharge valve until after said container has been filled to the depth predetermined by the adjusted elevation of said overflow pipe, a bucket in said overflow pipe, and connections between said bucket and said upright rod to effect lifting of said rod from said cam when overflow into said pipe and into said bucket occurs to release said discharge valve for opening the same when the liquid in said container reaches the depth predetermined by the adjustment of said overflow pipe in said container, said bucket having a restricted opening in its bottom to drain the same and cause automatic re-setting of said upright rod in relation to said cam.

10. In dispensing apparatus, the combination with a container adapted to receive liquid to be dispensed, of an adjustable overflow pipe extending into said container, a fill valve for controlling the flow of liquid into said container, a dispensing hose, a discharge valve for controlling the flow of liquid from said container into said discharge hose, means comprising an operating shaft for opening and closing said valves, a cam plate mounted on said shaft to rotate therewith and provided with a radial stop, a vertical rod engaging said stop to prevent opening of said discharge valve until after said container has been filled to a depth predetermined by the adjustment in elevation of said overflow pipe, a bucket in the overflow pipe below the bottom of said container, and connections between said bucket and said rod to effect lifting thereof to release the same from said stop to permit opening of said discharge valve after the liquid overflows into said overflow pipe and fills said bucket.

11. In dispensing apparatus, the combination with a visible container, of an adjustable overflow pipe extending into the same, means for adjusting the elevation of said overflow pipe, a fill valve for controlling the flow of liquid into said container to the depth predetermined by the adjustment of said overflow pipe, a discharge hose connected to said container, a discharge valve for controlling the flow of liquid from said container into said discharge hose, means comprising a shaft for operating said valves, a cam rotatable with said shaft and having an arcuate surface concentric with the axis of said shaft, a radial stop at a notch at one end of said arcuate surface, a vertical rod adapted to rest on said arcuate surface and to move into said notch, and means operated by liquid flowing through said discharge valve into said hose for holding said rod down in said notch while said radial stop acts to prevent the closing of said discharge valve until said visible container has been emptied into said hose.

12. Dispensing apparatus comprising dispensing mechanism having a dispensing hose and a valve for controlling the flow of liquid into the same, sight means for viewing the flow of liquid into said hose, a float associated with said sight means, and means operated by said float for preventing re-closing of said control valve until a predetermined quantity of liquid has been delivered to said hose.

In testimony whereof I have signed my name to this specification on this 13th day of March, A. D. 1929.

RAYMOND W. BOND.